US012756640B1

(12) United States Patent
Quraishi

(10) Patent No.: US 12,756,640 B1
(45) Date of Patent: Oct. 6, 2026

(54) AI-DRIVEN ADAPTIVE SYSTEMS INTELLIGENCE FOR ENTERPRISE IT ENVIRONMENTS

(71) Applicant: Soverion AI LLC, Mead, CO (US)

(72) Inventor: Andrew Quraishi, Mead, CO (US)

(73) Assignee: Soverion AI LLC, Mead, CO (US)

( * ) Notice: Subject to any disclaimer, the term of this patent is extended or adjusted under 35 U.S.C. 154(b) by 0 days.

(21) Appl. No.: 19/350,837

(22) Filed: Oct. 6, 2025

Related U.S. Application Data

(60) Provisional application No. 63/878,555, filed on Sep. 9, 2025.

(51) Int. Cl.
*H04L 41/5041* (2022.01)
*G06N 5/043* (2023.01)
(Continued)

(52) U.S. Cl.
CPC ......... *H04L 41/5048* (2013.01); *G06N 5/043* (2013.01); *H04L 41/084* (2013.01); *H04L 41/16* (2013.01)

(58) Field of Classification Search
CPC ........ G06Q 10/06316; G06Q 10/06313; G06F 11/3433; G06F 11/3051; H04L 41/0806;
(Continued)

(56) References Cited

U.S. PATENT DOCUMENTS 7,870,490 B2 * 1/2011 Coles .................... G06F 9/4411 717/121
8,700,832 B1 * 4/2014 Ramakrishnan ...... G06F 3/0632 710/104
(Continued)

OTHER PUBLICATIONS

IaC for Workflow Automation: Basics Retrieved from www.movestax.com/post/iac-for-workflow-automation-basics, Jun. 2, 2025 (Year: 2025).*
(Continued)

*Primary Examiner* — Scott L Jarrett
(74) *Attorney, Agent, or Firm* — Kevin Paganini, Esq.

(57) ABSTRACT

This disclosure relates to enterprise management solutions that are integrated with adaptive systems intelligence technologies that facilitate intelligent monitoring, real-time analysis, and dynamic automation of IT operations across enterprise environments, enabling seamless integration, proactive decision-making, and continuous optimization of workflows, security, compliance, and resource allocation throughout the digital ecosystem. The disclosed systems and methods employ a unified metadata integration framework, advanced artificial intelligence models, and autonomous control engines to provide holistic, cross-domain visibility and adaptive orchestration of enterprise IT resources. By leveraging continuous metadata aggregation and AI-driven analytics, the disclosed technologies enable enterprises to detect and respond to operational changes, security threats, and compliance requirements in real time, while automating the deployment and management of complex workflows across heterogeneous infrastructure. This approach enables the creation of an intelligent, self-optimizing, and self-adapting enterprise IT environment that reduces manual intervention, minimizes risk, and drives improved operational efficiency.

18 Claims, 12 Drawing Sheets

(51) Int. Cl.
*H04L 41/084* (2022.01)
*H04L 41/16* (2022.01)

(58) Field of Classification Search
CPC ............. H04L 41/0895; H04L 41/5054; H04L 41/0886
See application file for complete search history.

(56) References Cited

U.S. PATENT DOCUMENTS

| | | | | |
|---|---|---|---|---|
| 8,745,577 | B2 * | 6/2014 | Reech | G06F 8/60 717/162 |
| 8,806,476 | B2 * | 8/2014 | Kapoor | G06F 8/61 714/39 |
| 9,251,165 | B2 * | 2/2016 | Reech | G06F 8/60 |
| 9,350,623 | B2 * | 5/2016 | Shadi | G06F 8/60 |
| 9,996,333 | B2 * | 6/2018 | Kim | G06F 8/61 |
| 10,715,403 | B2 * | 7/2020 | Vladimirskiy | H04L 41/0886 |
| 10,929,192 | B2 * | 2/2021 | Biener | G06F 9/5077 |
| 11,252,050 | B2 * | 2/2022 | Vladimirskiy | G06F 9/505 |
| 11,275,570 | B1 * | 3/2022 | Collins | G06F 8/427 |
| 11,354,101 | B2 * | 6/2022 | Collins | G06F 8/70 |
| 11,836,158 | B2 * | 12/2023 | Shah | G06F 9/54 |
| 12,001,837 | B2 * | 6/2024 | Wigglesworth | G06F 8/35 |
| 12,204,565 | B1 * | 1/2025 | Yu | G06F 16/9024 |
| 12,273,245 | B2 * | 4/2025 | Vladimirskiy | G06F 9/5083 |
| 12,308,992 | B2 * | 5/2025 | Nagar | G06F 21/6236 |
| 12,360,753 | B2 * | 7/2025 | Yu | G06F 8/60 |
| 12,468,510 | B1 * | 11/2025 | Kuperman | G06F 8/77 |
| 12,541,342 | B1 * | 2/2026 | Goswami | G06F 8/30 |
| 2006/0168575 | A1 * | 7/2006 | Bhatt | G06F 8/65 717/168 |
| 2006/0253693 | A1 * | 11/2006 | Kanodia | H04L 67/04 713/1 |
| 2007/0113186 | A1 * | 5/2007 | Coles | G06F 9/4411 715/735 |
| 2007/0220032 | A1 * | 9/2007 | Kapoor | G06F 8/61 707/999.102 |
| 2012/0079450 | A1 * | 3/2012 | Reech | G06F 16/185 717/104 |
| 2014/0297694 | A1 * | 10/2014 | Reech | G06F 8/60 707/803 |
| 2015/0293755 | A1 * | 10/2015 | Robins | G06F 9/44526 717/174 |
| 2016/0291964 | A1 * | 10/2016 | Nigul | H04L 67/34 |
| 2017/0115977 | A1 * | 4/2017 | Kim | G06F 8/61 |
| 2018/0068241 | A1 * | 3/2018 | Varkey | G06Q 10/0635 |
| 2018/0295033 | A1 * | 10/2018 | Vladimirskiy | H04L 43/50 |
| 2022/0091826 | A1 * | 3/2022 | Collins | G06F 8/51 |
| 2025/0004856 | A1 * | 1/2025 | Genis | G06F 9/5077 |
| 2025/0007783 | A1 * | 1/2025 | Smith | H04L 41/5054 |
| 2025/0131358 | A1 * | 4/2025 | Prabhakar | G06Q 10/0633 |
| 2025/0139417 | A1 * | 5/2025 | Tripathy | G06N 20/00 |
| 2025/0158991 | A1 * | 5/2025 | Eberlein | G06F 9/5072 |
| 2025/0159491 | A1 * | 5/2025 | Gonzalez | H04W 16/18 |
| 2025/0208844 | A1 * | 6/2025 | Yu | G06F 8/60 |
| 2025/0209095 | A1 * | 6/2025 | Yu | G06F 16/289 |
| 2025/0365198 | A1 * | 11/2025 | Deokule | H04L 41/0836 |
| 2026/0023547 | A1 * | 1/2026 | Yu | G06F 8/60 |
| 2026/0030019 | A1 * | 1/2026 | Criss | G06F 8/71 |

OTHER PUBLICATIONS

Zacharias, Dona, AI Infrastructure as Code—Automating AI Model Deployment and Scaling in Cloud Environments @iTcart, Nov. 4, 2025 (Year: 2025).*

Cho, Alex, What is Autonomous Infrastructure: A Complete Guide to Self-Operating Cloud Systems StackGen, Sep. 25, 2025 (Year: 2025).*

Mao, Lu, Evaluating LLMs for infrastructure as code Medium, Feb. 11, 2025 (Year: 2025).*

Vaslleiou, Zoe et al., A knowledge-based approach for guided development of Infrastructure as Code Software and Systems Modeling, Apr. 21, 2025 (Year: 2025).*

* cited by examiner

AI-DRIVEN ADAPTIVE SYSTEMS INTELLIGENCE FOR ENTERPRISE IT ENVIRONMENTS

CROSS-REFERENCE TO RELATED APPLICATIONS

This application claims the benefit of, and priority to, U.S. Provisional Patent Application No. 63/878,555 filed on Sep. 9, 2025. The content of the above-identified application is herein incorporated by reference in its entirety.

TECHNICAL FIELD

This disclosure is directed to the fields of artificial intelligence and information technology (IT) systems. This disclosure describes, inter alia, improved systems, methods, and techniques for integrating artificial intelligence (AI) systems with enterprise IT environments to automate intelligence and adaptive control functionalities within the environments.

BACKGROUND

Enterprise information technology (IT) environments are inherently complex, comprising vast networks of heterogeneous applications, distributed data repositories, and a multitude of interconnected services that operate across on-premises, cloud, and edge infrastructures. In many scenarios, these environments are structured into multiple functional layers, including infrastructure, security, identity management, data management, applications, and governance. Each of these layers is typically associated with its own set of specialized services, which include various types of interconnected subsystems and protocols. The interplay between these layers, combined with the need to coordinate diverse technologies, data formats, and operational requirements, creates significant challenges in maintaining seamless integration, consistent performance, and robust compliance.

Managing IT enterprise environments presents substantial challenges, particularly when integrating new enterprise services or deploying new workflows. These tasks often require a deep understanding of how each functional layer is implemented, where critical data resides, and how various services interact across the ecosystem. For example, introducing a new application or service may necessitate modifications to security protocols, updates to identity management systems, or changes to data storage configurations, each of which can have cascading effects throughout the environment. Even seemingly straightforward operations, such as updating existing services to incorporate new security measures or revised data schemas, frequently demand coordinated changes across multiple layers. This complexity not only increases the risk of configuration errors and service disruptions but also places a significant burden on IT personnel to maintain up-to-date knowledge of the entire enterprise architecture.

Currently, the management of enterprise IT environments, including the integration of new services and the modification of existing workflows, is largely performed by teams of IT specialists who rely on manual processes and institutional knowledge. These teams are responsible for coordinating changes across multiple layers, ensuring compatibility among diverse systems, and maintaining compliance with organizational policies and regulatory requirements. However, this approach is resource-intensive and time-consuming, often requiring extensive planning, cross-functional collaboration, and iterative testing before changes can be safely implemented. The manual nature of these processes makes them susceptible to human error, increases the likelihood of misconfigurations, and can result in prolonged service disruptions or delays in deploying critical updates. As enterprise environments continue to grow in scale and complexity, these challenges have become even harder.

Effectively managing an enterprise IT environment involves navigating a wide range of technical and operational challenges that can impact efficiency, reliability, and scalability.

One significant challenge arises from the limitations of traditional monitoring tools, which are often reactive in nature and operate in isolated silos. These point solutions generally focus on monitoring specific layers, components, or services within the IT environment, rather than providing a unified, end-to-end perspective of the entire ecosystem. As a result, organizations lack the ability to correlate data and events across different domains, making it difficult to identify patterns, dependencies, or emerging risks that span multiple areas of the environment. This lack of cross-domain visibility and contextual understanding can hinder timely adaptation to changes in workloads, policy requirements, or threat landscapes, ultimately delaying effective remediation and optimization efforts.

Moreover, the persistent complexity and heterogeneity of enterprise IT environments can create ongoing challenges for organizations. Enterprises frequently operate hundreds or thousands of applications, multiple databases and data formats, and geographically dispersed resources. Architectural choices, dependency management, and cross-layer coordination can be difficult to design and maintain at scale, increasing operational overhead and the likelihood of configuration drift.

Additionally, the reliance on human decision-making introduces inefficiencies and inconsistency. High-level architecture, data models, schemas, storage tiers, and integration patterns are commonly selected and maintained by human experts using static frameworks and institutional knowledge. As environments evolve, assumptions underlying those decisions may become outdated, leading to suboptimal performance, cost inefficiencies, and increased risk of human error.

Additional challenges arise when organizations seek to optimize data storage and management. Balancing cost, latency, accessibility, quality, security, and compliance across the storage needs of the enterprise often involves trade-offs that vary over time and across use cases. Selecting appropriate storage methods, geographic locations, access controls, and schemas can be challenging without comprehensive, current insight into access patterns, usage frequency, and data quality attributes.

Further challenges can arise with respect to managing system integrations, particularly during mergers, acquisitions, or major platform transitions. Disparate schemas, incompatible interfaces, and conflicting security or governance policies complicate consolidation efforts. Data migration and service rationalization projects are lengthy, resource-intensive, and prone to service disruption.

Additional challenges can be attributed to the construction and maintenance of data and service workflows within the enterprise IT systems. Typically, workflow pipelines and service orchestration are built manually by IT specialists, which can be labor-intensive and time-consuming. Additionally, implementing changes can be challenging as the pipelines and services are sensitive to schema or API changes, and often require significant ongoing maintenance. Fragmentation across tools and environments can lead to redundant work, inconsistent patterns, and delayed delivery of new capabilities.

Other challenges can be attributed to implementing governance, security, and compliance protocols within the enterprise IT environments and managing these protocols on an ongoing basis. Evolving regulations and threat landscapes require continuous monitoring, policy enforcement, and audit-ready reporting. The manual or semi-automated processes employed by currently available solutions often result in inconsistent application of controls, slower response to incidents, and increased audit effort.

The background description provided herein is for the purpose of presenting the context of the disclosure. The materials described in this section are not prior art to the claims in this application and are not admitted to be prior art, or suggestions of the prior art.

BRIEF DESCRIPTION OF DRAWINGS

To facilitate further description of the embodiments, the following drawings are provided, in which like references are intended to refer to like or corresponding parts, and in which.

Figure 1A:
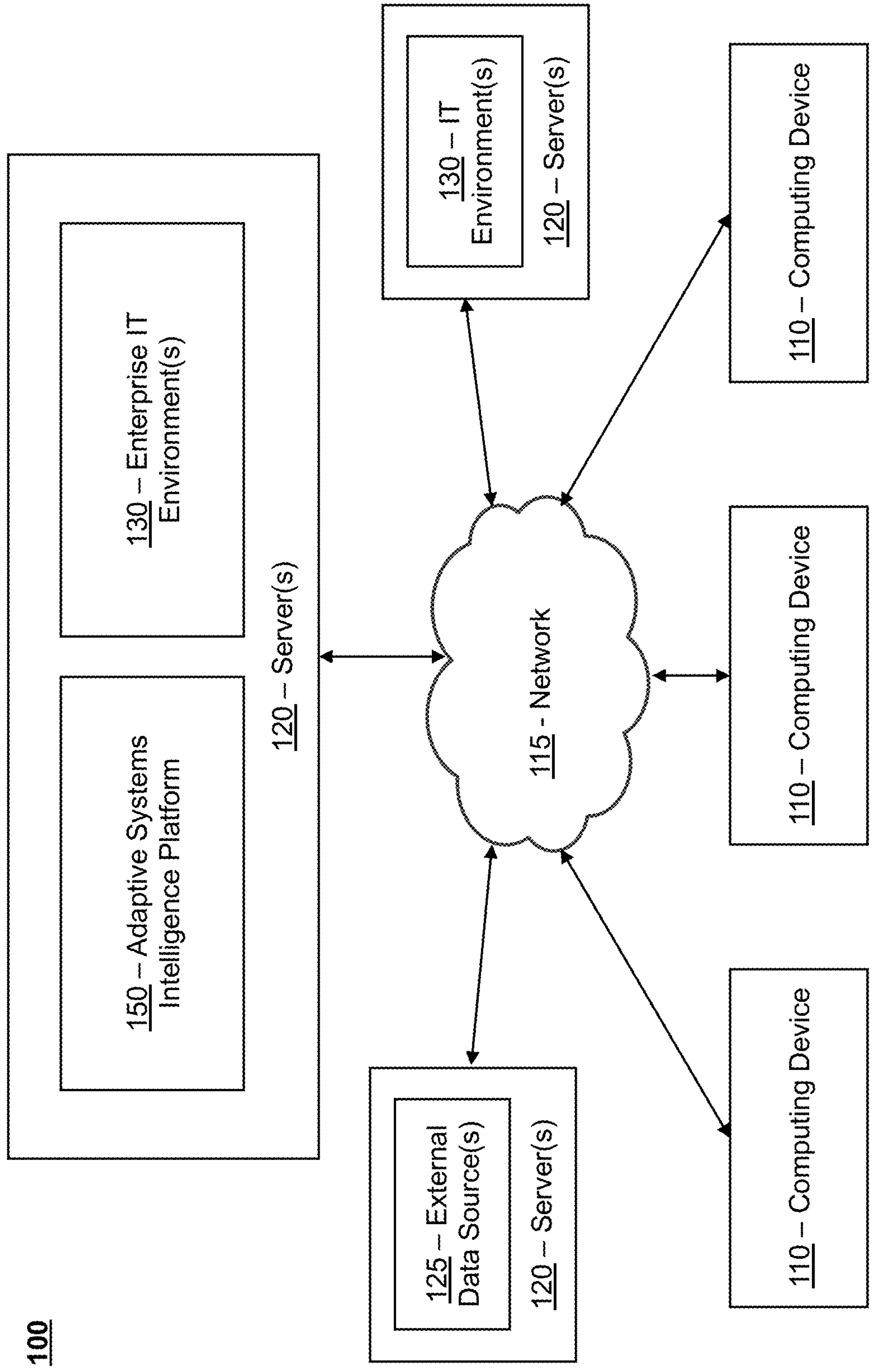
FIG. 1A is a network diagram of an exemplary system for implementing adaptive systems intelligence within an enterprise IT environment in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or a minimal humanly perceptible delay. Alternatively, these terms can refer to data or functions that are processed within a specific time interval (e.g., in the order of milliseconds).

DETAILED DESCRIPTION

The present disclosure relates to systems, methods, apparatuses, computer program products, and techniques for intelligently monitoring and dynamically adapting enterprise IT systems.

This disclosure introduces a new category of artificial intelligence (AI), referred to as adaptive systems intelligence (ASI), that can be integrated within enterprise IT systems to enhance their intelligence, adaptiveness, and automation capabilities. Amongst other things, these ASI technologies can increase the capacity of enterprise systems to autonomously sense, learn, and evolve in response to dynamic digital environments, user behaviors, and operational demands, all without direct human intervention. Unlike traditional enterprise solutions, which often lack automation and provide only limited, siloed visibility into system-wide operations, adaptive systems intelligence enables a unified, proactive, and holistic approach to enterprise IT management across the entire digital ecosystems within enterprise environments.

Certain portions of this disclosure describe an adaptive systems intelligence platform that can be integrated with an enterprise IT environment to achieve some or all of the following capabilities:

- Self-awareness Capabilities: The ability of the platform to continuously monitor the performance, security posture, and/or resource utilization across the environment to maintain optimal operation and identify potential issues in real time.
- Contextual Learning Capabilities: The ability of the platform to leverage real-time data from networks, devices, and/or users to dynamically optimize outcomes and adapt to changing conditions within the digital ecosystem.
- Predictive Adaptation Capabilities: The ability of the platform to anticipate future requirements, such as scaling infrastructure in advance of demand spikes or proactively addressing vulnerabilities, thereby reducing risk and improving operational efficiency.
- Cross-Domain Reasoning Capabilities: The ability of the platform to integrate and correlate insights from multiple domains, including cybersecurity, DevOps, user experience, business logic, and/or other relevant areas, to support holistic and well-informed decision-making.

Ethical Reflexivity Capabilities: The ability of the platform to incorporate ethical considerations into automated or autonomous processes, including the ability to detect and mitigate algorithmic bias and ensure privacy-aware data handling, to align with regulatory and organizational standards.

In certain embodiments, the ASI platform can include a metadata integration system, an autonomous intelligence engine, and an adaptive control engine that are integrated in a connected framework to achieve some or all of the aforementioned capabilities and/or other capabilities described throughout this disclosure.

The metadata integration system can operate as the foundational layer of the ASI platform, facilitating the collection, aggregation, and/or management of metadata across an enterprise IT environment. The system can be designed to continuously ingest metadata from a wide range of internal and external sources, including various architecture layers, enterprise services, and third-party systems. The system consolidates this metadata into a unified, multi-layer metadata hub, enabling downstream components to access comprehensive, up-to-date information about system configurations, data flows, user activities, and/or operational events. By providing a centralized, structured repository of metadata across the various architecture layers, services, and domains within the enterprise system, the metadata integration system supports various downstream operations, including those that involve real-time monitoring, contextual analysis, and the automation of intelligence and adaptive control functions throughout the enterprise IT ecosystem.

The autonomous intelligence engine can function as an intelligence layer within the ASI platform, utilizing metadata collected in the multi-layer metadata hub to synthesize and generate insights across the enterprise IT environment. This engine can be configured to continuously monitor and analyze metadata to produce both ecosystem-level intelligence and more targeted intelligence, such as for specific enterprise services, user activities, anomalous events, etc. The autonomous intelligence engine can operate independently of manual intervention, enabling real-time, data-driven decision-making and supporting the implementation of adaptive controls within the enterprise system by providing actionable intelligence to other components of the platform. This engine facilitates proactive management, ongoing optimization, and enhanced resilience of enterprise IT systems by delivering timely and relevant analytics and recommendations.

The adaptive control engine can serve as the action or deployment layer of the ASI platform, responsible for implementing changes, optimizations, and updates within the enterprise IT environment based on intelligence and insights generated by the autonomous intelligence engine and other system components. The engine can be configured to execute adaptive actions, either autonomously or in response to human approvals, such as deploying, modifying, and/or retiring workflow pipelines, updating configurations, and enforcing policies across multiple domains and architecture layers. The adaptive control engine enables dynamic adaptation to evolving operational conditions, supports cross-domain decision-making, and helps maintain ongoing resilience, efficiency, and compliance within the enterprise IT ecosystem.

Amongst other things, the adaptive control engine can integrate a workflow deployment system that is configured to automate the construction, modification, and deployment of workflow pipelines and solutions within the enterprise IT environment. In response to receiving requests to modify or deploy changes within the enterprise IT environment, the workflow deployment system can generate or assemble automated workflow deployment specifications, which can include step-by-step deployment plans to implement the objectives or target changes identified in the requests. These workflow deployment specifications can include a sequenced ordering of workflow deployment tasks, which are tailored or customized based on system objectives, metadata, and intelligence provided by other components of the ASI platform, to autonomously deploy the target changes in the enterprise IT environment. By streamlining and automating the deployment process, the workflow deployment system enables rapid adaptation to changing business requirements, efficient resource allocation, and consistent enforcement of operational policies throughout the enterprise IT ecosystem.

The ASI platform can further incorporate an AI system comprising a collection of learning models, including, but not limited to, inference models, large language models (LLMs), and/or various machine-learning (ML) models, that are specially configured and trained to support intelligent monitoring, contextual analysis, adaptive decision-making, and automated control functions across the enterprise IT environment. As explained throughout this disclosure, the various components of the ASI platform, including the metadata integration system, the autonomous intelligence engine, the adaptive control engine, and the workflow deployment system, can leverage these models to enhance their respective functionalities.

In some examples, the metadata integration system can leverage one or more learning models of the AI system to analyze collected metadata, supplement the metadata with enhanced metrics and scoring matrices, identify patterns or anomalies, and/or enrich metadata with additional attributes that support downstream intelligence, automation, and optimization functions within the enterprise IT environment.

In further examples, the autonomous intelligence engine can leverage the learning models in the AI system to synthesize insights from metadata, perform advanced analytics such as anomaly detection and risk assessment, generate key performance indicators, and support real-time, data-driven decision-making across the enterprise IT environment.

In yet further examples, the adaptive control engine and/or its workflow deployment system can leverage the learning models in the AI system to autonomously generate, customize, and optimize workflow deployment specifications, select and adapt infrastructure-as-code artifacts, orchestrate the execution of workflow steps, and deploy targeted changes within enterprise IT environments.

Collectively, the various AI models integrated throughout the ASI platform enable advanced intelligence and automation capabilities across the entire platform and permit the platform to continuously adapt to evolving operational conditions in enterprise IT environments.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature, and/or component referenced in this disclosure can be implemented in hardware and/or software.

Exemplary Networks, Systems & Implementations

Figure 1B:
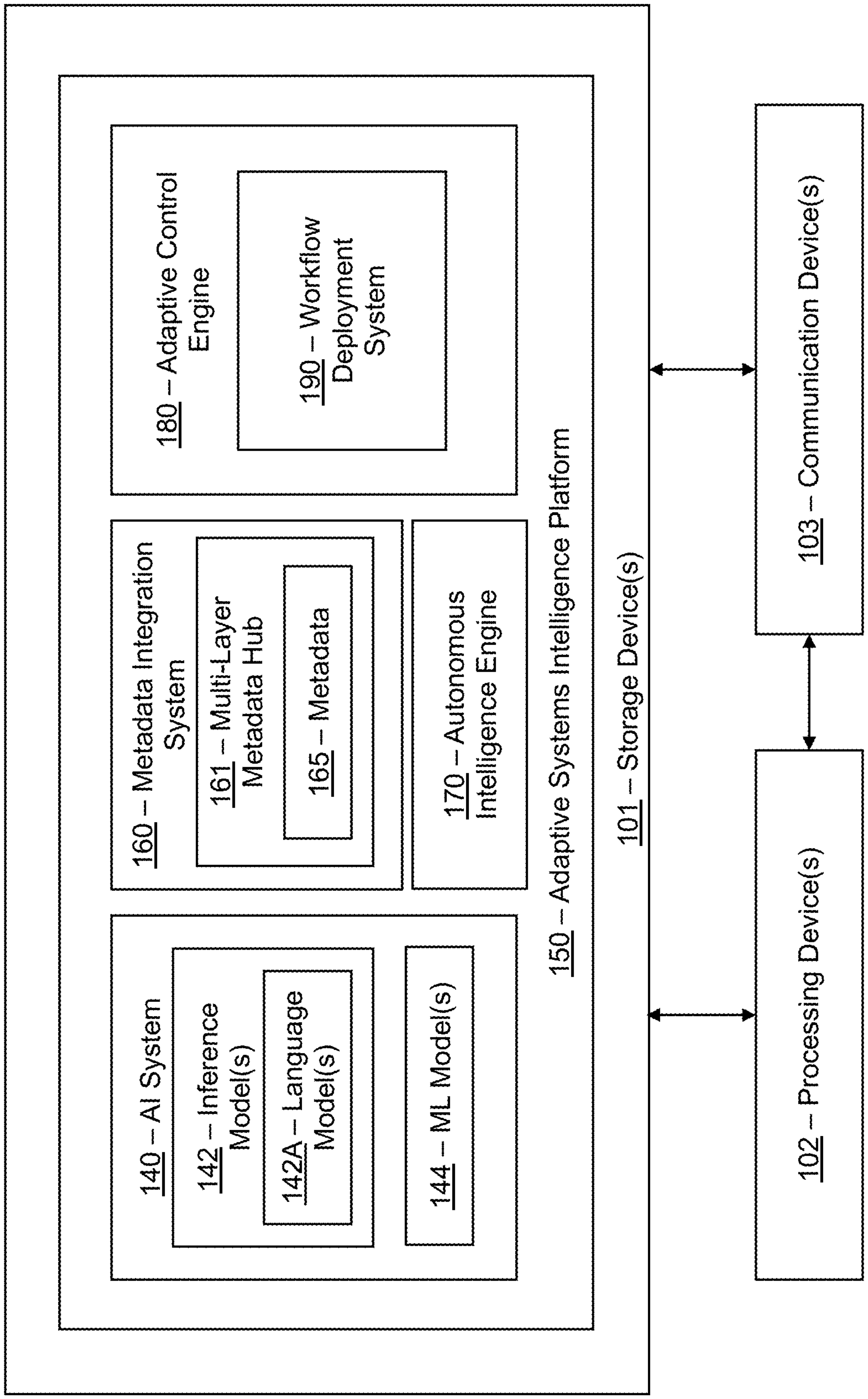
FIG. 1B is a block diagram illustrating exemplary components, features, and functions associated with an adaptive systems intelligence platform in accordance with certain embodiments.

FIG. 1A is a diagram of an exemplary system 100 in accordance with certain embodiments. FIG. 1B is a diagram illustrating exemplary components, features, and/or functions associated with an adaptive systems intelligence (ASI) platform 150 according to certain embodiments.

The system 100 comprises, inter alia, one or more computing devices 110, one or more servers 120, and/or one or more external data sources 125. The ASI platform 150 is stored on, and executed by, the one or more servers 120. One or more enterprise information technology (IT) environments 130 also are hosted on one or more servers 120, which can include the same servers 120 that host the ASI platform 150 and/or separate servers 120. The one or more external data sources 125 also can be hosted on one or more servers 120, which can be servers 120 that are separate or external to the servers that host the ASI platform 150.

Each of the one or more computing devices 110, one or more servers 120, one or more enterprise IT environments 130, one or more external data sources 125, and/or ASI platform 150 are in communication with each other over a network 115. The network 115 may represent any type of communication network, e.g., such as one that comprises a local area network (e.g., a Wi-Fi network), a personal area network (e.g., a Bluetooth network), a wide area network, an intranet, the Internet, a cellular network, a television network, a satellite communication network, and/or other types of networks.

All the components illustrated in FIG. 1A, including the computing devices 110, servers 120, enterprise IT environments 130, external data sources 125, and ASI platform 150, can be configured to communicate directly with each other and/or over the network 115 via wired or wireless communication links, or a combination of the two. Each of the computing devices 110, servers 120, enterprise IT environments 130, external data sources 125, and ASI platform 150 can include one or more storage devices 101, one or more processing devices 102, and/or one or more communication devices 103.

The one or more storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more storage devices 101 include physical, non-transitory mediums. The one or more computer storage devices 101 can store, inter alia, instructions for implementing any of the functionalities associated with the ASI platform 150 described in this disclosure.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices 101 including, but not limited to, instructions associated with executing the functionalities of the ASI platform 150.

Each of the one or more communication devices 103 can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices 103 also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices 103 additionally, or alternatively, can include one or more modem devices, one or more router devices, one or more access points, and/or one or more mobile hot spots. For example, modem devices may enable the computing devices 110, servers 120, enterprise IT environments 130, external data sources 125, and/or ASI platform 150 to be connected to the Internet and/or other network. The modem devices can permit bi-directional communication between the Internet (and/or other network) and the computing devices 110, servers 120, enterprise IT environments 130, external data sources 125, and/or ASI platform 150. In certain embodiments, one or more router devices and/or access points may enable the computing devices 110, servers 120, enterprise IT environments 130, external data sources 125, and/or ASI platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hotspot may enable the computing devices 110, servers 120, enterprise IT environments 130, external data sources 125, and/or ASI platform 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), gaming consoles, and/or other types of electronic devices.

The one or more servers 120 may generally represent any type of electronic device, including any of the computing devices 110 mentioned above. The one or more servers 120 also can comprise one or more mainframe computing devices, one or more virtual servers, one or more application servers, and/or one or more cloud-based servers. In some embodiments, the one or more servers 120 can be configured to execute web servers and can communicate with the computing devices 110, enterprise IT environments 130, external data sources 125, and/or ASI platform 150, and/or other devices over the network 115 (e.g., over the Internet).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For example, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of be mounted to, worn by, and/or fixed to an individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise a head mountable wearable user computer device (e.g., one or more head mountable displays, one or more eyeglasses, one or more contact lenses, one or more retinal displays, etc.) and/or a limb mountable wearable user computer device (e.g., a smart watch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the ASI platform 150 can be stored on, and executed by, the one or more servers 120, and the one or more computing devices 110 can enable users to access the ASI platform 150 over the network 115 (e.g., over the Internet via a web browser application or a local application installed on the computing devices 110). Additionally, or alternatively, the ASI platform 150 can be stored on, and executed by, the one or more computing devices 110. Thus, in some embodiments, the ASI platform 150 can be stored as a server application on one or more servers 120 and, in other embodiments, can be stored as a local application on a computing device 110 or integrated with a local application stored on a computing device 110.

Additionally, in some embodiments, the ASI platform 150 can be implemented as a combination of a front-end application (e.g., which is stored on a computing device 110) and a back-end application (e.g., which is stored on one or more servers 120). All functionalities of the ASI platform 150 described herein can be executed by the front-end application, the back-end application, or a combination of both.

In some embodiments, the ASI platform 150 can be a standalone system, e.g., that operates as a web application or platform, software-as-a-service (SaaS) platform, and/or other type of software-based system to provide the functionalities described herein. Additionally, or alternatively, the ASI platform 150 also can be integrated with, or incorporated as part of, a system or application stored on the computing device 110 or server 120, to implement the techniques and functions described herein. In certain embodiments, the ASI platform 150 can be integrated with (or can communicate with) various applications, systems, or platforms, including, but not limited to, enterprise system management applications and/or other applications that are stored on a computing device 110 and/or a server 120. Thus, in some examples, the ASI platform 150 may provide a set of functionalities that are incorporated as part of a larger software application, system, or platform, which also performs additional functions beyond those associated with the ASI platform 150.

As shown in FIG. 1B, the ASI platform 150 can include, inter alia, an AI system 140, a metadata integration system 160, an autonomous intelligence engine 170, and an adaptive control engine 180 that includes a workflow deployment system 190. While certain portions of this disclosure may describe these components separately for ease in describing particular features or capabilities of the ASI platform 150, it should be understood that the functionalities associated with these components may be combined, grouped, or integrated in various ways (e.g., they may be arranged in the same or separate programs, applications, modules, routines, or functions). Accordingly, any functionality described for one component may also be performed by, or integrated with, any other component described herein.

As explained throughout this disclosure, the ASI platform 150 provides an integrated, AI-driven framework for autonomously managing, optimizing, and/or orchestrating one or more enterprise IT environments 130. In certain embodiments, the ASI platform 150 can operate as a global system controller that leverages a suite of artificial intelligence and machine learning models to monitor operations across the various architecture layers and enterprise services within an enterprise IT environment 130, and automate the provisioning and deployment of various actions and measures within the environment.

The metadata integration system 160 of the ASI platform 150 can continuously collect, analyze, and synthesize metadata across multiple layers and services within the enterprise IT environment 130, and store this multi-layer metadata in a metadata hub that is made accessible to interconnected AI-powered systems that derive intelligence, perform real-time monitoring, and automate the deployment of workflows and/or execution of other actions within the enterprise IT environments 130.

Figure 2:
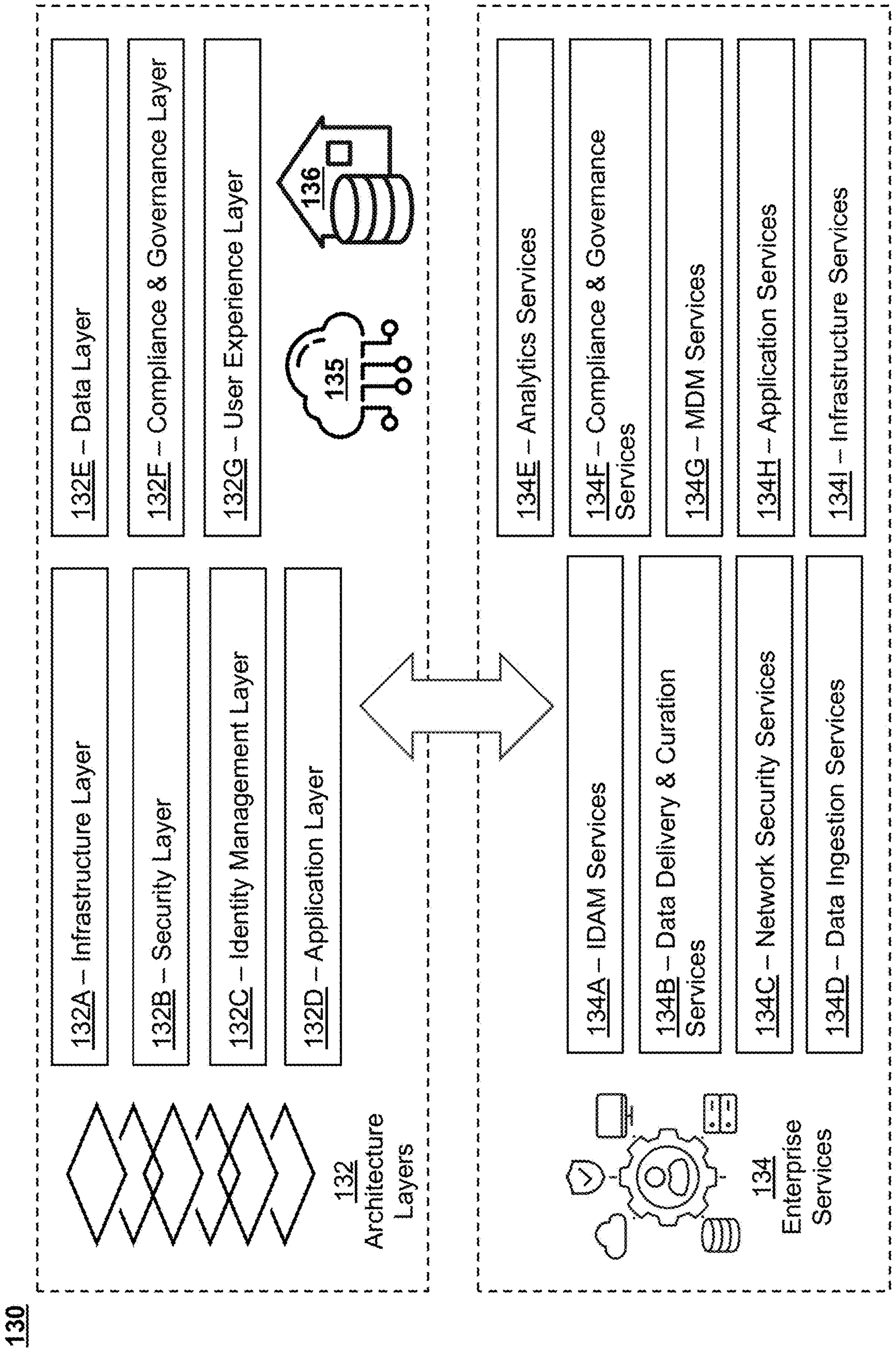
FIG. 2 is a diagram illustrating exemplary architecture layers and enterprise services within an enterprise IT environment in accordance with certain embodiments.

The comprehensive metadata collected by the metadata integration system 160 can extend to any architecture layer, any enterprise service, any data source, and/or any activity or event within the enterprise IT environment 130. FIG. 2, which is discussed in further detail below, illustrates exemplary architecture layers and enterprise services from which the metadata can be accessed, collected, and stored. However, the metadata collected by the metadata integration system 160 is not limited to internal metadata sources within the enterprise IT environment, but rather can extend to various external data sources 125. For example, the metadata integration system 160 can communicate over the network 115 with one or more external data sources 125, such as third-party cloud services, external compliance databases, threat intelligence feeds, and/or industry benchmark repositories, to supplement the metadata that is collected and used by the ASI platform 150.

By integrating this "meta-fabric" across multiple enterprise layers and services (and, in some cases, external data sources 125), the autonomous intelligence engine 170 of the ASI platform 150 can autonomously generate intelligence throughout the entire enterprise IT environment 130 and implement real-time, enterprise-level monitoring functionalities, including functionalities for continuously assessing activities and behaviors of both users and system services, detecting anomalies within the environment, generating analytics to quantify and assess performance of various services and systems, and/or quantifying the performance of the enterprise system as a whole.

Additionally, the adaptive control engine 180 of the ASI platform 150 can utilize the collected metadata and derived intelligence to implement adaptive controls and cross-domain decision-making within the enterprise IT environment 130. In some examples, the metadata and/or corresponding intelligence derived therefrom can enable a workflow deployment system 190 associated with the adaptive control engine 180 to automate the deployment of new and/or modified workflow pipelines and solutions within the enterprise IT environment 130.

The AI system 140 of the ASI platform 150 can comprise a suite of AI models, such as one or more inference models 142, one or more language models 142A, one or more LLMs, one or more neural network models, and/or one or more machine-learning (ML) models 144, that are leveraged by the various components of the ASI platform 150, including the metadata integration system 160. autonomous intelligence engine 170, adaptive control engine 180, and/or workflow deployment system 190 to implement their respective functionalities. Amongst other things, these models can execute functionalities in furtherance of the intelligence, automation, and adaptive control functionalities provided by the ASI platform 150.

The functionalities of the ASI platform 150 represent a paradigm shift in enterprise IT intelligence—moving from traditional reactive approaches to proactive, self-adaptive approaches that enable enterprise IT systems to self-monitor performance and activities, and auto-deploy changes within their environments. The functionalities performed by the ASI platform 150 enable enterprise IT environments 130 to be resilient, self-optimizing, and self-adapting digital ecosystems.

By operating as a global enterprise monitoring and control system within an enterprise IT environment 130, the ASI platform 150 delivers a broad range of capabilities enhancing the intelligence, automation, and adaptive control of enterprise IT environments 130 that address and overcome many of the limitations inherent in traditional enterprise management systems, including those described above.

As demonstrated throughout this disclosure, the ASI platform 150 can be designed to support seamless integration with core enterprise services, facilitate cross-domain decision-making, and ensure ongoing compliance, security, and performance optimization. Through its improved architecture and integration with enterprise systems, the ASI platform 150 can deliver a unified solution for building resilient, self-optimizing, and self-adapting digital ecosystems that can scale across on-premises, cloud, and edge infrastructures.

As used throughout this disclosure, the terms "enterprise" or "enterprise IT environment" are intended broadly to refer to any information technology infrastructure or computing environment, regardless of size, complexity, or organizational context, and are not limited to systems implementing particular business processes or sophisticated architectures.

The system configurations described herein are provided as examples to demonstrate environments in which the embodiments described herein can be deployed. Numerous modifications and variations to the disclosed embodiments are possible, and the techniques described herein can be implemented in many other contexts and environments.

Exemplary Embodiments of the Metadata Integration System

The metadata integration system 160 serves as the intelligent backbone of the adaptive systems intelligence platform 150, facilitating the comprehensive collection and management of metadata 165 across the enterprise IT environment 130. As explained below, the metadata integration system 160 can be designed to continuously collect, aggregate, and synthesize metadata from a wide array of sources, including both internal data sources spanning across the diverse architecture layers and enterprise services within the environment 130 and various external data sources 125. By integrating this metadata into a unified multi-layer metadata hub 131, the metadata integration system 160 enables the ASI platform 150 to derive intelligence both at a global ecosystem-wide level and within specific domains of the digital environment (e.g., identity management, data delivery, security, compliance, infrastructure, etc.), and leverage this metadata and intelligence to implement adaptive control functionalities with the enterprise IT environment 130.

Among other benefits, the metadata integration system 160 overcomes the limitations of siloed intelligence in existing enterprise systems by consolidating metadata from diverse systems and services. With most traditional enterprise frameworks, intelligence and operational data are often isolated within individual departments, applications, or technology stacks, making it difficult to achieve a comprehensive view of the entire environment or coordinate actions across domains. In contrast, the unified metadata integration approach employed by the ASI platform 150 enables seamless cross-domain visibility and coordination throughout the enterprise IT environment.

Additionally, the metadata integration system 160 significantly enhances decision-making by providing downstream AI-powered components with contextualized metadata 165. This comprehensive metadata foundation allows intelligent automation systems to access relevant information from across the enterprise, enabling adaptive control and continuous optimization of workflows, resources, and/or policies. By delivering timely and accurate insights, the system empowers organizations to make informed decisions, respond proactively to changing conditions, and/or implement improvements that drive operational efficiency and resilience.

Moreover, the metadata integration system 160 supports both real-time and historical analysis, providing organizations with the ability to continuously track changes, monitor trends, and evaluate the impact of operational decisions over time. This capability enables the ASI platform 150 to identify emerging patterns, anticipate potential issues, and/or adapt strategies to evolving business requirements. By maintaining a comprehensive and up-to-date repository of metadata 165, the system ensures that decision-makers have access to the insights needed for proactive management and long-term planning.

These and other advantages associated with the metadata integration system 160 are described throughout this disclosure.

Figure 3A:
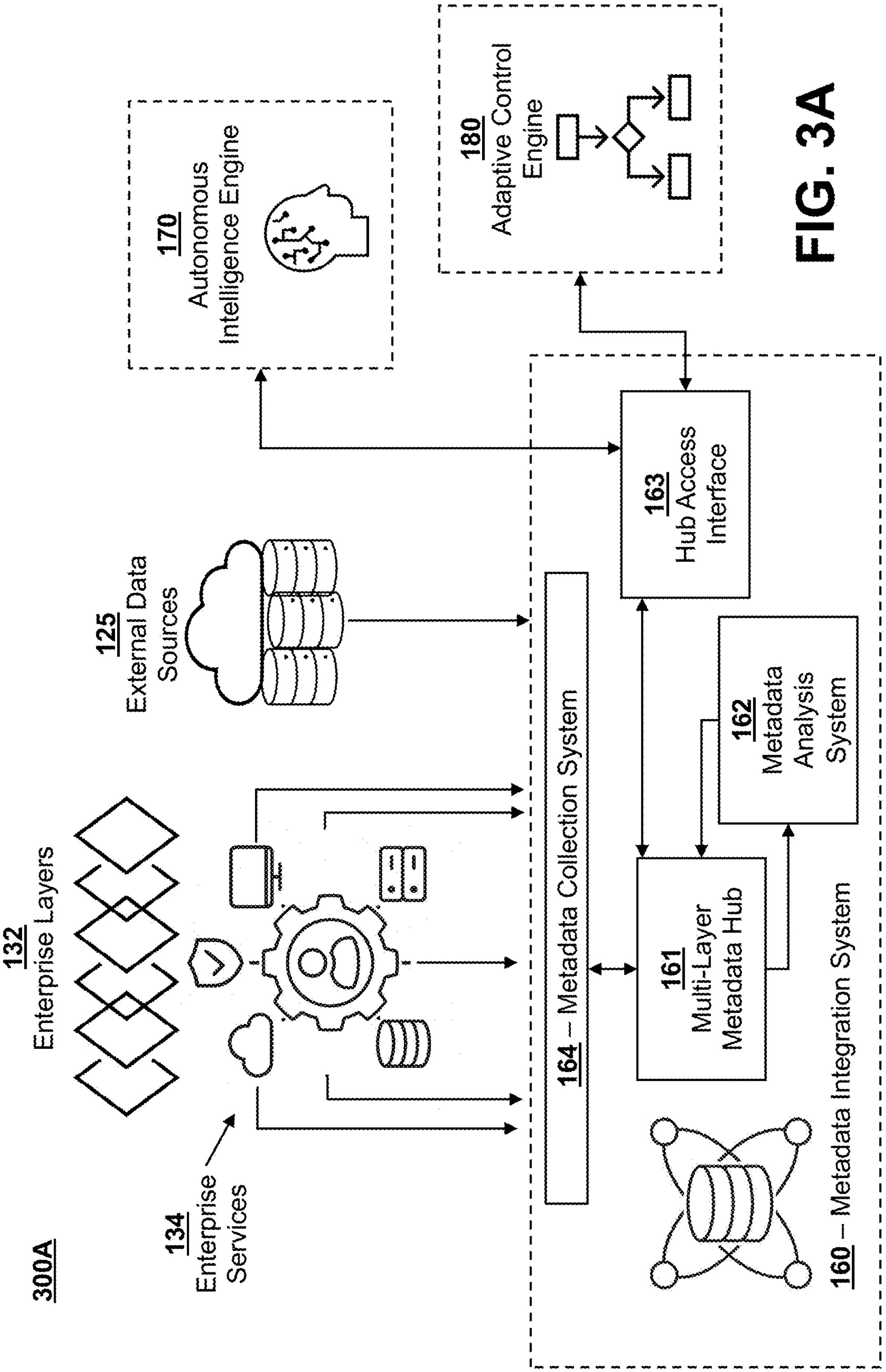
FIG. 3A is a block diagram illustrating an exemplary architecture of a metadata integration system in accordance with certain embodiments.

FIG. 3A illustrates an exemplary architecture 300A of a metadata integration system 160 according to certain embodiments. In this exemplary architecture 300A, the metadata integration system 160 can include a multi-layer metadata hub 161, a metadata analysis system 162, a hub access interface 163, and a metadata collection system 140.

The multi-layer metadata hub 161 can represent a master source of metadata 165 that integrates and unifies the metadata 165 across an enterprise IT environment 130 in a single location. The metadata 165 stored in the multi-layer metadata hub 161 can be accessed by the autonomous intelligence engine 170, adaptive control engine 180, workflow deployment system 190, and/or other components of the ASI platform 150 to facilitate their respective functionalities. In some embodiments, the multi-layer metadata hub 161 can comprise a single database or repository that stores all the metadata 165 and/or can include a collection of interconnected databases or repositories that collectively store the metadata 165.

The metadata 165 that is collected and aggregated in the multi-layer metadata hub 161 can include a diverse range of metadata 165 that is collected from both internal sources within the enterprise IT environment 130 and external data sources 125 that are in communication with the ASI platform 150 over a network 115.

In certain embodiments, the metadata integration system 160 can incorporate a metadata collection system 140 comprising functions, applications, and/or systems that are designed to facilitate the collection of metadata from both the internal data sources and external data sources 125. The metadata collection system 140 may utilize various techniques to access, obtain, and/or retrieve the metadata.

In certain embodiments, the metadata collection system 164 can include mechanisms for scanning, crawling, and/or reading data stores at regular intervals to capture attributes about stored data. In some examples, AI-powered or LLM-powered metadata crawling functions or agents may be employed to systematically scan the enterprise environment or portions thereof, and collect relevant metadata across multiple layers and services. Additionally, or alternatively, the metadata collection system 164 can leverage API-based access methods to retrieve subsets of metadata using application programming interfaces (APIs) associated with specific architecture layers, enterprise services, and/or external data sources 125. Additionally, or alternatively, the metadata collection system 164 can employ web hook and/or scheduled polling techniques to access the metadata 165 across the architecture layers, enterprise services, and/or external data sources 125. Manual extraction or collection of metadata may also be utilized in scenarios where automated methods are not feasible or where specialized expertise is required. Other metadata collection techniques also may be employed.

The metadata collection system 164 can collect and aggregate data from any internal source within the enterprise IT environment 130. In some examples, the internal sources may include databases, data warehouses, data lakes, application servers, network devices, and/or other infrastructure components that generate or store operational metadata. These sources can provide a wealth of information about system configurations, data flows, user activities, security events, and service performance. By systematically accessing and integrating metadata from these internal sources, the metadata collection system 164 enables the ASI platform 150 to maintain a comprehensive and up-to-date view of the enterprise ecosystem, supporting intelligent monitoring, optimization, and adaptive control across all layers and services.

The metadata collection system 164 can be designed to collect and aggregate data from any external data source 125 outside the enterprise IT environment 130. In some examples, the external data sources 125 may include third-party cloud platforms, external compliance databases, threat intelligence feeds, industry benchmark repositories, partner system integrations, and/or public or consortium data repositories. These external data sources 125 can provide valuable context, supplemental insights, and up-to-date information on regulatory changes, security threats, industry standards, and collaborative activities. By integrating metadata from these external sources, the metadata collection system 164 enhances the ASI platform's ability to deliver comprehensive intelligence, maintain ongoing compliance, and adapt to evolving business and technology landscapes.

In addition to collecting metadata 165 from the internal and external sources described above, the metadata collection system 164 also can collect, aggregate, and store metadata 165 corresponding to the components of the ASI platform 150, including the autonomous intelligence engine 170, adaptive control engine 180, and workflow deployment system 190. In some examples, the metadata collection system 164 may collect operational logs, evolving intelligence metrics, decision records, adaptation triggers, policy enforcement actions, workflow execution histories, and/or performance metrics generated by these components. This metadata can provide valuable insights into the intelligence, decision-making, and automation activities performed by the ASI platform 150, supporting traceability, auditability, and continuous improvement of adaptive operations within the enterprise IT environment. By systematically capturing and integrating this metadata, the metadata collection system 164 can provide a comprehensive and transparent record of all actions and outcomes associated with the platform's intelligent automation capabilities.

In certain embodiments, the metadata collection system 164 also can collect, aggregate, and store metadata 165 corresponding to its own metadata integration system 160. In some examples, this may include metadata 165 related to the performance and health of the metadata collection processes, such as collection frequency, data source connectivity status, error and exception logs, data ingestion volumes, processing times, and system resource utilization. Additional metadata may encompass configuration changes, update histories, access logs, and audit trails documenting interactions with the metadata integration system. By capturing this self-referential metadata, the system can support ongoing monitoring, diagnostics, and optimization of its own operations, ensuring reliability, transparency, and continuous improvement in the management of enterprise metadata.

In certain embodiments, the metadata integration system 160 also can include a metadata analysis system 162, which is configured to derive additional insights, metrics, and/or enhanced metadata by analyzing and processing the collected metadata from across the enterprise IT environment 130, external data sources 125, and/or ASI platform 150. This additional or enhanced metadata generated by the metadata analysis system 162 can be stored in the multi-layer metadata hub 161 along with the collected metadata 165, and both can be made accessible to the various components of the ASI platform 150.

In certain embodiments, the metadata analysis system 162 can be configured to generate a scoring matrix (or multiple scoring matrices) that quantitatively assesses key attributes of data and services within the enterprise IT environment 130 based on the metadata 165 stored in the multi-layer metadata hub 161. In some examples, the metadata analysis system 162 may assign scores to various data elements, services, and/or other environment features, such as scores that quantify or indicate the activity level, cost, quality, access patterns, usage frequency, security, and/or compliance, which can be stored in the scoring matrices to provide a comprehensive evaluation of various data sources and/or services. These scores can be leveraged by downstream components of the ASI platform 150 to inform and optimize intelligence and decision-making processes, such as identifying which data should be moved, transformed, archived, or integrated, and determining the most efficient storage solutions or workflow pipelines to deploy. By continuously updating the scoring matrices in response to real-time changes in the IT ecosystem, the metadata analysis system 162 enables dynamic, automated optimization of data management, integration, and service orchestration.

Additional details relating to how these scoring matrices can be generated and utilized are described below with reference to FIG. 3C.

The hub access interface 163 can be configured to facilitate and manage access to the multi-layer metadata hub 161. In certain embodiments, the hub access interface 163 can support a variety of access methods, such as API endpoints, graphical user interfaces, and/or automated service integrations, allowing seamless interaction with the multi-layer metadata hub 161 from different components, systems, and/or applications.

In some examples, the autonomous intelligence engine 170, adaptive control engine 180, workflow deployment system 190, and/or other components of the ASI platform 150 can utilize the hub access interface 163 to access and interact with the multi-layer metadata hub 161. By leveraging the interface, these systems may query and retrieve relevant metadata needed to perform real-time monitoring, derive actionable intelligence, and implement adaptive control measures across the enterprise IT environment. The hub access interface 163 enables these components to seamlessly integrate metadata-driven insights into their respective operations, supporting automated decision-making, workflow orchestration, and continuous optimization. This streamlined access ensures that each system can respond dynamically to changing conditions, maintain compliance, and drive improvements in performance and resilience throughout the enterprise ecosystem.

In certain embodiments, the hub access interface 163 also may provide selective access to third-party systems or platforms, such as those affiliated with entities that wish to leverage the metadata resources and intelligence capabilities of the multi-layer metadata hub 161 to enhance their own enterprise IT environments or support collaborative operations. In some examples, a third-party system or platform with integrated ASI technologies can leverage the metadata 165 stored in the multi-layer metadata hub 161 to initially configure and/or enhance their own enterprise IT environments, optimize system integrations, and support collaborative workflows and decision-making processes.

FIG. 3A demonstrates one exemplary architecture of the metadata integration system 160, highlighting its ability to collect, analyze, and manage metadata 165 from a wide variety of sources within and beyond the enterprise IT environment. By integrating components such as the multi-layer metadata hub 161, metadata analysis system 162, hub access interface 163, and metadata collection system 140, the architecture supports comprehensive intelligence, adaptive automation, and seamless integration across the enterprise ecosystem. The architecture's extensible design allows for seamless integration of additional metadata sources, types, and/or access methods, enabling it can be tailored to meet the evolving needs and objectives of diverse organizations and enterprises. This holistic approach to metadata management empowers enterprises to achieve greater operational efficiency, resilience, and agility in an increasingly complex digital landscape.

The discussion below, with reference to FIGS. 2, 3B, and 3C, further highlights the metadata capturing capabilities that can be integrated with various embodiments of the metadata integration system.

Figure 3B:
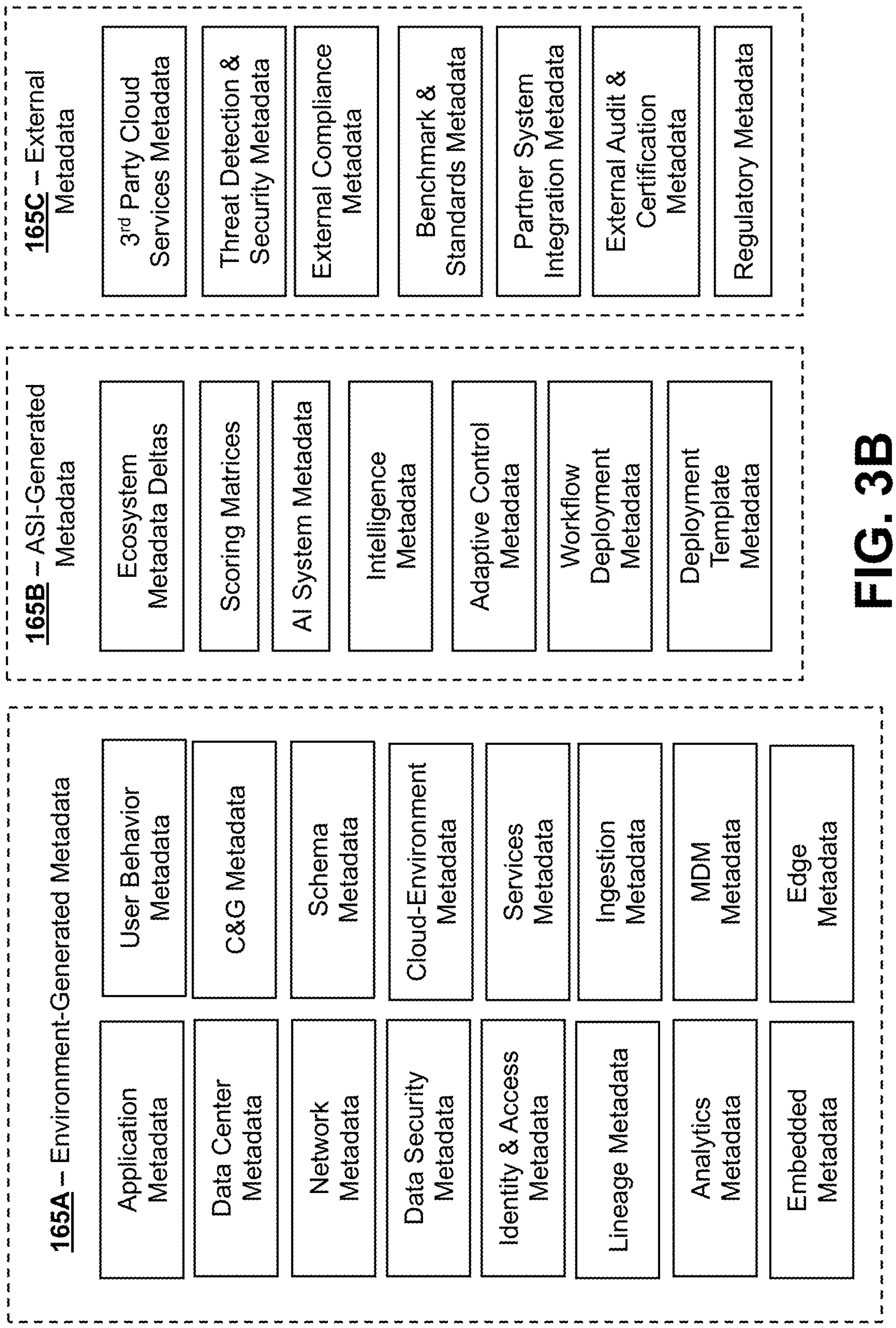
FIG. 3B is a block diagram illustrating exemplary categories of metadata that can be collected and stored by a multi-layer metadata hub in accordance with certain embodiments.

FIG. 3B is a block diagram illustrating exemplary categories of metadata 165 that can be stored and collected by the multi-layer metadata hub 161. These categories include environment-generated metadata 165A, ASI-generated metadata 165B, and external metadata 165C.

The environment-generated metadata 165A can generally include any metadata 165 that is generated within the enterprise IT environment 130, including, but not limited to, any or all metadata 165 that is generated by the enterprise services operating across multiple architectural layers of the ecosystem. In some examples, the environment-generated metadata 165A can comprise: application metadata; data center metadata; network metadata; data security metadata, identity and access metadata; analytics metadata; user behavior metadata; compliance and governance (C&G) metadata; schema metadata, cloud-environment; services metadata, ingestion metadata; master data management (MDM) metadata; embedded metadata; edge metadata; and/or many other types of metadata 165 originating from the with the enterprise IT environment. The description of FIG. 2, which is discussed below, illustrates exemplary architecture layers and enterprise services from which some or all of the aforementioned metadata 165 can be accessed.

In some examples, the embedded metadata may include data collected from embedded AI systems operating within the enterprise IT environment. Such embedded metadata can encompass information generated or processed by local AI models deployed on edge devices, microcontrollers, and/or other hardware. This may include, but is not limited to, real-time inference results, device-level decision logs, sensor data processed by on-device AI, event triggers, anomaly detection outcomes, and/or operational metrics such as latency, power consumption, and memory usage. The embedded metadata can further capture configuration parameters of the embedded AI models, firmware versions, update histories, and security or privacy status indicators reflecting on-device data handling. In addition, the metadata may record the context of AI-driven actions, such as autonomous responses in industrial automation, navigation decisions in robotics or drones, or health anomaly alerts from wearable devices. By integrating this embedded metadata, which may be sourced from technologies such as TinyML, edge AI frameworks (e.g., TensorFlow Lite, ONNX Runtime, NVIDIA Jetson, Intel OpenVINO), and specialized AI hardware (e.g., Google Coral, Apple Neural Engine), the system enables comprehensive visibility and traceability of AI-driven operations at the edge, supporting real-time monitoring, privacy assurance, and adaptive control across distributed enterprise environments.

In some examples, the edge metadata may include information collected from edge devices connected to the enterprise IT environment. This edge metadata can comprise operational data, status indicators, and contextual information generated by or associated with edge computing devices such as gateways, sensors, industrial controllers, and smart appliances. The edge metadata may capture device identifiers, network connectivity status, geolocation data, firmware and software versions, and resource utilization metrics such as CPU, memory, and storage usage. Additionally, the edge metadata can include logs of data transmissions between edge devices and central systems, event timestamps, error or exception reports, and security-related information such as authentication events and access control records. In certain embodiments, the edge metadata may also document the results of local data processing or analytics performed at the edge, including summaries of sensor readings, anomaly detection outcomes, and aggregated statistics. By collecting and integrating this edge metadata, the system can provide enhanced visibility into the performance, health, and security of distributed edge infrastructure, enabling real-time monitoring, rapid incident response, and optimized orchestration of resources across the enterprise IT environment.

The ASI-generated metadata 165B can generally include any metadata 165 that is generated or derived by the components of the ASI platform 150. This can include any metadata 165 that is capable of describing or derivable from the intelligence functionalities performed by the autonomous intelligence engine 170 and the decision-making and action-taking functionalities of the adaptive control engine 180 and/or workflow deployment system 190. This also can include enhanced or supplemental metadata 165 that is generated by the metadata analysis system 162 of the metadata integration system 160.

In some examples, the ASI-generated metadata 165B can comprise: ecosystem metadata deltas; scoring matrices; AI system metadata; intelligence metadata; adaptive control metadata; workflow deployment metadata; and/or pipeline development metadata.

The ecosystem metadata deltas can indicate changes in metrics or values for any of the environment-generated metadata 165A over one or more time periods. In certain embodiments, the ecosystem metadata deltas may be generated and continuously updated by the metadata analysis system 162 based on ongoing analysis of the collected environment-generated metadata 165A.

These ecosystem metadata deltas can provide a dynamic record of how key attributes (e.g., such as data access frequency, user activity levels, system performance metrics, security status, and/or other attributes) evolve within the enterprise IT environment. By capturing and analyzing these changes, the multi-layer metadata hub 161 enables organizations to monitor trends, detect anomalies, and assess the impact of operational decisions or external events over time. Ecosystem metadata deltas are essential for supporting historical analysis, facilitating predictive modeling, and informing adaptive strategies that enhance the resilience and efficiency of the enterprise IT ecosystem.

The scoring matrices can include metadata scoring attributes that represent quantitative assessments generated by the metadata analysis system 162 that assign scores to key attributes of data and/or services within the enterprise IT environment 130. In certain embodiments, the metadata analysis system 162 can leverage various machine learning models 144 within the AI system 140 of the ASI platform 150 to derive some or all of the metadata scoring attributes for the scoring matrix.

In some examples, the scoring matrix may include metadata scoring attributes that evaluate factors such as activity level, cost, quality, access patterns, usage frequency, security, and compliance. By providing a comprehensive, data-driven evaluation of each data source or service, scoring matrices enable precise optimization and inform decision-making processes for data management, integration, and workflow deployment.

The AI system metadata encompasses any information or metadata that is generated by the AI models, such as one or more inference models 142, one or more language models 142A, one or more LLMs, one or more machine-learning (ML) models 144, one or more neural network models, one or more computer vision systems, and/or other types of learning models included in the AI system 140, operating within the ASI platform 150. In some examples, this metadata may include model configurations, training parameters, inference results, performance metrics, and/or operational status indicators. The AI system metadata can provide transparency into the functioning and effectiveness of the AI system 140, supporting ongoing monitoring, troubleshooting, and refinement of intelligent automation capabilities.

The intelligence metadata can encompass any metadata that is derived from the insights, analytics, and/or knowledge produced by the autonomous intelligence engine 170. In some examples, this metadata may correspond to, or describe attributes of, AIQ metrics, anomaly detection results, predictive analytics, system health assessments, risk evaluations, and/or optimization recommendations generated by the autonomous intelligence engine 170. Amongst other things, the intelligence metadata can provide a record of how the system has evolved overtime and offer valuable insights into the effectiveness of past decisions, adaptations, and optimizations within the enterprise IT environment.

The adaptive control metadata can encompass any metadata that is derived from the decision-making processes and actions taken by the adaptive control engine 180. In some examples, this metadata may document control strategies, policy enforcement actions, configuration changes, adaptation triggers, human-approved action plans, and/or the outcomes of automated interventions. Amongst other things, the adaptive control metadata can provide a record of how the system responds to changing conditions, ensuring traceability and supporting auditability of adaptive operations.

Workflow deployment metadata can encompass any metadata that is derived from the activities of the workflow deployment system 190, including, but not limited to, metadata that describes the construction, modification, and/or deployment of workflow pipelines within the enterprise IT environment 130. In some examples, this metadata may detail pipeline configurations, deployment templates, execution schedules, integration points, and/or operational status corresponding to the workflow pipelines. Amongst other things, the workflow deployment metadata provides a record of historical deployment actions that have been undertaken and/or supports efficient orchestration and management of future deployments of workflow pipelines, enabling rapid adaptation to evolving business objectives.

The deployment template metadata can encompass various data related to the configuration and/or usage of deployment templates (e.g., IaC artifacts) by the workflow deployment system 190. In some examples, this metadata may include template identifiers, configuration parameters, version histories, associated pipeline components, deployment schedules, integration points, usage statistics, modification logs, and records of successful or failed deployments.

The external metadata 165C can correspond to any metadata that is received or obtained from an external data source 125. Exemplary categories of external metadata 165 may include: third-party cloud service metadata; threat intelligence and security metadata; external compliance database records; industry benchmark and standards metadata; partner system integration metadata; external audit and certification metadata; regulatory metadata; and/or metadata from public or consortium data repositories. These categories of external metadata can supplement the enterprise IT environment with additional context, insights, and compliance information beyond what is available from internal sources within the enterprise IT ecosystem.

Third-party cloud service metadata can encompass information received from external cloud platforms and service providers that interact with the enterprise IT environment 130 (or which may interact with the enterprise IT environment 130 in response to new deployments). In some examples, the metadata may include service usage statistics, resource allocation details, API call logs, authentication events, service health metrics, billing records, and/or configuration information. This category of metadata may be useful for monitoring cloud resource consumption, optimizing costs, and/or ensuring seamless integration between internal systems and external cloud services.

The threat intelligence and security metadata can include data obtained from external sources that provide information about emerging security threats, vulnerabilities, and attack patterns. In some examples, the metadata may include threat indicators, vulnerability reports, incident alerts, malware signatures, and/or risk assessment scores. This metadata category may be useful for enhancing the enterprise's security posture, enabling proactive threat detection, and supporting rapid response to new risks.

The external compliance database records can encompass regulatory and compliance-related information sourced from third-party databases and organizations. In some examples, the metadata may include compliance checklists, audit findings, certification statuses, regulatory change notifications, and/or enforcement actions. This metadata category may be useful for maintaining up-to-date compliance with industry standards and legal requirements, and for streamlining audit and reporting processes.

The industry benchmark and standards metadata can include data that reflects best practices, performance benchmarks, and technical standards established by industry groups or consortiums. In some examples, the metadata may include benchmark scores, standard operating procedures, reference architectures, and/or comparative performance metrics. This category of metadata may be useful for evaluating enterprise performance against industry norms, identifying areas for improvement, and guiding strategic planning.

The partner system integration metadata can encompass information received from third-party enterprise systems. In some scenarios, the third-party enterprise systems may correspond to platforms or organizations that use their own ASI platform 150 (and/or that are integrated with similar ASI technologies described herein) to implement self-adaptive intelligence and/or automation within their own separate enterprise IT environments 130. In some examples, a well-established organization associated with a large enterprise may enable other enterprises to access their metadata, permitting these other enterprises to enhance their ASI platforms 150 and enterprise IT environments 130 by leveraging metadata from a sophisticated, thoroughly-tested enterprise IT environment 130.

The partner system integration metadata can include wide-ranging metadata associated with one or more third-party enterprise systems. In some examples, the partner system integration metadata may include metadata derived from particular architecture layers and/or enterprise services within each of the third-party enterprise systems. Additionally, or alternatively, the partner system integration metadata may include integration logs, data exchange records, API usage statistics, authentication events, service-level agreements, system compatibility reports, transaction histories, and performance metrics.

The external audit and certification metadata can include records and documentation from independent audits, assessments, and certification processes conducted by external organizations. In some examples, the metadata may include audit reports, certification statuses, remediation recommendations, compliance attestations, and audit trail logs. This category of metadata may be useful for demonstrating regulatory compliance, validating security controls, and supporting organizational accountability.

Regulatory metadata can encompass information related to laws, regulations, and/or policy updates that affect the enterprise IT environment. In some examples, the metadata may include regulatory change notifications, policy documents, enforcement actions, compliance deadlines, and/or jurisdictional requirements. This metadata category may be useful for tracking regulatory developments, ensuring timely compliance, and informing risk management strategies.

The exemplary types and categories of metadata 165 described above in connection with FIG. 3B are provided as exemplary illustrations to demonstrate the wide-ranging nature of metadata that can be collected and stored within the multi-layer metadata hub 161. It should be understood that many other types of metadata, beyond those specifically mentioned, may be collected, integrated, and utilized depending on the unique requirements and/or operational context of each enterprise IT environment. All of the metadata types described herein are optional, and the particular metadata collected and stored in the hub 161 may vary based on organizational goals, regulatory requirements, system architecture, and/or other factors.

FIG. 2 is a diagram illustrating the exemplary architecture layers 132 and enterprise services 134 within an enterprise IT environment 130 according to certain embodiments. This discussion below demonstrates the wide-ranging types of metadata 165 that can be collected across these various architecture layers 132 and enterprise services 134.

In many scenarios, each enterprise IT environment 130 may include a plurality of architecture layers 132, with the specific implementation of these layers varying from one environment to another based on the unique needs and/or design requirements of each organization. Each architecture layer 132 can correspond to a logically distinct stratum of an IT system within an enterprise ecosystem that groups together systems, components, services, or functions sharing a common role within the system architecture. Each architecture layer 132 can be designed to fulfill specific functional roles and/or implement protocols within specific domains of the digital ecosystem within the environment 130.

The infrastructure layer 132A of an enterprise IT environment 130 can represent the foundational computing resources of an IT system that provide the basic environment in which higher-level services and applications operate. This layer can provide the fundamental compute, storage, and networking resources that support and enable all higher-level IT services and applications.

The security layer 132B of an enterprise IT environment 130 can encompass the systems, protocols, and controls that protect the IT environment from unauthorized access, threats, and/or vulnerabilities. In some examples, this layer can implement security measures such as firewalls, encryption, intrusion detection, and/or policy enforcement to safeguard data and services across the ecosystem.

The identity management layer 132C of an enterprise IT environment 130 is responsible for managing user identities, authentication, and/or access controls throughout the environment. This layer aims to ensure that only authorized users and systems can access specific resources, supporting secure and efficient user provisioning, role management, and credential validation.

The application layer 132D of an enterprise IT environment 130 often comprises a suite of software services, including various applications and systems, that deliver functionality to end users (e.g., in many cases, business-related functionalities). In some examples, this layer can include both custom and commercial applications, middleware, and/or service orchestration components that drive day-to-day enterprise operations.

The data layer 132E of an enterprise IT environment 130 represents the repositories, databases, and data management systems where enterprise data is stored, organized, and accessed. Amongst other things, this layer can support data integration, storage, retrieval, and/or processing services, often serving as the backbone for analytics, reporting, business intelligence activities, and/or many other operations.

The compliance and governance layer 133F of an enterprise IT environment 130 encompasses the policies, processes, and tools that ensure regulatory compliance, data governance, and/or auditability across the environment. In some examples, this layer enforces standards for data handling, privacy, and reporting, supporting risk management and organizational accountability.

The user experience layer 133G of an enterprise IT environment 130 focuses on the interfaces, tools, and systems that facilitate user interaction with IT resources. In some examples, this layer encompasses dashboards, portals, and application front-ends designed to optimize usability, accessibility, and satisfaction for end users across the enterprise.

Each of the architecture layers 132 can represent the fundamental domains or functional areas of an enterprise IT environment 130 and can encompass various enterprise services 134. In general, each enterprise service 134

Each of the architecture layers 132 represents the fundamental domains or functional areas of an enterprise IT environment 130 and can encompass various enterprise services 134. In general, each enterprise service 134 may represent a system, application, program, or software-based component that provides specialized functionality or operational capabilities within its respective layer, supporting the overall objectives of the enterprise IT environment 130. In some scenarios, a given enterprise service 134 may span or implicate multiple architecture layers 132, which may involve coordinating its operation and integration across different functional domains to deliver its intended capabilities. For example, in some scenarios, the enterprise services 134 can be designed to interact both within their own layer and with services in other layers, contributing to the cohesive operation and adaptability of the entire IT ecosystem. Below is a description of exemplary enterprise services 134 that can be integrated into an enterprise IT environment 130.

The identity and access management (IDAM) services 134A can include one or more systems or applications designed to manage user identities, authentication, and access permissions across the enterprise IT environment. In some examples, the IDAM services 134A can perform functions that involve provisioning user accounts, enforcing access controls, managing credentials, supporting single sign-on, and monitoring user activity for security and compliance purposes. The functionalities performed by the IDAM services 134A can be grouped within the identity management layer 132C of an enterprise IT architecture.

The metadata integration system 160 can collect, receive, and/or access various types of metadata 165 related to any or all of the functionalities performed by the IDAM services 134A. In some examples, the metadata 165 collected from the IDAM services 134A can include user identity attributes, authentication logs, access control lists, user role assignments, credential types, password policies, multi-factor authentication status, account provisioning and deprovisioning events, session activity records, login and logout timestamps, failed authentication attempts, privilege escalation events, group membership information, audit trails of access requests and approvals, policy enforcement actions, compliance status indicators, and historical changes to user permissions or roles. Amongst other things, this metadata 165 can supplement the multi-layer metadata hub 161 with real-time and historical insights relating to identity and access management activities within the enterprise IT environment.

The data delivery and curation services 134B can include one or more systems or applications designed to collect, organize, transform, and/or distribute data throughout the enterprise IT environment 130. In some examples, these services can perform functions such as data aggregation, cleansing, enrichment, validation, and routing to ensure that high-quality, relevant data is made available to users and applications as needed. In many scenarios, the functionalities performed by the data delivery and curation services 134B can be grouped within the data layer 132E and may also interact with services that fall within the application layer 132D of an enterprise IT architecture.

The metadata integration system 160 can collect, receive, and/or access various types of metadata 165 related to any or all of the functionalities performed by the data delivery and curation services 134B. In some examples, the metadata 165 collected from the data delivery and curation services 134B can include data source identifiers, data lineage information, data transformation logs, data quality metrics, data validation results, enrichment history, aggregation methods, data routing paths, timestamps of data delivery events, data format and schema details, record counts, error and exception logs, data access frequency, user or application access logs, curation workflow steps, data retention policies, data versioning information, and/or metadata indicating compliance with data governance or privacy requirements. Amongst other things, this metadata 165 can supplement the multi-layer metadata hub 161 with real-time and historical insights relating to data delivery and curation processes within the enterprise IT environment.

The network security services 134C can include systems or applications configured to protect network resources and communications within the enterprise IT environment. In some examples, these services may perform functions such as monitoring network traffic, detecting and responding to threats, enforcing security policies, and managing firewalls, intrusion detection systems, and secure network access. The functionalities performed by the network security services 134C can be grouped within the security layer 132B of an enterprise IT architecture and can extend to services within the applications layer 132D and many other architecture layers 132.

The metadata integration system 160 can collect, receive, and/or access various types of metadata 165 related to any or all of the functionalities performed by the network security services 134C. In some examples, the metadata 165 collected from the network security services 134C can include network traffic logs, firewall rules and policy configurations, intrusion detection and prevention alerts, threat intelligence indicators, vulnerability scan results, security event timestamps, access attempt records, network device inventories, port and protocol usage statistics, encryption status, security incident reports, remediation actions taken, user and device authentication logs, anomaly detection results, compliance audit trails, and/or historical changes to security policies or configurations. Amongst other things, this metadata 165 can supplement the multi-layer metadata hub 161 with real-time and historical insights relating to the network security posture and activities within the enterprise IT environment.

The data ingestion services 134D can include systems or applications designed to import and integrate data from a variety of internal and external sources into the enterprise's data repositories. In some examples, these services can perform functions such as extracting data from disparate systems, transforming data formats, validating data integrity, and loading data into databases, data lakes, or warehouses. The functionalities performed by the data ingestion services 134D can be grouped within the data layer 132E of an enterprise IT architecture and can extend to services within the applications layer 132D and many other architecture layers 132.

The metadata integration system 160 can collect, receive, and/or access various types of metadata 165 related to any or all of the functionalities performed by the data ingestion services 134D. In some examples, the metadata 165 collected from the data ingestion services 134D can include data source identifiers, extraction timestamps, data format and schema details, data mapping and transformation logs, validation and integrity check results, ingestion workflow steps, error and exception logs, data volume and record counts, source system connection details, ingestion frequency and scheduling information, user or process access logs, data lineage and provenance information, data quality metrics, duplicate detection results, data enrichment history, and/or metadata indicating compliance with data governance or privacy requirements. Amongst other things, this metadata 165 can supplement the multi-layer metadata hub 161 with real-time and historical insights relating to ingestion processes within the enterprise IT environment.

The analytics services 134E can include systems or applications that enable the analysis and interpretation of enterprise data to generate actionable insights. In some examples, these services may perform functions such as data modeling, statistical analysis, reporting, dashboard creation, and/or supporting business intelligence and decision-making processes. The functionalities performed by the analytics services 134E often can be grouped within the application layer 132D and the data layer 132E of an enterprise IT architecture.

The metadata integration system 160 can collect, receive, and/or access various types of metadata 165 related to any or all of the functionalities performed by the analytics services 134E. In some examples, the metadata 165 collected from the analytics services 134E can include analysis job identifiers, analytic metrics, data source references, model types and versions, algorithm parameters, input and output data schemas, processing timestamps, execution logs, data transformation steps, feature extraction details, statistical summaries, visualization configurations, report generation logs, user access and usage statistics, error and exception records, performance metrics, audit trails of analysis activities, and/or compliance indicators. Amongst other things, this metadata 165 can supplement the multi-layer metadata hub 161 with real-time and historical insights relating to the analytics processes and outcomes within the enterprise IT environment.

The compliance and governance services 134F can include systems or applications designed to ensure that enterprise operations adhere to regulatory requirements, organizational policies, and data governance standards. In some examples, these services can perform functions such as policy enforcement, audit logging, compliance monitoring, risk assessment, and generating reports for regulatory review. The functionalities performed by the compliance and governance services 134F can be grouped within the compliance and governance layer 133F of an enterprise IT architecture and may extend to services within the applications layer 132D and many other architecture layers 132.

The metadata integration system 160 can collect, receive, and/or access various types of metadata 165 related to any or all of the functionalities performed by the compliance and governance services 134F. In some examples, the metadata 165 collected from the compliance and governance services 134F can include policy definitions and enforcement actions, audit logs, compliance check results, risk assessment reports, regulatory requirement mappings, exception and remediation records, data classification and tagging information, access and usage monitoring logs, incident response records, certification and attestation statuses, workflow approval histories, retention and disposition schedules, privacy impact assessments, user training and acknowledgment records, and historical changes to compliance policies or governance frameworks. Amongst other things, this metadata 165 can supplement the multi-layer metadata hub 161 with real-time and historical insights relating to the oversight, reporting, compliance, and/or governance processes within the enterprise IT environment.

The master data management (MDM) services 134G can include systems or applications configured to maintain consistent, accurate, and/or authoritative data across the organization. These services may perform functions such as data deduplication, standardization, synchronization, and/or stewardship to ensure that master data entities (e.g., such as customers, products, or suppliers) are managed effectively. The functionalities performed by the master data management services 134G can be grouped within the data layer 132E of an enterprise IT architecture and may extend to services within the applications layer 132D and many other architecture layers 132.

The metadata integration system 160 can collect, receive, and/or access various types of metadata 165 related to any or all of the functionalities performed by the MDM services 134G. In some examples, the metadata 165 collected from the MDM services 134G can include master data entity definitions, data source references, data quality scores, data validation and verification logs, deduplication and matching results, data standardization rules, synchronization status and history, stewardship activity records, change tracking logs, data lineage and provenance information, data ownership and stewardship assignments, versioning information, exception and remediation records, integration mappings, business rule enforcement logs, access and usage statistics, and/or compliance indicators. Amongst other things, this metadata 165 can supplement the multi-layer metadata hub 161 with real-time and historical insights relating to the management, governance, and/or optimization of master data assets across the enterprise IT environment.

The application services 134H can include systems or applications that deliver business and productivity functionalities to end users within the enterprise IT environment. The types of application services 134H integrated across different enterprise IT environments can vary greatly and, in many cases, can depend upon the wide-ranging goals or needs specific to organizations. In some examples, these services can encompass custom or commercial software applications, middleware, and service orchestration components that support day-to-day business operations. The functionalities performed by the application services 134H can be grouped within the application layer 132D of an enterprise IT architecture.

The metadata integration system 160 can collect, receive, and/or access various types of metadata 165 related to any or all of the functionalities performed by the application services 134H. In some examples, the metadata 165 collected from the application services 134H can include application identifiers, version information, deployment and configuration details, application-specific metadata, usage statistics, user access logs, transaction records, error and exception logs, performance metrics, integration points with other services, API usage data, workflow execution histories, audit trails, security and compliance status indicators, update and patch histories, resource consumption metrics, and user feedback or satisfaction scores. Amongst other things, this metadata 165 can supplement the multi-layer metadata hub 161 with real-time and historical insights relating to the management and usage of various applications and systems associated with the application services.

The infrastructure services 134I can include systems or applications that provide foundational IT resources such as compute, storage, and networking capabilities. In some examples, these services may perform functions such as provisioning virtual machines, managing storage resources, orchestrating cloud infrastructure, and supporting the deployment and scaling of enterprise applications. The functionalities performed by the infrastructure services 134I can be grouped within the infrastructure layer 132A of an enterprise IT architecture.

The metadata integration system 160 can collect, receive, and/or access various types of metadata 165 related to any or all of the functionalities performed by the infrastructure services 134I. In some examples, the metadata 165 collected from the infrastructure services 134I can include resource allocation and utilization metrics, virtual machine and container configurations, storage capacity and usage statistics, network topology and connectivity details, provisioning and deprovisioning events, hardware and software inventory records, uptime and availability logs, system health and performance indicators, backup and recovery status, patch and update histories, incident and maintenance records, access and authentication logs, infrastructure scaling events, and compliance or security status reports. Amongst other things, this metadata 165 can supplement the multi-layer metadata hub 161 with real-time and historical insights relating to the management of foundational IT resources within the enterprise IT environment 130.

It can be noted that the architecture layers 132 and/or enterprise services 134 within the enterprise IT environment 130 can be implemented in a variety of deployment environments, including cloud environments 135, on-premises environments 136, or any combination thereof. In some scenarios, certain layers or services may reside entirely within a public or private cloud infrastructure, while others may be hosted on local, on-premises hardware. Hybrid configurations are also possible, where components are distributed across both cloud and on-premises resources to meet specific operational, security, or compliance requirements.

In certain embodiments, the cloud environments 135 can include public, private, or hybrid cloud infrastructures that provide on-demand access to computing resources, storage, networking, and application services. These environments can be managed by third-party cloud service providers and/or by the organization itself. Cloud environments 135 enable scalable and flexible deployment of enterprise services and architecture layers, allowing organizations to dynamically allocate resources based on workload demands, optimize costs, and enhance system availability. Additionally, cloud environments often offer integrated security, compliance, and monitoring features, supporting the efficient management and operation of enterprise IT environments across geographically dispersed locations.

In contrast, on-premises environments 136 refer to IT infrastructures and resources that are physically located and managed within an organization's own facilities or server systems. These environments typically include dedicated servers, storage systems, networking equipment, and/or other hardware deployed in data centers or server rooms owned and operated by the organization. On-premises environments 136 provide organizations with direct control over their infrastructure, enabling them to implement custom security measures, maintain strict data governance, and comply with specific regulatory or operational requirements. This deployment model is often preferred for workloads that require low latency, high security, or integration with legacy systems, and can be used independently or in conjunction with cloud environments as part of a hybrid IT strategy.

The above description of FIG. 2 illustrates how the architecture layers 132 and/or corresponding enterprise services 134 within an enterprise IT environment 130 collectively generate a diverse and comprehensive array of metadata 165. This metadata 165, when collected and integrated by the metadata integration system 160, forms the foundation of a meta-fabric that is collected and stored in the multi-layer metadata hub 161, along with other metadata 165 described in this disclosure. By continuously updating and aggregating the metadata 165 across the architecture layers 132 and/or corresponding enterprise services 134 over time, the multi-layer metadata hub 161 can provide time-based snapshots of the enterprise operations at any point in time, including snapshots that provide real-time insights into ongoing operations and historical insights. Provide these real-time and historical insights into every aspect of the IT environment—from identity management and data delivery to security, compliance, and infrastructure—the system supports intelligent decision-making, adaptive optimization, and resilient operations. Additionally, it permits the autonomous intelligence engine 170, adaptive control engine 180, and/or other components to access desired metrics and metadata 165 via the hub access interface 163 to streamline and execute intelligence and automation capabilities within the enterprise IT environment 130.

Figure 3C:
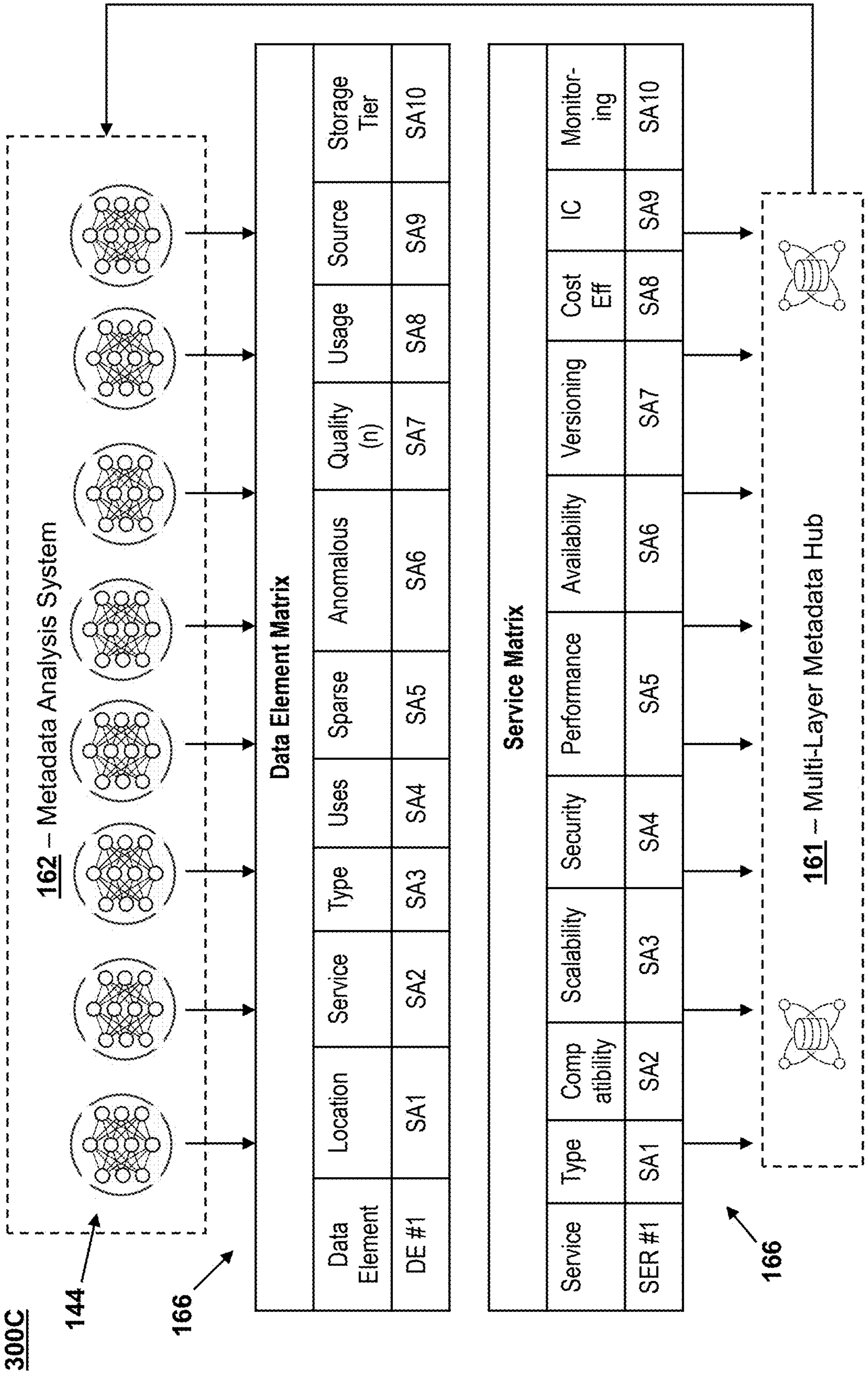
FIG. 3C is a flow diagram illustrating an exemplary process flow for generating scoring matrices in accordance with certain embodiments.

FIG. 3C is a flow diagram illustrating an exemplary process flow for generating scoring matrices 166 according to certain embodiments.

In certain embodiments, the scoring matrices 166 described herein correspond to structured data representations that can be utilized to quantitatively assess key attributes of data elements, services, and/or other resources within an enterprise IT environment 130. Amongst other things, these scoring matrices 166 can be utilized to inform and optimize intelligence and decisions related to data management, storage, integration, and workflow deployment by providing actionable insights based on real-time and historical metadata.

A data matrix 166 can comprise a data structure that stores scoring attributes corresponding to data elements, services, and/or other resources within an enterprise IT environment 130. In some examples, a data matrix 166 can be comprised of rows and columns, where each row corresponds to a specific data element, service, or resource, and each column represents a particular attribute or metric relevant to that element. The values within the data matrix 166 can correspond to scoring attributes (e.g., numerical scores, quantitative indicators, etc.) computed, at least in part, by analyzing the metadata 165 stored in the multi-layer metadata hub 161.

In certain embodiments, the data matrices 166 and their corresponding scoring attributes may be stored within the multi-layer metadata hub 161 and continuously updated as new metadata is collected and analyzed. This ongoing refresh permits the data matrices 166 to reflect the most current state of the enterprise IT environment, enabling the ASI platform 150 to provide accurate, real-time insights and support dynamic, data-driven decision-making.

The process flow 300C illustrates an exemplary technique for generating the data matrices 166 and storing the data matrices 166 in the multi-layer metadata hub 161. It further highlights exemplary types of data matrices 166 that may be utilized by the ASI platform 150.

The process flow 300C begins with the metadata data analysis system 162 accessing desired portions of the metadata 165 stored in the multi-layer metadata hub 161. The metadata analysis system 162 can utilize the retrieved metadata 165 to compute various scoring attributes for each of the data matrices 166.

The metadata analysis system 162 can include or communicate with various machine-learning models 144 associated with the AI system 140 to compute some or all of the scoring attributes. In certain embodiments, the AI system 140 may include a plurality of machine-learning models 144, each of which is dedicated and pre-trained to compute or determine a particular scoring attribute using the retrieved metadata 165. In some examples, the retrieved metadata 165 may be assembled into input vectors or features that are received as inputs to the machine-learning models 144, each of which can execute one or more pre-trained learning algorithms to compute a corresponding scoring attribute based on the input vectors or features.

Thus, in the second step of the process flow 300C, the metadata analysis system 162 may populate or update various data matrices 166 with scoring attributes based on the metadata 165, and at least some of the scoring attributes may be derived using a machine-learning model 144 of the AI system 140.

FIG. 3C illustrates two exemplary data matrices 166: a first data matrix 166 that can be utilized to store or organize scoring attributes for data elements in the enterprise IT environment 130 (e.g., such as data elements corresponding to records, files, fields, data objects or resources, etc.); and a second data matrix 166 that can be utilized to store or organize scoring attributes for an enterprise service 134 in the enterprise IT environment 130. It should be noted that data matrices 166 may be utilized for other enterprise network resources beyond data elements and service 134.

In the first data matrix 166, each row corresponds to a data element, which is identified in the first column (DE #1), and comprises a plurality of scoring attributes (labeled SA1 through S10). In this example, the data matrix 166 comprises the following attributes to quantify, score, or evaluate a given data element: a) a location attribute; b) a service attribute; c) a type attribute; d) a uses attribute; e) a sparsity attribute; f) an anomalous attribute; g) a quality attribute; h) a usage attribute; i) a source attribute; and j) storage tier attribute. These and/or other attributes can collectively provide a comprehensive, quantitative assessment of each data element's characteristics, usage patterns, and operational relevance within the enterprise IT environment, enabling informed decisions regarding data management, optimization, and integration.

In the second data matrix 166, each row corresponds to a service, which is identified in the first column (SER #1), and comprises a plurality of scoring attributes (labeled SA1 through S10). In this example, the data matrix 166 comprises the following attributes to quantify, score, or evaluate a given service: a) a type attribute; b) a compatibility attribute; c) a scalability attribute; d) a security attribute; e) a performance attribute; f) an availability attribute; g) a versioning attribute; h) a cost efficiency attribute; i) an integration compatibility (IC) attribute; and j) a monitoring attribute. These and/or other attributes can collectively provide a comprehensive, data-driven evaluation of each service's capabilities, operational performance, and suitability for integration within the enterprise IT environment, supporting effective service management, optimization, and deployment decisions.

While the exemplary data matrices 166 illustrated in FIG. 3C are useful to demonstrate examples of scoring attributes that can be captured or derived, it should be understood that the data matrices 166 are merely examples and can be modified in various ways. For example, different types of data structures may be employed to organize and store the scoring attributes, and the specific attributes included in each matrix can be tailored to the needs of the enterprise IT environment. Certain scoring attributes may be omitted if they are not relevant to a particular use case, while additional attributes can be added to capture other metrics or characteristics of interest.

In a third step of the process flow 300C, the data matrices and/or corresponding scoring attributes can be stored in the multi-layer metadata hub 161. Once stored, other components of the ASI platform 150, such as the autonomous intelligence engine 170, adaptive control engine 180, and/or workflow deployment system 190, can access them to inform real-time monitoring, drive automated decision-making, and/or optimize the deployment and management of workflows, resources, and services across the enterprise IT environment.

The process flow 300C can be executed on a continuous or recurring basis to ensure that the data matrices 166 and their corresponding scoring attributes remain current and reflective of the latest state of the enterprise IT environment. As new metadata is collected and analyzed, the metadata analysis system 162 can update the data matrices 166 accordingly, allowing the ASI platform 150 to adapt dynamically to evolving operational conditions, business objectives, and system requirements. This ongoing process supports real-time intelligence, continuous optimization, and proactive management across all layers and services within the enterprise ecosystem.

In addition to the above-described functionalities related to maintaining the data matrices 166 and deriving corresponding scoring attributes, the metadata analysis system 162 may leverage models of the AI system 140, including, but not limited to, inference models 142, language models 142A, LLMs and machine-learning models 144, for various purposes beyond those functions for deriving the scoring attributes and/or populating the scoring matrices 166. In some examples, the metadata analysis system 162 may leverage models of the AI system 140 to perform data quality management tasks on the metadata 165 stored in the multi-layer metadata hub 161.

Table 1 (reproduced below) illustrates some exemplary data quality management functions that can be executed by the metadata analysis system 162 in conjunction with using the AI system 140 of the ASI platform 150 in accordance with certain embodiments of the metadata integration system 160.

TABLE 1

| Data Quality Management | Application of AI/ML Models |
|---|---|
| Data Profiling and Assessment | Automated data profiling using ML algorithms to identify anomalies and inconsistencies in data. Predictive analytics to assess data quality issues before they become critical. |
| Data Cleansing and Standardization | Automated data cleansing using AI algorithms to correct errors, remove duplicates, and standardize formats. In some examples, NLP and/or LLM models can be applied for text data standardization. |
| Data Integration and Matching | ML-based record linkage and entity resolution to accurately match and merge similar data from different sources. Automated data integration using AI to combine and consolidate data seamlessly. |
| Data Enrichment | AI-driven data enrichment by adding missing information from external sources such as social media, APIs, and databases. Predictive modeling to fill in gaps in data. |
| Data Quality Monitoring | Real-time monitoring of data quality using AI-powered anomaly detection and alerting systems. Continuous assessment and reporting of data quality metrics through ML algorithms. |
| Data Governance | AI-based classification and tagging of data to enforce data governance policies. ML-driven access control and data privacy enforcement. |
| Data Quality Assessment | Automated generation of data quality scores and reports using ML models. Predictive analytics to forecast data quality trends. |
| Data Quality Remediation | Automated suggestions for data quality improvement using AI recommendations. ML-driven root cause analysis of data quality issues. |
| Data Quality Reporting | AI-driven generation of data quality dashboards and visualizations. ML-based predictive reporting on data quality trends and issues. |
| Customer Data Quality | AI and/or ML models for customer data validation, deduplication, and segmentation. Personalization and recommendation engines for improved customer data quality. |

It should be noted that, while Table 1 describes exemplary machine-learning and AI applications in the context of the metadata integration system 160, these functions are not limited to that system. For example, in certain embodiments, the machine-learning and AI applications outlined in Table 1 can be associated with either the metadata integration system 160 or the autonomous intelligence engine 170, depending on the specific architecture and operational requirements of the ASI platform 150. In one exemplary configuration, the data profiling, anomaly detection, and predictive analytics may be performed by the metadata analysis system 162 within the metadata integration system 160, or by components of the autonomous intelligence engine 170 that leverage similar AI and machine-learning models. Indeed, any of the functionalities performed by the metadata analysis system 162 can be integrated with, or performed by, the autonomous intelligence engine 170. The descriptions of the metadata integration system 160 and the autonomous intelligence engine 170 are provided to facilitate understanding of the ASI platform's functionalities. However, the functions performed by the components of the platform can be integrated, combined, or distributed in various ways depending on implementation preferences and system requirements.

The features, functionalities, and/or configurations of the metadata integration system 160 described herein are provided as examples to demonstrate embodiments. Numerous modifications and variations to the disclosed embodiments are possible, and the techniques described herein can be implemented in many other contexts and environments.

Exemplary Embodiments of the Autonomous Intelligence Engine

The autonomous intelligence engine 170 can be configured to operate as an intelligence layer that utilizes the metadata 165 collected in the multi-layer metadata hub 161 and/or other system data to synthesize or generate various types of insights across the digital ecosystem. In certain embodiments, the engine 170 can continuously monitor and analyze the metadata 165 stored in the multi-layer metadata hub 161 to generate both ecosystem-level intelligence and more targeted intelligence into specific architecture layers 132, enterprise services 134, and/or activities within the enterprise IT environment 130. The various insights and metrics generated by the autonomous intelligence engine 170 can be utilized by the adaptive control engine 180 to execute a wide range of actions within the enterprise IT environment 130 to adapt, optimize, and/or implement safeguards within the enterprise IT environment 130.

Operating independently of manual intervention, the autonomous intelligence engine 170 enables real-time, ecosystem-wide intelligence that supports proactive decision-making and adaptive control. Through its ongoing analysis and generation of intelligence metrics, the autonomous intelligence engine 170 empowers organizations to maintain resilient, self-optimizing, and self-adapting IT environments that can dynamically respond to evolving business objectives and operational demands.

In certain embodiments, the autonomous intelligence engine 170 can utilize artificial intelligence and machine learning models to quantify performance metrics, detect anomalies, and assess risks across various architecture layers and enterprise services. The engine functions without manual intervention and provides real-time intelligence to support decision-making and adaptive control within the enterprise IT environment.

Additional details regarding exemplary functionalities of the autonomous intelligence engine 170 are provided below.

Figure 4A:
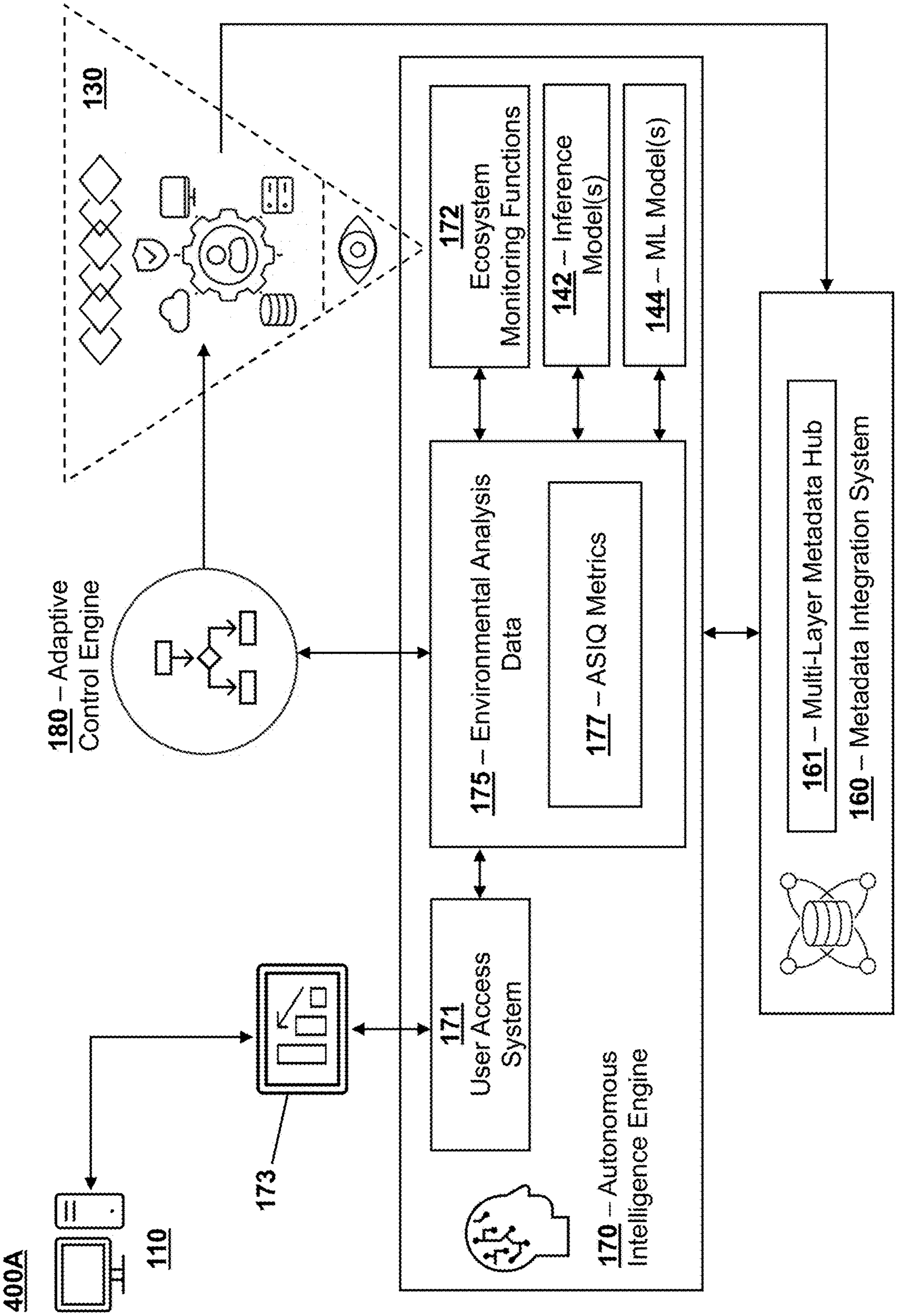
FIG. 4A is a block diagram illustrating an exemplary architecture of an autonomous intelligence engine in accordance with certain embodiments.

FIG. 4A illustrates an exemplary architecture 400A corresponding to the autonomous intelligence engine 170 according to certain embodiments.

In this 400A, the autonomous intelligence engine 170 can communicate with the metadata integration system 160 to access the diverse metadata 165 stored in the multi-layer metadata hub 161.

The autonomous intelligence engine 170 can be configured to perform continuous monitoring and analysis operations across an entire enterprise IT environment 130, operating as an intelligence layer that utilizes the metadata 165 collected in the multi-layer metadata hub 161 and/or other system data to synthesize or generate various types of environmental analysis data 175, such as metrics, analytics, and insights across the architecture layers 132, enterprise services 134, and/or activities occurring within the digital ecosystem of the enterprise IT environment 130. In generating environmental analysis data 175, the autonomous intelligence engine 170 can implement cross-domain reasoning by integrating and correlating metadata 165 across multiple IT domains and/or multiple architecture layers 132, including but not limited to security, infrastructure, identity management, data management, application, compliance and governance, and/or user experience layers. This cross-domain intelligence enables the autonomous intelligence engine 170 to produce comprehensive assessments that reflect the interdependencies and interactions among different domains within the enterprise IT environment.

The categories and types of environmental analysis data 175 generated by the autonomous intelligence engine 170 are wide-ranging, and can encompass both ecosystem-level intelligence and more granular, domain-specific intelligence.

At the ecosystem level, the engine 170 can utilize metadata 165 from across the entire enterprise IT environment to provide holistic assessments of overall system health, security, performance, and/or compliance. In some examples, the engine 170 can identify patterns and trends in system-wide resource utilization, detect correlations between operational events across different domains, and/or evaluate the overall effectiveness of security and compliance protocols within the enterprise IT environment 130. Additionally, ecosystem-level intelligence can include evaluations of cross-layer dependencies, such as how changes in infrastructure impact application performance or how updates to identity management affect data access and governance. These holistic assessments enable organizations to understand the collective behavior and status of their IT environment, supporting strategic planning and proactive management.

In addition, more targeted intelligence can also be generated at varying levels of granularity. In some examples, the autonomous intelligence engine 170 can generate targeted intelligence focused on specific architecture layers 132, specific enterprise services 134, specific events or activities (e.g., specific security events, migrations, or deployments), and/or even more granular user-specific activities. Again, these more targeted analyses can implicate the usage of cross-domain knowledge derived from the metadata 165 in various ways depending upon the specific operational context, the nature of the events being analyzed, or the particular analysis goals.

In some examples, the autonomous intelligence engine 170 can generate targeted intelligence that includes detailed metrics and analytics related to security incidents, such as unauthorized access attempts or vulnerability detections within the security layer. The engine 170 may also produce insights regarding infrastructure utilization, including resource allocation, system uptime, and/or performance bottlenecks within the infrastructure layer. For identity management, targeted intelligence can encompass authentication trends, access control changes, and user activity patterns. Additionally, the engine 170 can provide analytics on data management operations, such as data quality assessments, schema changes, and data lineage tracking. Targeted intelligence may further extend to monitoring the effectiveness of compliance measures, tracking policy enforcement actions, and evaluating audit trail completeness. These examples illustrate how the autonomous intelligence engine 170 can deliver focused, actionable intelligence tailored to specific domains, services, or operational events within the enterprise IT environment.

All of the aforementioned intelligence, including both ecosystem-level insights and more targeted analyses, can be stored within the environmental analysis data 175 generated by the autonomous intelligence engine 170. The comprehensive intelligence layer facilitated by the autonomous intelligence engine 170 enables the ASI platform 150 to support both broad, strategic decision-making and focused, operational analyses.

In certain embodiments, the autonomous intelligence engine 170 can generate some or all of the environmental analysis data 175 using various types of ecosystem monitoring functions 172, which can autonomously monitor any or all activities within the enterprise IT environment 130 using the metadata 165 from the multi-layer metadata hub 161, including both the ecosystem-level and more targeted analyses described in this disclosure. The ecosystem monitoring functions 172 can incorporate software instructions or logic that are designed to continuously collect, analyze, and/or correlate operational data, detect anomalies or deviations from expected behavior, assess compliance with policies and standards, and/or generate alerts or recommendations for adaptive actions based on real-time system conditions.

In certain embodiments, the intelligence generated by the ecosystem monitoring functions 172 and/or other components of the autonomous intelligence engine 170 can be utilized to facilitate autonomous monitoring and self-awareness capabilities within the enterprise IT environment 130. Using this comprehensive intelligence, the autonomous intelligence engine 170 permits the ASI platform 150 to detect changes, assess system status, generate recommendations for improvements or optimizations, and/or identify potential issues without manual intervention. This self-awareness supports proactive management and ongoing optimization of the enterprise IT environment 130. Additionally, as explained in other portions of this disclosure, the autonomous intelligence engine 170 can work in concert with the adaptive control engine 180 to implement various types of adaptive control measures within the enterprise IT environment 130. Intelligence and insights produced by the autonomous intelligence engine 170 can be communicated to the adaptive control engine 180, triggering automated and/or semi-automated actions or adjustments in response to changing or evolving conditions.

The autonomous intelligence engine 170 can utilize various techniques to derive the wide-ranging environmental analysis data 175. In some embodiments, the autonomous intelligence engine 170 can include, or communicate with, one or more AI models with the AI system 140 to derive the environmental analysis data 175 and/or specific portions of the environmental analysis data 175.

In some embodiments, some of the core functionalities of the autonomous intelligence engine 170, e.g., such as cross-domain reasoning, anomaly detection, predictive analytics, and/or system health assessment, can be implemented using a specially trained inference model 142 (and/or a combination of multiple inference models 142), such as a language model 142A or LLM. Thus, some or all of the environmental analysis data 175 may be generated by the inference model 142.

In certain embodiments, the autonomous intelligence engine 170 can utilize the inference model 142 to perform a range of intelligence analyses, including both ecosystem-level and targeted analyses as described herein. For example, when generating a specific insight or metric to be included in the environmental analysis data 175, the inference model 142 may receive inputs comprising the relevant subsets of metadata 165 and outputs from the ecosystem monitoring functions 172. These inputs collectively characterize the current state of the enterprise IT environment 130 for the analysis being performed. The inference model 142 can then apply natural language processing (NLP) techniques to interpret the inputs and produce the corresponding insight or metric.

To illustrate by way of example, consider a scenario in which the inference model 142 is used to generate an ecosystem-level metric such as an overall system health score. In this scenario, the inference model 142 may receive inputs including metadata 165 that is collected across multiple domains, layers, and/or services, such as metadata 165 related to resource utilization, uptime statistics, incident reports, and performance metrics from across the enterprise IT environment. By applying NLP techniques to interpret these inputs, the inference model 142 can synthesize the information and output a comprehensive system health score that reflects the current operational status and stability of the entire enterprise IT ecosystem. This score can then be stored within the environmental analysis data 175 and used to inform strategic decision-making and ongoing system management.

In another example, the inference model 142 can be used to generate a targeted metric focused on a specific domain, such as security within the enterprise IT environment. In this exemplary scenario, the inference model 142 may receive inputs comprising metadata 165 related to authentication events, access control changes, vulnerability scan results, and security incident logs associated with the security layer. By applying natural language processing techniques to these inputs, the inference model 142 can analyze patterns and anomalies to produce a targeted security risk score or a summary of recent security events. This targeted metric provides actionable intelligence regarding the security posture of the enterprise IT environment and can be stored within the environmental analysis data 175 for use in operational monitoring, incident response, or compliance reporting.

The autonomous intelligence engine 170 may also leverage one or more machine-learning models 144 to derive the environmental analysis data 175, either independently and/or in combination with the inference model 142. Each machine-learning model 144 can comprise a pre-trained learning algorithm that is designed to derive a specific metric or insight. In some examples, each machine-learning model 144 can receive an input vector and/or a set of input features that are derived from the metadata 165 and/or outputs of the ecosystem monitoring functions 172, and apply its pre-trained learning algorithm to generate an output based on the input features. The outputs generated by each machine-learning model 144 can be independently stored in the environmental analysis data 175 and/or utilized as an input to the inference model 142.

The machine-learning models 144 can be trained and configured to generate outputs that quantify or measure various aspects within the enterprise IT environment 130. For example, these models may produce metrics related to resource utilization, system performance, data quality, security risk levels, and/or compliance status. Additionally, the machine-learning models 144 can identify trends over time, detect anomalies or deviations from expected behavior, and provide predictive analytics to anticipate future operational needs or potential issues. The outputs generated by these models can be incorporated into the environmental analysis data 175 to support ongoing monitoring, optimization, and decision-making within the enterprise IT environment.

By leveraging artificial intelligence and machine learning models, the autonomous intelligence engine 170 is capable of quantifying system performance, detecting anomalies, identifying emerging risks, and/or assessing compliance across any or all architecture layers, enterprise services, and activities occurring within the enterprise IT environment 130.

In certain embodiments, the environmental analysis data 175 generated by the autonomous intelligence engine 170 can include a specialized set of metrics, which are referred to herein as the ASIQ metrics 176. In general, these ASIQ metrics 176 can include key performance indicators (KPIs) and other types of metrics that provide quantitative assessments of the intelligence, adaptability, and resilience of an enterprise IT ecosystem. In some examples, these ASIQ metrics 176 can enable system administrators and/or the ASI platform itself to evaluate how well the enterprise IT environment 130, or systems associated therewith, can learn, make decisions, collaborate, recover from failures, and/or optimize themselves over time. Some or all of these ASIQ metrics 176 may be derived based on an analysis of the metadata 165 stored in the multi-layer metadata hub 161 and/or the outputs of the ecosystem monitoring functions 172, which can process the metadata 165 to extract insights into specific types of targeted analytics.

Figure 4B:
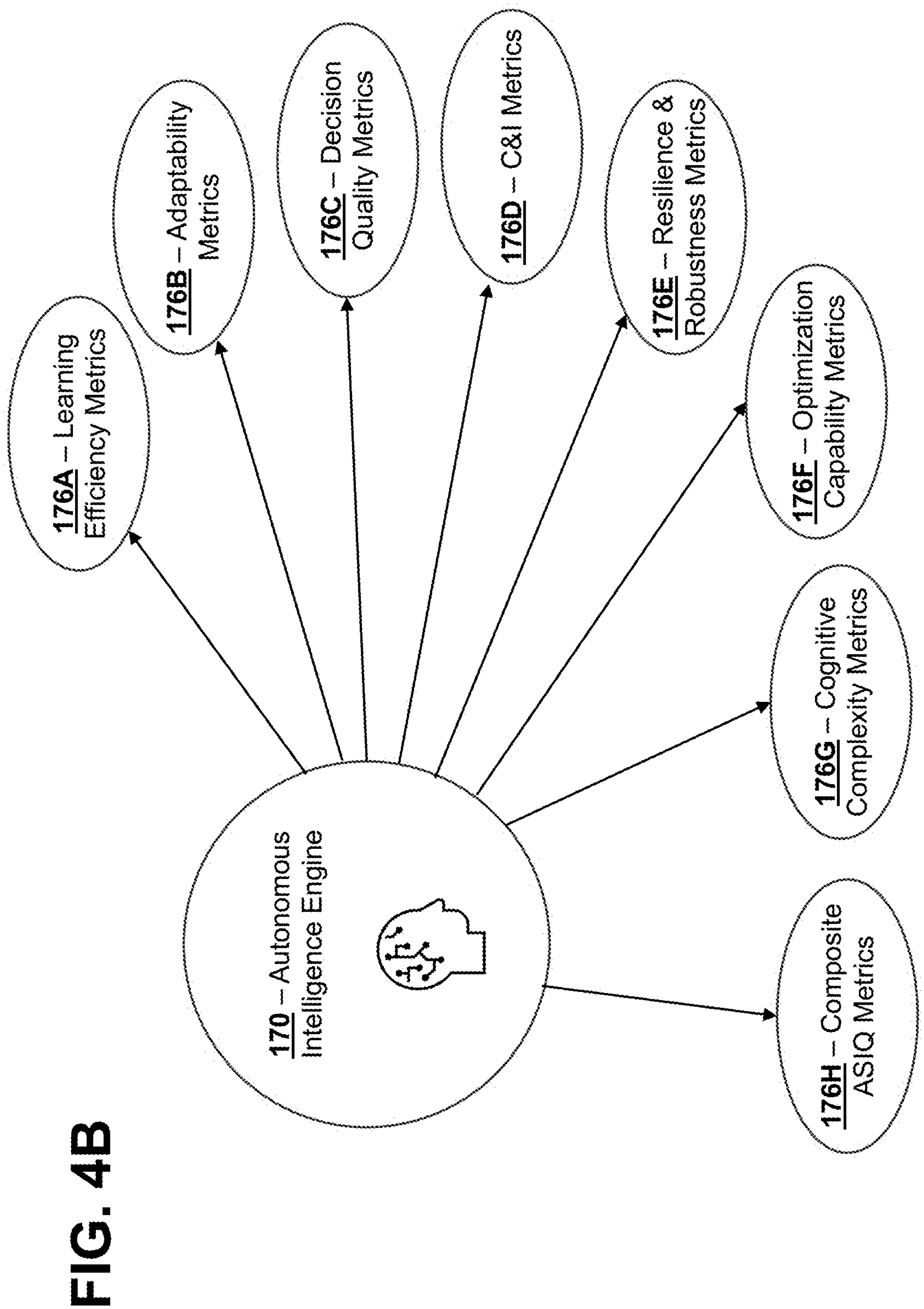
FIG. 4B is a diagram illustrating exemplary adaptive systems intelligence quotient (ASIQ) metrics that can be generated and updated by the autonomous intelligence engine in accordance with certain embodiments.

FIG. 4B is a diagram illustrating exemplary ASIQ metrics 176 that can be generated and/or continuously updated by the autonomous intelligence engine 170. In some cases, the inference model 142 and/or one or more ML models 144 can be configured to generate some or all of the ASIQ metrics 176. The exemplary ASIQ metrics 176 include learning efficiency metrics 176A, adaptability metrics 176B, decision quality metrics 176C, collaboration and interoperability (C&I) metrics 176C, resilience and robustness metrics 176E, optimization capability metrics 176F, cognitive complexity metrics 176G, and/or composite ASIQ metrics 17H.

The efficiency metrics 176A can include metrics that comprise values and/or scores that are generated to quantify or assess one or more of:

- Model Training Time: Time taken for AI/ML models to converge.
- Data Utilization Rate: How effectively the system uses available data to improve performance.
- Concept Drift Detection: Ability to detect and adapt to changes in data patterns over time The adaptability metrics 176B can include metrics that comprise values and/or scores that are generated to quantify or assess one or more of:

- Response Time to Change: Time taken to adjust to new configurations, threats, or workloads.
- Self-Healing Rate: Frequency and success rate of autonomous recovery from failures.
- Configuration Flexibility: Ease of reconfiguration without manual intervention.

The decision quality metrics 176C can include metrics that comprise values and/or scores that are generated to quantify or assess one or more of:

- Accuracy of Predictions/Decisions: Based on historical benchmarks or real-time feedback.
- Context Awareness: Ability to incorporate environmental or situational data into decisions.
- Explainability Score: How well the system can justify its decisions (important for trust).

The collaboration and interoperability metrics 176D can include metrics that comprise values and/or scores that are generated to quantify or assess one or more of:

- API Intelligence: Ability to discover, adapt to, and optimize API usage across systems.
- Cross-System Learning: Sharing insights or models across different platforms or domains.
- Semantic Interoperability: Understanding and translating data meaning across systems.

The resilience and robustness metrics 176E can include metrics that comprise values and/or scores that are generated to quantify or assess one or more of:

- Fault Tolerance Index: Number and severity of faults the system can withstand.
- Security Adaptiveness: Ability to detect and respond to new threats autonomously.
- Redundancy Optimization: Efficient use of backup systems without over-provisioning.

The optimization capability metrics 176F can include metrics that comprise values and/or scores that are generated to quantify or assess one or more of:

- Resource Utilization Efficiency: CPU, memory, bandwidth usage vs. performance.
- Cost-to-Performance Ratio: Financial efficiency of adaptive decisions.
- Latency Reduction Over Time: How adaptation improves speed.

The cognitive complexity metrics 176G can include metrics that comprise values and/or scores that are generated to quantify or assess one or more of:

- Multi-Agent Coordination Score: How well multiple intelligent agents work together.
- Goal Alignment Index: Consistency of system actions with strategic objectives.
- Meta-Learning Capability: Ability to learn how to learn (e.g., tuning its own learning algorithms)

These ASIQ metrics 176 provide various advantages and benefits, including some or all of the following:

- Enhanced Responsiveness: The adaptive ASIQ metrics 176 can permit the ASI platform 150 to respond to changes within the enterprise IT environment 130 proactively, rather than reactively.
- Improved Accuracy: The ASIQ metrics 176 help eliminate, or at least reduce, the likelihood of misinterpreting system performance by incorporating relevant context and complexity.
- Strategic Differentiation: Organizations and/or enterprises can leverage the ASIQ metrics 176 to discover unique value drivers and outperform competitors.
- Risk Mitigation: Predictive and prescriptive ASIQ metrics 176 can help prevent failures by identifying and addressing risks early.
- Scalability and Flexibility: Adaptive ASIQ metrics 176 can evolve with the system, making them suitable for both small projects and enterprise-wide initiatives.

In addition to the various ASIQ metrics 176, the autonomous intelligence engine 170 can be configured to generate one or more composite ASIQ metrics 17H, each of which can include an aggregated or weighted measure that combines multiple individual ASIQ metrics 176 into a single, comprehensive score or assessment.

In some examples, a composite ASIQ metric 17H can be generated, which reflects the overall intelligence, adaptability, and/or resilience of an enterprise IT environment 130 by integrating various KPIs or other relevant metrics across different dimensions, such as learning efficiency, adaptability, decision quality, collaboration, resilience, optimization capability, and/or cognitive complexity. The composite ASIQ metric 17H can be tailored to the priorities of a particular organization or IT environment by assigning different weights to each underlying metric based on factors such as security, performance, and/or cost. This approach allows organizations to visualize and track improvements or regressions in their IT ecosystem's adaptive intelligence over time, providing a holistic view that supports strategic planning, benchmarking, and continuous optimization.

The ASIQ metrics 176 generated by the autonomous intelligence engine 170 can be leveraged for various purposes to improve the operations of an enterprise IT environment.

In one example, ASIQ metrics 176 can be leveraged for strategic alignment purposes by helping organizations align their operations with evolving business goals. The ASIQ metrics 176 enable the identification and adjustment of operational priorities as business objectives change, and improve cross-functional collaboration by linking interdependent KPIs across different departments and teams.

In another example, ASIQ metrics 176 can support decision-making by providing nuanced insights into trade-offs, such as speed versus reliability or profit versus market share. By presenting a comprehensive view of system performance and operational dynamics, the ASIQ metrics 176 enable executives to make informed, data-driven decisions rather than relying solely on intuition or historical precedent.

In a further example, ASIQ metrics 176 can be utilized for performance optimization by identifying hidden drivers of success, such as customer satisfaction or demand patterns, that may not be immediately apparent through traditional metrics. The continuous updating of KPIs based on real-time data allows organizations to refine operational strategies and respond proactively to emerging trends and opportunities.

In yet another example, ASIQ metrics 176 can foster continuous improvement by adapting KPIs to changing conditions within the enterprise IT environment. This approach encourages a culture of learning and agility, where strategies and metrics are iteratively refined to better meet organizational needs and respond to external changes.

In a further example, ASIQ metrics 176 can enhance governance and accountability by shifting the focus from merely achieving KPIs to improving the KPIs themselves. These metrics can support the establishment of governance systems that ensure the ongoing relevance and accuracy of KPIs, promoting transparency and accountability throughout the organization.

In yet a further example, ASIQ metrics 176 can be applied to project management by replacing rigid "traffic light" systems with adaptive grading schemes. This flexibility allows KPIs to be tailored to the specific context of individual projects, improving responsiveness and precision in project evaluation and execution.

As demonstrated above, the ASIQ metrics 176 can provide a versatile framework for enhancing the management and optimization of enterprise IT environments. By supporting strategic alignment, informed decision-making, performance optimization, continuous improvement, governance, and adaptive project management, these metrics enable organizations to respond effectively to changing conditions and drive ongoing operational excellence.

Returning to FIG. 4A, the environmental analysis data 175, including the ASIQ metrics 176, can be accessed by both human administrators or users and autonomous components of the API platform 150 to assess performance and activities within the enterprise IT environment 130 and/or execution actions to optimize or dynamically adapt the enterprise IT environment 130.

In some examples, a user access system 171 associated with the autonomous intelligence engine 170 can enable human administrators or users to review the environmental analysis data 175, including the ASIQ metrics 176. The user access system 171 can include a portal that enables the users to view various graphical user interfaces (GUIs) 173 that present the environmental analysis data 175. The environmental analysis data 175 may be displayed using a variety of visual formats, such as graphs, charts, tables, dashboards, and interactive visualizations, allowing users to easily interpret system metrics, trends, and insights. These visual representations can be customized to highlight key performance indicators, compare historical and real-time data, and provide drill-down capabilities for more detailed analysis of specific domains or operational events within the enterprise IT environment.

In one example, the user access system 171 may generate one or more GUIs 173 for presenting ASIQ metric information, such as a dashboard that displays key performance indicators, composite scores, and trend analyses related to the intelligence, adaptability, and resilience of the enterprise IT environment. This dashboard can utilize visual elements such as line graphs, bar charts, and summary tables to provide users with an at-a-glance overview of current ASIQ metrics, historical trends, and areas requiring attention. Interactive features may allow users to filter metrics by time period, compare performance across different business units, and access detailed explanations of individual ASIQ components.

In another example, the user access system 171 may generate one or more GUIs 173 designed to present architecture layer intelligence, offering users a layered view of the enterprise IT environment 130. This interface can employ stacked charts, heat maps, and/or segmented diagrams to illustrate the status, performance, and interdependencies of various architecture layers, such as infrastructure, security, identity management, data management, and compliance. Users may be able to select individual layers to view more granular metrics, access historical data, and identify cross-layer impacts or dependencies that affect overall system health.

In a further example, the user access system 171 may generate one or more GUIs 173 that present enterprise service level intelligence, providing detailed insights into the performance and status of specific enterprise services. This interface may utilize service-specific dashboards, sortable tables, and/or service health indicators to present metrics such as uptime, resource utilization, security events, and compliance status for each service. Users may be able to drill down into individual services to review operational logs, recent changes, and service-level agreements, as well as compare performance across multiple services or business domains.

In yet another example, the user access system 171 may generate one or more GUIs 173 configured to present information about ongoing events or activities within the enterprise IT environment, such as the statuses of workflow deployments, system updates, and/or incident responses. This interface can include real-time activity feeds, status boards, and event timelines that display the progress, outcomes, and any alerts associated with current operations. Users may be able to monitor the execution of workflow pipelines, view deployment histories, and receive notifications of critical events, enabling timely intervention and effective management of dynamic activities within the IT ecosystem.

In addition to presenting the environment analysis data 175, the GUIs 173 can also be configured with functionalities that enable users to initiate or confirm actions to be executed in connection with adapting, modifying, optimizing, and/or implementing updates in the enterprise IT environment 130. In some examples, the GUIs 173 may include interactive controls that allow users to approve or reject recommended workflow deployments, initiate data migrations, modify access permissions, and/or adjust system configurations based on the intelligence presented. Additionally, users may also utilize the GUIs 173 to schedule updates, trigger compliance audits, and/or roll back recent changes. These actionable features provide administrators with the ability to respond quickly to system insights and maintain optimal performance, security, and compliance within the enterprise IT environment.

As shown in FIG. 4A, the wide-ranging environmental analysis data 175 generated by the autonomous intelligence engine 170 can be accessed by the adaptive control engine 180 described throughout this disclosure. The adaptive control engine 180 can utilize the environmental analysis data 175 to undertake various types of actions within the enterprise IT environment 130, either autonomously or in response to human approvals received via the user access system 171. Further details regarding the functionality of the adaptive control engine 180 are described in other portions of this disclosure, including the discussion below with reference to FIGS. 5A-5C.

The features, functionalities, and/or configurations of the autonomous intelligence engine 170 described herein are provided as examples to demonstrate embodiments. Numerous modifications and variations to the disclosed embodiments are possible, and the techniques described herein can be implemented in many other contexts and environments.

Exemplary Embodiments of the Adaptive Control Engine

The adaptive control engine 180 can be configured to execute adaptive actions within the enterprise IT environment 130 based on intelligence and insights generated by the autonomous intelligence engine 170 and/or other system components. Serving as the "action layer" of the adaptive systems intelligence platform, the adaptive control engine 180 is responsible for implementing changes, optimizations, and/or updates within the enterprise IT environment 130, such as to maintain and enhance system performance, security, and compliance. The adaptive control engine 180 can operate autonomously or in response to human approvals, leveraging artificial intelligence and machine learning models to make informed decisions and implement changes within the environment 130. By integrating cross-domain intelligence, the adaptive control engine 180 enables dynamic adaptation to evolving operational conditions and supports the ongoing resilience and efficiency of the enterprise IT environment.

Figure 5A:
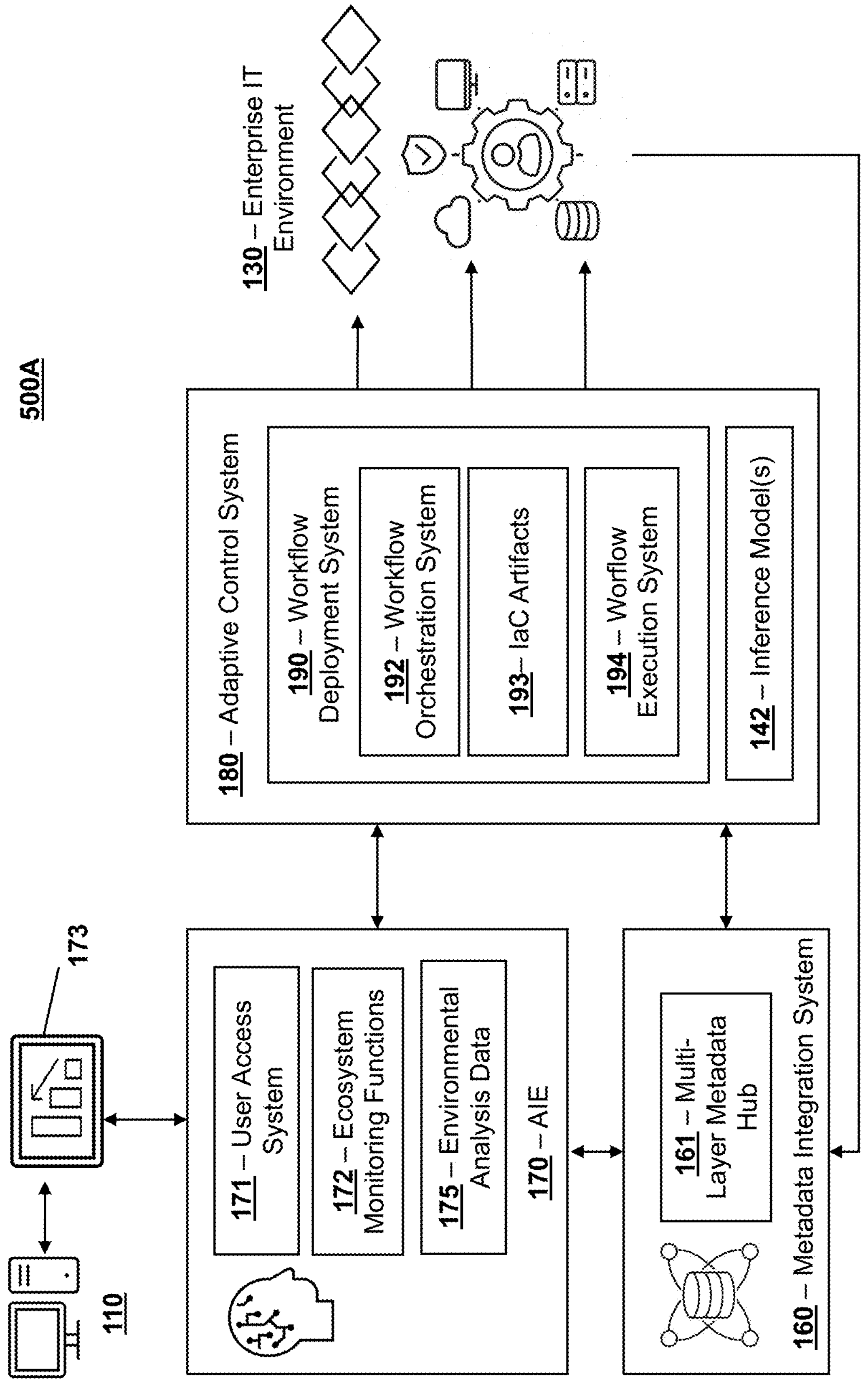
FIG. 5A is a diagram illustrating an exemplary architecture for configuring or implementing an adaptive control engine in accordance with certain embodiments.

FIG. 5A is a diagram illustrating an exemplary architecture 500A for configuring or implementing an adaptive control engine 180 according to certain embodiments.

As described above, the meta integration system 160 can collect, aggregate, and continuously update metadata 165 in a multi-layer metadata hub 161 across various architecture layers 132, enterprise services 134, and/or resources in an enterprise IT environment 130. Additionally, the autonomous intelligence engine 170 can access the metadata 165 to perform enterprise-wide ecosystem monitoring functions 172 and generate various types of environmental analysis data 175, including global and target analytics and insights into the enterprise IT environment 130.

The adaptive control engine 180 can access and utilize both the metadata 165 stored in a multi-layer metadata hub 161 and the environmental analysis data 175 generated by the autonomous intelligence engine 170 to implement various types of adaptive controls in the enterprise IT environment 130. The adaptive control measures can implement both high-level changes (e.g., such as integrations of new enterprise services 134, modifications of protocols employed across architecture layers 132, etc.) and more targeted changes (e.g., modifying data schemas utilized by particular enterprise services 134 or applications, updating IDAM services or network security services with additional security measures, etc.).

The changes and solutions deployed by the adaptive control engine 180 are not limited to a single domain or layer within the enterprise IT environment 130. Rather, the adaptive control engine 180 can implement cross-domain actions that span multiple architecture layers and/or functional areas. For example, a single workflow solution deployed by the engine 180 may involve coordinated updates to infrastructure resources, security protocols, identity management systems, and/or data management processes to address a complex operational need or respond to an emerging risk. By orchestrating changes across different domains, such as infrastructure, security, compliance, applications, and data, the adaptive control engine 180 can implement more comprehensive solutions that are aligned with the overall objectives, policies, and protocols of the enterprise IT environment 130. This cross-layer and cross-domain capability enables the API platform 150 to maintain consistency, optimize performance, and support seamless adaptation to evolving business and technical needs.

In some examples, the analytics and insights captured in the environmental analysis data 175 generated by the autonomous intelligence engine 170 can trigger the adaptive control engine 180 to initiate, execute, or implement the adaptive controls in the enterprise IT environment 130. In this scenario, the adaptive control engine 180 can either autonomously execute changes within the enterprise IT environment 130 as certain conditions are detected or as the system evolves, or can prompt a human user, such as a system administrator, to approve changes prior to deploying the changes. In some examples, a human user may utilize one or more GUIs 173 presented via the user access system 171 to approve, cancel, and/or modify proposed changes to the enterprise IT environment 130. The user can also access one or more GUIs 173 via the user access system 171 that enable the user to develop a solution plan and manually trigger the adaptive control engine 180 to implement changes at any time, regardless of the automated triggering mechanisms that rely on the environmental analysis data 175.

The adaptive control engine 180 can leverage the workflow deployment system 190 to implement some or all of the changes to the enterprise IT environment 130. As explained in further detail below, the workflow deployment system 190 can be configured to execute a series of functions to automate the integration and/or deployment of workflow solutions that incorporate the desired changes in the enterprise IT environment 130.

In certain embodiments, the workflow deployment system 190 can include a workflow orchestration system 192 that is configured to autonomously assemble or generate workflow deployment specifications, which can include a planned hierarchy of execution workflow steps for implementing the target changes in the enterprise IT environment 130. In some examples, the workflow orchestration system 192 can include an inference model 142 that is configured to autonomously synthesize or generate the workflow deployment specifications using the system metadata 165 to understand the current state of the enterprise IT environment 130 and leverage infrastructure-as-code (IaC) artifacts 193 to implement various workflow steps identified in the synthesized deployment specifications. A workflow execution system 194 can then deploy or integrate the automated workflow solutions in the enterprise IT environment 130 to incorporate the target changes. Further details of the workflow deployment system 190 are described below.

Figure 5B:
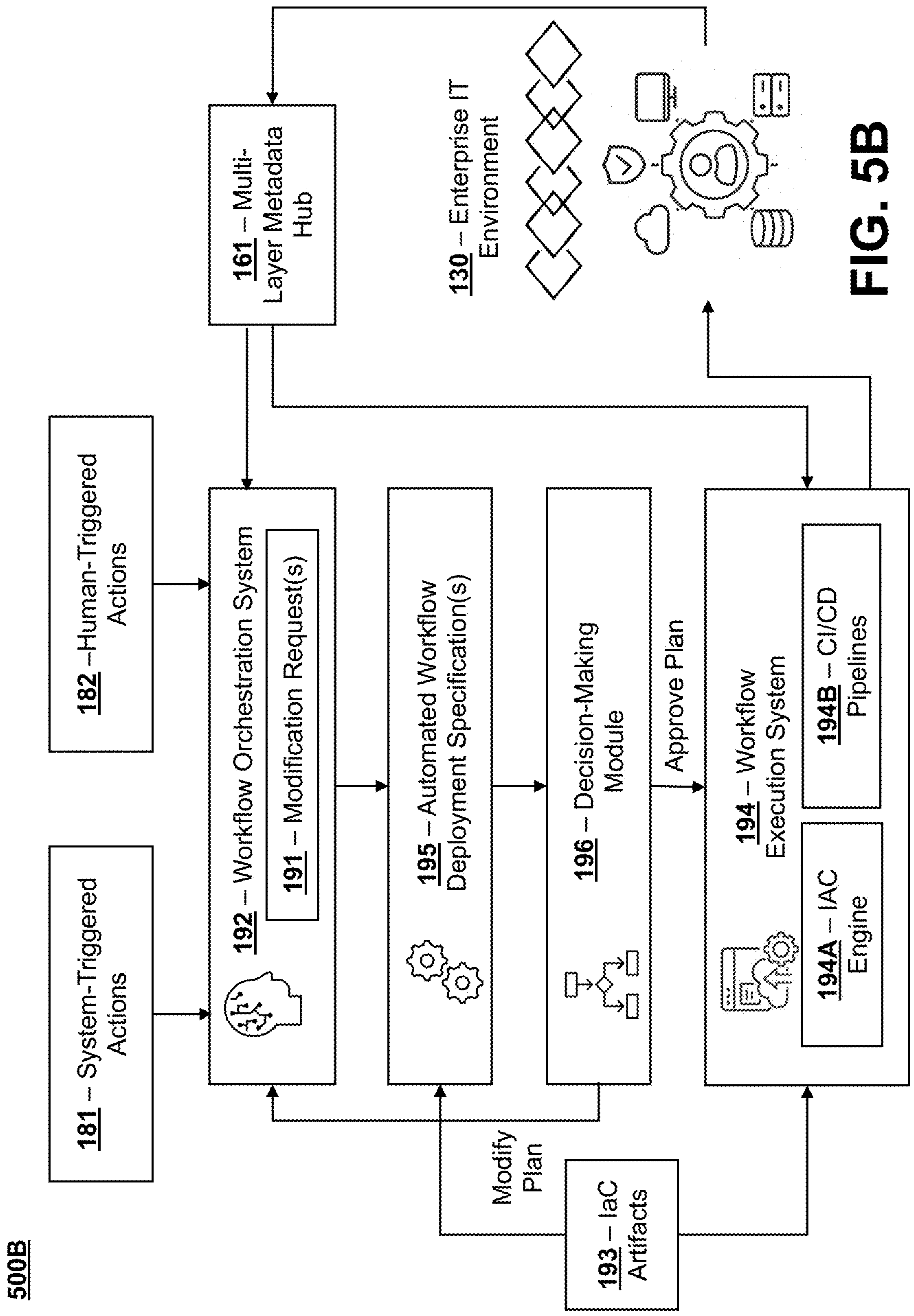
FIG. 5B is a flow diagram illustrating an exemplary process executed by a workflow deployment system in accordance with certain embodiments.

FIG. 5B illustrates an exemplary process 500B that may be executed by the workflow deployment system 190 according to certain embodiments. Amongst other things, this process flow 500B demonstrates how the workflow deployment system 190 can synthesize automated workflow deployment specifications 195 to facilitate the deployment of target changes in an enterprise IT environment 130

The workflow deployment system 190 can be triggered or activated in various ways, including both autonomous and human-activated triggering or activation mechanisms.

In some embodiments, system-triggered actions 181 can initiate the workflow deployment system 190 based on intelligence, insights, and/or thresholds identified within the environmental analysis data 175 generated by the autonomous intelligence engine 170. For example, if the autonomous intelligence engine 170 detects a performance degradation, security risk, or compliance issue (e.g., as reflected by specific thresholds, metrics, or alerts in the environmental analysis data 175), the system can automatically trigger the workflow deployment system 190 to deploy or prepare an automated workflow solution to implement a corrective workflow, update configurations, and/or implement various controls. These system-triggered actions 181 enable the workflow deployment system 190 to respond rapidly and autonomously to changing conditions, enabling the enterprise IT environment 130 to remain optimized, secure, and compliant without requiring manual intervention.

In addition to system-triggered actions, the workflow deployment system 190 can also be activated through human-triggered actions 182. For example, an administrator or user may access the user access system 171 to manually initiate the workflow deployment system 190. In some scenarios, a user may wish to implement changes in the enterprise IT environment 130 to roll out new features, implement a configuration update, or adapt the environment to accommodate new business goals. In this scenario, one or more GUIs 173 presented via the user access system 171 may enable the user to plan, review, and deploy specific workflow solutions within the enterprise IT environment 130. This manual activation allows users to exercise direct control over workflow deployments, enabling them to address unique operational requirements, respond to unforeseen events, or implement custom solutions as needed.

Regardless of how the workflow deployment system 190 is triggered, the workflow orchestration system 192 can utilize a specialized inference model 142 to synthesize, generate, or assemble an automated workflow deployment specification 195 to implement the target changes in the enterprise IT environment 130. The workflow orchestration system 192 may receive modification requests 191, which identify the desired changes to be implemented within the enterprise IT environment 130 and/or which identify one or more objectives associated with implementing the target changes. Upon receiving a modification request 191, the inference model 142 can interpret the desired changes or objectives, evaluate the current status or configuration of the enterprise IT environment 130, and autonomously assemble or generate one or more automated workflow deployment specifications 195 to implement the changes or objectives identified in the modification request 191.

The types of changes and/or objectives that can be identified by a modification request 191 are extremely wide-ranging, and can encompass both global-level modifications and more specific, targeted adjustments. Additionally, the modification requests 191 can include both system-generated requests and/or human-specified requests.

In some examples, the changes or modifications identified by a modification request 191 may include:

- a request to integrate a new enterprise service 134, modify an existing enterprise service 134, and/or replace an enterprise service 134 with an updated enterprise service 134;
- a request to migrate data from one storage location to another storage location;
- a request to update security and/or compliance protocols or settings for a particular enterprise service 134 and/or globally across the enterprise ecosystem;
- a request to modify data schemas for particular enterprise services 134 or globally across the enterprise ecosystem;
- a request to adjust access control policies or user permissions for specific services or data sets;
- a request to reconfigure network settings or connectivity parameters;
- a request to deploy application or software updates across selected systems;
- a request to optimize resource allocation, such as scaling infrastructure or reallocating compute and storage resources;
- a request to implement new monitoring or alerting rules;
- a request to automate backup, disaster recovery, or data retention processes;
- a request to orchestrate multi-step workflow pipelines that coordinate actions across multiple domains or layers within the enterprise IT environment;
- a request to update or synchronize identity and access management (IDAM) configurations, such as provisioning or deprovisioning user accounts, enforcing multi-factor authentication, or updating group memberships;
- a request to deploy or modify analytics workflows, including the integration of new data sources, updating analytic models, or generating new reports and dashboards;
- a request to enhance data quality management processes, such as initiating data profiling, cleansing, or enrichment operations across selected datasets; and/or
- a request to modify master data management (MDM) configurations, such as updating master data entity definitions, adjusting data stewardship assignments, synchronizing master data across systems, or implementing new data validation and deduplication rules.

In other examples, the modification request 191 may identify one or more objectives that more broadly describe or identify a set of target changes that are desired, such as:

- a request to optimize storage of the enterprise data to minimize latency, minimize costs, maximize availability:
- a request to migrate all enterprise data storage to a specific cloud service or storage location;
- a request to enhance data security and compliance across all storage and processing environments;
- a request to standardize data schemas and formats across multiple business units or applications;
- a request to automate backup and disaster recovery processes for critical enterprise data;
- a request to consolidate redundant data sources and eliminate duplicate records;
- a request to implement organization-wide data retention and archiving policies;
- a request to enable real-time data synchronization between on-premises and cloud environments;
- a request to improve data accessibility for analytics and reporting purposes;
- a request to enforce new access control policies for sensitive datasets;
- a request to integrate new regulatory compliance requirements into existing workflows;
- a request to scale infrastructure resources dynamically in response to workload changes;
- a request to decommission legacy systems and migrate associated data and services;
- a request to implement automated monitoring and alerting for key enterprise services; and/or
- a request to orchestrate the rollout of software updates or patches across distributed environments.

The above examples demonstrate the wide-ranging nature of the modification requests 191. However, it should be noted that the modification request 191 can incorporate many other types of changes, objectives, or modifications to the enterprise IT environment 130.

In response to receiving a modification request 191, the workflow orchestration system 192 can assemble one or more automated workflow deployment specifications 195 to implement the requested changes or objectives in the enterprise IT environment 130. In some examples, the workflow orchestration system 192 can leverage an inference model 142 associated with the AI system 140 to generate or synthesize these automated workflow deployment specifications 195. The inference model 142 may be specially trained to interpret the specific changes or objectives identified in the modification request 191, evaluate the current state and configuration of the environment 130, and develop a corresponding automated workflow deployment specification 195 that implements the target changes or objectives.

In generating the automated workflow deployment specification 195, the inference model 142 may access metadata 165 stored in the multi-layer metadata hub 161, environmental analysis data 175 generated by the autonomous intelligence engine 170, and/or user-specified configuration criteria.

The inference model 142 may utilize the metadata 165 to gain a comprehensive understanding of the current state and configuration of the enterprise IT environment 130 and/or specific enterprise services 134 or resources in the environment 130. By analyzing the metadata 165, the inference model 142 can identify existing system configurations, resource allocations, data schemas, and/or service interdependencies that may be relevant to the requested changes. Additionally, the metadata 165 can provide information about current security and compliance protocols, access controls, and operational policies that must be maintained or updated as part of the modification process. This contextual awareness enables the inference model 142 to generate automated workflow deployment specifications 195 that are tailored to the specific requirements and constraints of the environment 130, enabling the workflow deployment system 190 to implement the changes in a manner that preserves system integrity, maintains compliance, aligns with security protocols, and/or aligns with organizational objectives.

In one example, a modification request 191 may include a request to integrate a new IDAM service into all existing user-facing applications in the environment 130. In this exemplary scenario, the inference model 142 can analyze the metadata 165 to determine which user-facing applications are currently deployed, the authentication and authorization mechanisms currently in use, and any dependencies or integration points between applications and existing identity management systems. The metadata 165 may also reveal relevant access control lists, user roles, and compliance requirements that should be addressed during the integration. By synthesizing this information, the inference model 142 can generate an automated workflow deployment specification 195 that specifies the necessary steps to connect the new IDAM service to each application, update configuration files, migrate user credentials if needed, and ensure that security and compliance standards are upheld throughout the process.

In another example, the modification request 191 may include a request to optimize data storage across the enterprise IT environment 130 in a manner that minimizes latency. In this scenario, the inference model 142 can analyze the metadata 165 to identify the current storage geographic locations of various data sets, access patterns, usage frequency, and network topology. The metadata 165 may also provide information about data transfer times, storage tier assignments, and dependencies between data sources and consuming applications. By evaluating these factors, the inference model 142 can determine which data sets would benefit from being relocated to lower-latency storage solutions and/or geographically closer data centers. The inference model 142 can then generate an automated workflow deployment specification 195 that outlines the necessary data migrations, updates to storage configurations, and any required changes to access controls or data routing.

The inference model 142 associated with the workflow orchestration system 192 also may leverage the environmental analysis data 175 generated by the autonomous intelligence engine 170 in various ways to generate or optimize the automated workflow deployment specifications 195. For example, the environmental analysis data 175 may provide real-time and historical insights into system performance, resource utilization, security incidents, and compliance status across the enterprise IT environment 130. By incorporating this intelligence, the inference model 142 can identify current bottlenecks, predict potential risks, and/or prioritize actions that align with operational objectives. The environmental analysis data 175 may also highlight trends or anomalies that inform the selection of optimal deployment workflow steps, resource allocations, or timing for implementing changes. This integration of environmental analysis data enables the inference model 142 to develop automated workflow deployment specifications 195 that are not only responsive to the current state of the environment but also proactively address emerging needs and support ongoing optimization.

In generating the workflow deployment specification 195, the inference model 142 also may utilize or incorporate user-specified configuration criteria to generate the automated workflow deployment specifications 195. For example, these criteria can include explicit requirements or preferences provided by administrators or users, such as desired performance thresholds, security policies, compliance mandates, preferred storage locations, or scheduling constraints. The user-specified configuration criteria may further define resource allocation limits, integration preferences with specific applications or services, or custom workflow steps that must be included or excluded. By taking these criteria into account, the inference model 142 can tailor the automated workflow deployment specifications 195 to meet organizational objectives, operational policies, and unique business needs, ensuring that the resulting plan aligns with both system intelligence and user intent.

After the initial workflow deployment specification 195 is created by the inference model 142, a decision-making module 196 can receive the specification 195 for review and approval. The decision-making module 196 can permit a human reviewer and/or an autonomous AI system (e.g., an LLM-implemented review module) to review the workflow deployment specification 195 and determine whether or not to utilize the workflow deployment specification 195 to deploy the target changes or workflows in the enterprise IT environment 130.

In some examples, some or all of the automated workflow deployment specifications 195 may require approval of an administrator or human user prior to being deployed or implemented within the enterprise IT environment 130. In this scenario, the decision-making module 196 may present the workflow deployment specification 195, or a summary of the workflow deployment specification 195, to the human reviewer with options to approve, reject, or modify the plan.

If a human reviewer wishes to modify an automated workflow deployment specification 195 (e.g., changing certain workflow steps, adjusting storage schemes, etc.), the user can utilize one or more GUIs 173 to specify the desired modifications, and these modifications can be sent back to the workflow orchestration system 192. In response to receiving the user-specified modifications, the inference model 142 can modify the initial automated workflow deployment specification 195 to incorporate the requested changes and pass the modified automated workflow deployment specification 195 back to the decision-making module 196 with the same options to approve, reject, or modify the plan. Once an automated workflow deployment specification 195 is approved by the user, the automated workflow deployment specification 195 may be passed to the workflow execution system 194 for deployment.

In some embodiments, an autonomous AI-based or LLM-based system can be integrated with the decision-making module 196 to perform the same or similar analysis as a human reviewer. The AI-implemented or LLM-implemented review module can automatically evaluate the automated workflow deployment specification 195 by analyzing its components, assessing the proposed changes, and/or determining whether the plan meets predefined criteria for deployment. This autonomous system can review the workflow steps, resource allocations, and configuration changes, and can provide recommendations to approve, reject, or request modifications to the plan, mirroring the decision-making process typically performed by a human reviewer.

The autonomous decision-making system can also perform a variety of checks or validations to ensure that the automated workflow deployment specification 195 aligns with established organizational policies, operational goals, and/or compliance and security protocols. For example, the system can validate that the proposed changes adhere to security protocols, data governance standards, and/or resource allocation limits. It can also verify that the workflow does not conflict with existing configurations or introduce potential risks. By conducting these validations, the autonomous decision-making system helps maintain consistency, compliance, and operational integrity within the enterprise IT environment.

It should be noted that, in some embodiments, the decision-making module 196 may not be required, and the automated workflow deployment specification 195 can be passed directly from the workflow orchestration system 192 to the workflow execution system 194. This approach can enable a fully automated deployment of workflow solution plans, streamlining the automated deployment of changes to the enterprise IT environment 130.

In other embodiments, a hybrid system may be employed in which certain types of modifications require human review and approval, while others can be deployed automatically or with only autonomous review by the AI-based or LLM-based system. For example, changes that impact critical infrastructure, security protocols, and/or compliance requirements may be routed to an administrator for manual approval, whereas routine updates, optimizations, or low-risk modifications can proceed through automated or semi-automated review processes. This flexible approach allows organizations to balance the need for oversight and control with the efficiency and speed of automated deployment, tailoring the review process to the risk profile and importance of each proposed change.

After an automated workflow deployment specification 195 is approved and passed to the workflow execution system 194, an inference model 142 associated with this workflow execution system 194 can execute a series of operations to deploy the automated workflow deployment specification 195 in the enterprise IT environment 130. This inference model 142 may be the same inference model 142 utilized by the workflow orchestration system 192 or may be a separate inference model 142.

In certain embodiments, the automated workflow deployment specification 195 synthesized by the workflow orchestration system 192 may comprise a hierarchy of ordered workflow steps, each of which may be segregated into one or more sub-steps. The ordering of the workflow steps and sub-steps can be determined based on dependencies, operational priorities, or logical sequencing required to achieve the intended outcome or target changes in the enterprise IT environment 130. The workflow execution system 194 can deploy the changes or objectives identified in a modification request 191 by separately executing or implementing each step (and each sub-step) of the automated workflow deployment specification 195 according to the hierarchical structure, accounting for dependencies that may necessitate certain steps or sub-steps be performed before others.

To illustrate by way of example, consider a modification request 191 for the integration of a new enterprise service 134 that provides customers with access to an existing data repository, and which requires the system to satisfy certain minimum threshold speed requirements in serving the data to the customers. Further assume that the workflow orchestration system 192 developed an automated workflow deployment specification 195 that involves workflow steps including: 1) migrating the existing data repository to a new cloud location to satisfy the minimum threshold speed requirements; 2) integrating the new customer-facing enterprise service 134 into the environment; and 3) and connecting the new enterprise service 134 to the migrated storage location.

To implement this automated workflow deployment specification 195, the workflow execution system 194 may execute various tasks corresponding to the sub-steps of each workflow step, taking into account the dependencies among the steps and sub-steps. For example, the data migration step can be broken down into multiple sub-steps, each of which must be completed in a specific order. These sub-steps may include: (1) provisioning a new cloud-storage location that satisfies the required performance and capacity criteria; (2) configuring the schema of the new storage location to match the existing data repository; (3) extracting the data from the current repository; and (4) loading the extracted data into the newly provisioned cloud storage location. When the workflow execution system 194 implements this data migration step, each sub-step may depend on the successful completion of one or more previous sub-steps (e.g., for instance, data cannot be loaded until the new storage location is provisioned and properly configured).

The other steps of the workflow, which involve integrating and connecting the enterprise service 134 to the migrated storage location, also may include a similar series of sub-steps with dependencies that can be accounted for by the workflow execution system 194. This hierarchical and dependency-aware approach ensures that complex operations, such as data migration and service integration, are executed systematically and reliably, reducing the risk of errors.

In certain embodiments, in order to deploy the changes or objectives corresponding to a given automated workflow deployment specification 195, the workflow execution system 194 can access a database or repository that stores a collection of infrastructure-as-code (IaC) artifacts 193 to implement each workflow step and/or sub-step associated with the workflow deployment specifications 195. The inference model 142 associated with the workflow execution system 194 may select and customize one or more IaC artifacts 193 to implement each workflow step or sub-step, and deploy or integrate the customized IaC artifacts 193 in a cloud-based environment and/or other type of environment associated with the enterprise IT environment 130 to automate and streamline the deployment process.

In some cases, in generating the automated workflow deployment specification 195, the inference model 142 utilized by the workflow orchestration system 192 may select and identify the suitable IaC artifacts 193, and these selections may be incorporated into the automated workflow deployment specification 195. Additionally, or alternatively, the identification and selection of the IaC artifacts 193 can be performed by the workflow execution system 194 based on an analysis of the automated workflow deployment specification 195 generated by the workflow orchestration system 192. Thus, any portion of this disclosure that discusses activities related to identifying, selecting, and/or customizing the IaC artifacts 193 can be performed by either the workflow orchestration system 192 and/or the workflow execution system 194.

Each IaC artifact 193 can correspond to a predefined, reusable configuration file or blueprint that enables computing infrastructure to be provisioned and deployed. For example, each IaC artifact 193 can include a codified definition of one or more infrastructure resources (e.g., compute, storage, networking, security groups, etc.), which enables the consistent and repeatable deployment of infrastructure without manually configuring hardware or cloud services. Exemplary IaC artifacts 193 may be included in a proprietary format and/or other third-party formats, such as those associated with Terraform, AWS CloudFormation, Azure Resource Manager (ARM) templates, or Google Cloud Deployment Manager.

In some examples, the IaC artifacts 193 can be specially configured to facilitate deployments in target cloud environments 135 associated with the enterprise IT environment 130. For example, the IaC artifacts 193 may include templates or configuration files tailored for specific cloud service providers or environments such as AWS, Azure, or Google Cloud, enabling seamless provisioning and management of cloud resources. In some embodiments, the IaC artifacts 193 also can be utilized to facilitate deployments in other environments, such as one or more on-premises environments 136 associated with the enterprise IT environment 130.

As explained below, the workflow execution system 194 can access and customize various types of IaC artifacts 193 to implement particular workflow steps or sub-steps included in an automated workflow deployment specification 195. For a given automated workflow deployment specification 195, the inference model 142 associated with the workflow execution system 194 may select a plurality of IaC artifacts 193 from the repository based on their applicability to specific types of activities involved with the workflow steps and sub-steps. The inference model 142 can then customize and adapt each of the selected IaC artifacts 193 based on the target changes to be implemented and/or based on the metadata 165 and environmental analysis data 175 of the ASI platform 150.

In certain embodiments, the workflow orchestration system 192, workflow execution system 194, and/or other component of the workflow deployment system 190 also may include, or communicate with, an AI code generation system that is configured to automatically generate software code, source code, or computer instruction logic to facilitate deployment of the target changes and/or workflow deployment specification 195 in the enterprise IT environment 130. In some examples, the AI code generation system includes an inference model 142, a language model 142A, or an LLM associated with the AI system 140.

In certain embodiments, the AI code generation system can receive inputs corresponding to high-level deployment objectives, workflow steps, and/or configuration requirements and may output executable code, scripts, or configuration files in various programming or scripting languages (e.g., such as Python, YAML, JSON, or shell scripts). In some examples, this code can be tailored to automate infrastructure provisioning, application deployment, configuration management, and/or integration with third-party services. In some cases, the AI code generation system may dynamically adapt the generated code based on the current state of the enterprise IT environment, metadata from the multi-layer metadata hub, generated system intelligence, and/or feedback from previous deployments. By leveraging this capability, the workflow deployment system 190 can streamline and accelerate the deployment process, reduce manual coding effort, and enable rapid adaptation to evolving operational requirements within the enterprise IT environment.

Figure 5C:
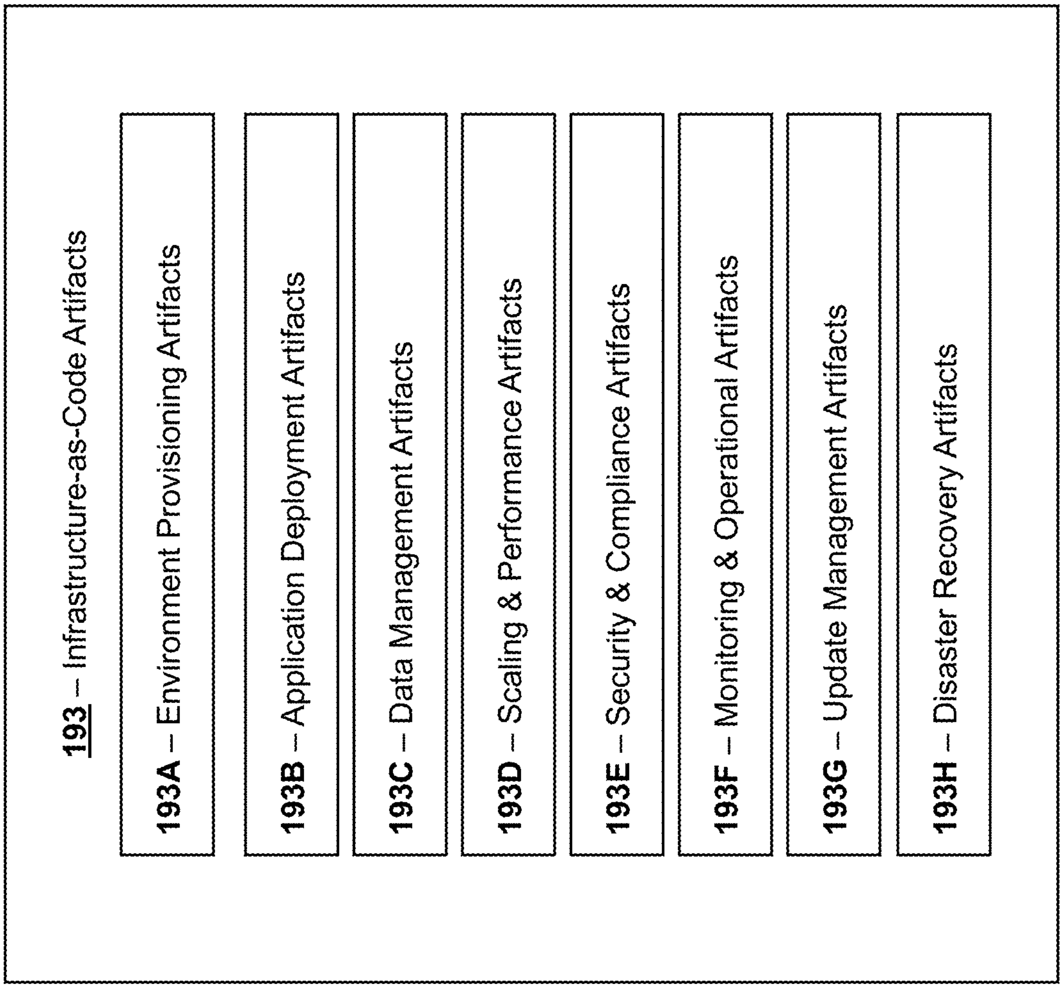
FIG. 5C is a block diagram illustrating exemplary categories of infrastructure-as-code (IaC) artifacts that may be utilized by a workflow execution system to deploy workflow solution plans in accordance with certain embodiments.

FIG. 5C is a block diagram illustrating exemplary categories of IaC artifacts 193 that may be utilized by the workflow execution system 194 to deploy changes and/or workflows in an enterprise IT environment 130 according to certain embodiments.

Environmental Provisioning Artifacts 193A: These artifacts can include infrastructure-as-code resources, definitions, templates, and/or scripts for creating or replicating computing environments. In some examples, the environmental provisioning artifacts 193A can comprise IaC templates for initial environment setup processes (e.g., provisioning virtual machines, networks, storage, etc.), multi-environment deployments (e.g., development environments, staging environments, production environments, etc.), and/or testing environment instantiations.

Application Deployment Artifacts 193B: These artifacts can include infrastructure-as-code resources, definitions, templates, and/or scripts for delivering and configuring applications or services. In some examples, application deployment artifacts 193B may comprise service installation instructions for APIs, microservices, or serverless functions, container orchestration configurations for various platforms (e.g., such as Kubernetes or Docker), and templates for injecting dependencies or application-specific configurations.

Data Management Artifacts 193C: These artifacts can include infrastructure-as-code resources, definitions, templates, and/or scripts for managing data operations and migrations. In some examples, data management artifacts 193C may comprise database schema deployment templates (e.g., tables, indexes, schemas, etc.), data migration scripts for moving data between storage systems or databases, backup and restore definitions, and data transformation pipeline configurations.

Scaling & Performance Artifacts 193D: These artifacts can include infrastructure-as-code resources, definitions, templates, and/or scripts for adapting resources to workload demands and optimizing system performance. In some examples, scaling and performance artifacts 193D may comprise auto-scaling rules for virtual machines or containers, load balancing configurations, caching layer deployment templates, and performance tuning specifications.

Security & Compliance Artifacts 193E: These artifacts can include infrastructure-as-code resources, definitions, templates, and/or scripts for implementing governance, access controls, and regulatory compliance. In some examples, security and compliance artifacts 193E may comprise identity and access management policy definitions, encryption configuration templates, network security group or firewall rules, and compliance enforcement rules such as GDPR or HIPAA constraints.

Monitoring & Operational Artifacts 193F: These artifacts can include infrastructure-as-code resources, definitions, templates, and/or scripts that enable observability and ongoing operational management. In some examples, monitoring and operational artifacts 193F may comprise logging and telemetry configuration files, health-check definitions, alerting and notification setup scripts, and resource drift detection templates.

Update Management Artifacts 193G: These artifacts can include infrastructure-as-code resources, definitions, templates, and/or scripts for managing modifications and updates over time. In some examples, update management artifacts 193G may comprise infrastructure upgrade definitions for patching or version updates, rolling update workflows, database schema evolution scripts for updates without downtime, and feature toggle deployment templates.

Disaster Recovery Artifacts 193H: These artifacts can include infrastructure-as-code resources, definitions, templates, and/or scripts that help ensure system availability and continuity after failures. In some examples, disaster recovery artifacts 193H may comprise failover and fallback deployment instructions, replication and redundancy specifications, recovery point objective (RPO) policy templates, and region-based recovery deployment configurations.

The categories of infrastructure-as-code (IaC) artifacts illustrated in FIG. 5C are provided as examples to demonstrate the types of artifacts that may be accessed and utilized by the workflow execution system 194 to facilitate deployments. However, these categories are not exhaustive, and many other types of artifacts also can be accessed depending on the specific enterprise IT environment and the nature of the workflow being implemented. Examples of additional IaC artifacts 193 may include custom scripts, specialized configuration files, integration templates for third-party services, automation routines for emerging technologies, and/or any other resources that facilitate the automated deployment, management, or adaptation of IT infrastructure and services.

Returning to the description of FIG. 5B, a collection of IaC artifacts 193 can be selected to implement the workflow steps and sub-steps of each automated workflow deployment specification 195, and each IaC artifact 193 can be adapted based on the target changes and objections and the state or configuration of the enterprise IT environment 130 where those changes are being deployed. As explained above, the selection and adaptation of the IaC artifacts 193 can be performed by the workflow orchestration system 192, workflow execution system 194, or a combination thereof.

In some examples, an inference model 142 associated with the workflow deployment system 190 can modify and/or adapt each selected IaC artifact 193 based on the specific objectives and/or the target changes identified in the modification request 191 and/or automated workflow deployment specification 195. For instance, if an objective is to optimize for performance, the inference model 142 may modify resource allocation parameters, adjust scaling rules, and/or update configuration settings within the artifact to meet the desired performance criteria. Similarly, if an objective is to enhance security or ensure compliance, the inference model 142 can update policy definitions, access controls, and/or encryption settings within the artifact to align with the relevant requirements.

In addition, the inference model 142 can utilize metadata 165 stored in the multi-layer metadata hub 161 to further modify and/or the IaC artifacts 193. By analyzing the metadata 165, the inference model 142 can identify current system configurations, resource dependencies, network topologies, and compliance constraints that should be considered when customizing the artifacts 193. This enables the inference model 142 to generate artifact configurations that are compatible with the existing environment, avoid conflicts with other services, and ensure that the deployed changes integrate seamlessly with the broader enterprise IT environment 130.

Furthermore, the inference model 142 may leverage other types of system data to modify and/or the IaC artifacts 193. This can include relevant environmental analysis data 175 generated by the autonomous intelligence engine 170, real-time operational data, historical performance metrics, incident logs, or user-specified configuration criteria. By incorporating these additional data sources, the inference model 142 can make informed adjustments to the artifacts, such as tuning parameters based on observed workload patterns, incorporating lessons learned from past incidents, or honoring user preferences and scheduling constraints.

After modifying or adapting the selected IaC artifacts 193, the workflow execution system 194 and/or its corresponding inference model 142 can deploy the artifacts 193 according to the hierarchical dependency structure defined in the automated workflow deployment specification 195 to implement the new workflow solution within the enterprise IT environment 130.

In some embodiments, the deployment process can involve feeding the customized IaC artifacts 193 into an IaC engine 194A, which interprets the artifacts, translates them into the API calls, and/or provisions the specified resources in the target environment (e.g., in a target cloud environment 135 and/or on-premises environment 136). In some examples, the IaC engine 194A can communicate with cloud provider APIs, virtualization platforms, and/or container orchestrators to instantiate resources such as virtual machines, storage, networking components, and security configurations according to the specifications defined in the artifacts 193. Throughout the lifecycle of the deployed resources, the workflow deployment system 190 and/or adaptive control engine 180 can maintain a state file to track what has been provisioned, enabling it to manage updates, modifications, or deletions in subsequent deployments.

In some embodiments, the IaC engine 194A can be integrated with the workflow execution system 194. Additionally, or alternatively, the IaC engine 194A may be hosted by a third-party server system. In some examples, the IaC engine 194A may be a dedicated module or service, such as Terraform CLI, AWS CloudFormation, or Azure Resource Manager, that is capable of interpreting the IaC artifacts 193 generated or adapted by the inference model 142.

Additionally, or alternatively, the inference model 142 can leverage one or more continuous integration and continuous delivery (CI/CD) pipelines 194B to automate the deployment of IaC artifacts 193. In this approach, the IaC artifacts 193 are integrated into a CI/CD pipeline 194B, which orchestrates a series of automated steps from code commit to production deployment. When a new or updated artifact 193 is committed to the repository, the pipeline 194B can automatically build, test, and validate the changes before deploying the infrastructure to development, staging, or production environments. In some examples, CI/CD pipeline tools, such as GitHub Actions, Jenkins, or GitLab CI, can be used to ensure that infrastructure changes are delivered in a reliable, repeatable, and hands-off manner, supporting both continuous delivery and continuous deployment models. This automation enhances the speed, consistency, and reliability of infrastructure provisioning and management within the enterprise IT environment.

In certain embodiments, the creation of the automated workflow deployment specifications and/or the deployment of changes within the enterprise IT environment can include leveraging an AI-based code generation system to implement one or more changes. This AI-based code generation system may be configured to autonomously generate programming code in various languages (e.g., such as Python, JavaScript, YAML, JSON, or other scripting and configuration languages) commonly used for infrastructure automation, workflow orchestration, or application deployment. The AI-based code generation system can receive high-level objectives, workflow steps, and/or deployment specifications as an input and output executable code or configuration files tailored to the specific needs of the enterprise environment. In some embodiments, the AI-based code generation system may be implemented using an inference model 142 or a language model 142A, which is trained or fine-tuned to understand enterprise IT operations and generate syntactically correct and contextually appropriate code and/or IaC artifacts. By integrating this AI-based code generation capability, the system can further streamline and automate the process of constructing, customizing, and deploying workflow solutions, reducing manual coding effort and enabling rapid adaptation to evolving operational requirements.

As described in other portions of this disclosure, an enterprise IT environment 130 may extend across one or more cloud environments 135, one or more on-premises environments 136, or any combination thereof. This means that different components, services, and/or architecture layers can be distributed and operated in various deployment models to best meet organizational needs. The workflow deployment system 190 can be designed to support this flexibility by executing deployments in any of these environments, whether cloud-based, on-premises, or hybrid. As a result, workflow solution plans can be implemented seamlessly across diverse infrastructure landscapes, enabling organizations to optimize resource utilization, maintain compliance, and adapt to evolving business and technical requirements.

After deployment, the metadata integration system 160 can be configured to collect, aggregate, and/or store metadata 165 corresponding to any activities executed by the adaptive control engine 180 and/or the workflow deployment system 190. This includes metadata 165 any data related to the assembly of the automated workflow deployment specification 195 and/or deployment of workflow solution in the environment 130. In some examples, the metadata 165 can include data points that capture the workflow steps and sub-steps included in the automated workflow deployment specification 195, the IaC artifacts 193 utilized to implement the automated workflow deployment specification 195, etc. In further examples, the metadata 165 can include data points that capture configuration changes, resource provisioning events, execution timestamps, workflow step completion statuses, error or exception logs, user approvals or overrides, policy enforcement actions, and performance metrics associated with the deployment process.

By capturing metadata 165 related to the actions and outcomes of the adaptive control engine 180 and workflow deployment system 190, the metadata integration system 160 can provide a comprehensive and transparent record of all adaptive operations within the enterprise IT environment. This enables traceability, auditability, and continuous improvement of automated processes, supporting both operational oversight and ongoing optimization efforts.

Additionally, after the deployed workflow solutions are integrated into the enterprise IT environment 130, the metadata integration system 160 can collect metadata 165 corresponding to any newly deployed services, resources, and/or configurations. This includes capturing information about the characteristics, status, and operational metrics of new services, as well as any changes to existing infrastructure or applications resulting from the deployment. By continuously updating the multi-layer metadata hub 161 with metadata related to newly integrated workflows or components, the metadata integration system 160 ensures that the platform maintains an accurate and up-to-date view of the entire enterprise IT environment. This ongoing collection of metadata supports effective monitoring, management, and optimization of both new and existing services within the ecosystem.

The features, functionalities, and/or configurations of the adaptive control engine 180 and workflow deployment system 190 described herein are provided as examples to demonstrate embodiments. Numerous modifications and variations to the disclosed embodiments are possible, and the techniques described herein can be implemented in many other contexts and environments.

Exemplary ASI Domain Systems & Use Cases

Figure 6:
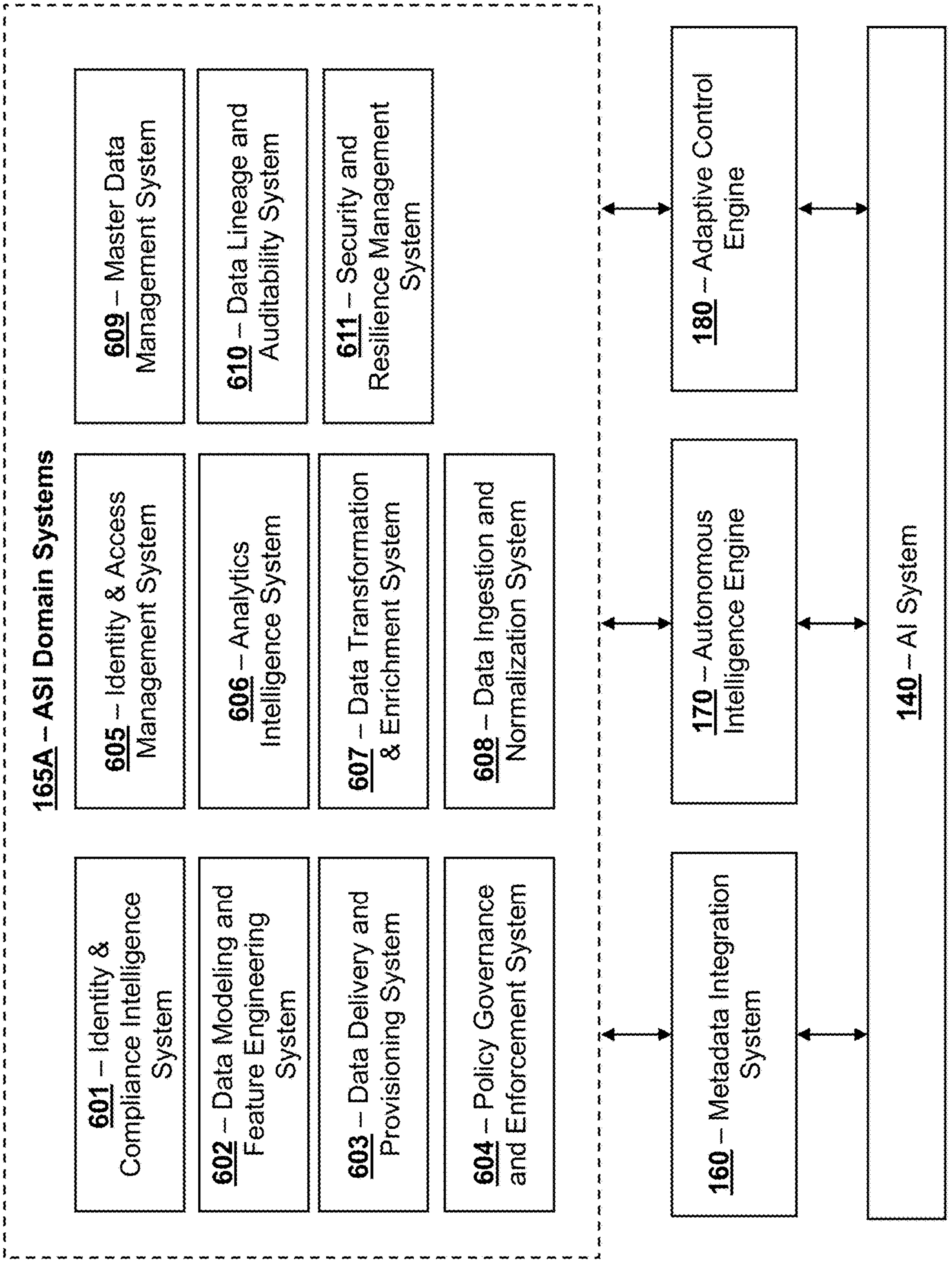
FIG. 6 is a diagram illustrating exemplary ASI domain systems and their integration with the core components of the adaptive systems intelligence platform in accordance with certain embodiments.

FIG. 6 is a diagram illustrating exemplary ASI domain systems 650 and their integration with the adaptive systems intelligence platform in accordance with certain embodiments.

As demonstrated above, the metadata integration system 160, the autonomous intelligence engine 170, and the adaptive control engine 180 can operate as the backbone of the ASI platform 150. These components collectively enable autonomous management, continuous optimization, and adaptive control of enterprise IT environments by integrating comprehensive metadata, generating actionable intelligence, and implementing dynamic changes across the digital ecosystem.

The discussion below, with reference to FIG. 6, describes various ASI domain systems 650 that can be deployed in an enterprise IT environment 130 to extend the capabilities of the ASI platform 150 and further enhance the overall intelligence and automation of the enterprise IT environment 130. Each of these ASI domain systems 650 can include a specialized, domain-specific application or system that is designed to leverage the ASI platform 150, and interact with its core components (including the metadata integration system 160, the autonomous intelligence engine 170, and/or the adaptive control engine 180) to deliver targeted value across various architecture layers 132 and enterprise services 134, including domains spanning security, compliance, analytics, governance, lineage, data management, and/or data delivery. Thus, while the ASI platform 150 can operate as a global enterprise manager with AI-driven and automated deployment features, these ASI domain systems 650 can operate within the enterprise IT environment 130 itself to deliver enhanced value and intelligence directly within the environment 130.

Additionally, each of the ASI domain systems 650 can include or communicate with a specialized inference model 142 (or multiple inference models 142), such as a language model 142A or LLM, that is designed to interpret domain-specific data, execute context-aware reasoning, and autonomously generate insights, recommendations, or actions tailored to the operational requirements of its respective domain within the enterprise IT environment.

The ASI domain systems 650 include: 1) an identity and compliance intelligence system 601; 2) a data modeling and feature engineering system 602; 3) a data delivery and provisioning system 603; 4) a policy governance and enforcement system 604; 5) an identity and access management system 605; 6) an analytics intelligence system 606; 7) a data transformation and enrichment system 607; 8) a data ingestion and normalization system 608; 9) a master data management (MDM) system 609; 10) a data lineage and auditability system 610; and 11) a security and resilience management system 611. As explained below, each of these ASI domain systems 650 is built on top of, and tightly integrated with, the components of the ASI platform 150, and is designed to address a specific domain and/or operational need within the enterprise IT ecosystem.

In certain embodiments, the identity and compliance intelligence system 601 can be configured to provide automated, adaptive monitoring and enforcement of identity governance and regulatory compliance within the enterprise IT environment 130. The system is designed to continuously ingest, analyze, and correlate identity, access, and compliance-related data from a variety of sources, including directory services, IAM platforms, security event logs, and policy repositories. By building semantic profiles of users, roles, and access patterns, the system can detect policy violations, unauthorized access, privilege escalations, and retention breaches, while also quantifying compliance posture through the generation of key performance indicators (KPIs) and audit-ready reports.

The identity and compliance intelligence system 601 is tightly integrated with the core components of the ASI platform 150, including the metadata integration system 160, the autonomous intelligence engine 170, and the adaptive control engine 180. The system leverages the metadata integration system 160 to aggregate and normalize identity and compliance metadata from across the enterprise IT environment 130, storing this information in the multi-layer metadata hub for downstream analysis. The autonomous intelligence engine 170 can apply AI and machine learning models to the aggregated metadata, generating insights, detecting anomalies, and recommending or triggering adaptive actions. The adaptive control engine 180 can act on these recommendations by orchestrating enforcement actions such as access revocation, policy updates, or workflow modifications, thereby ensuring that compliance and identity governance are maintained in real time.

In certain embodiments, the identity and compliance intelligence system 601 can include or communicate with a specialized inference model 142 that is designed to interpret domain-specific data, execute context-aware reasoning, and autonomously generate insights, recommendations, or actions tailored to the operational requirements of identity and compliance management. The inference model 142 may receive as input a combination of structured and unstructured data, such as access logs, policy documents, user profiles, and compliance frameworks. It can dynamically generate prompts for access analysis and compliance validation, perform semantic reasoning across fragmented data, and output structured findings such as violation classifications, risk scores, compliance KPIs, and natural-language audit summaries. The inference model 142 may also support human-in-the-loop workflows by enabling validation and refinement of flagged events and enforcement logic.

Additional aspects of the identity and compliance intelligence system 601 may include a modular architecture comprising an ingestion layer for connecting to diverse data sources, an orchestration layer for prompt generation and semantic analysis, a detection and scoring engine for classifying violations and assigning risk scores, a governance and enforcement layer for applying access control and retention policies, and a reporting and visualization layer for delivering dashboards, KPIs, and audit summaries. The system can interpret both structured and unstructured policy documents, adapt to evolving regulatory requirements, and support automated remediation actions such as credential revocation or policy updates. All decisions, prompts, and enforcement actions may be logged for auditability, and the system can provide interfaces for human validation and feedback, enabling continuous refinement of detection logic and enforcement protocols.

In certain embodiments, the identity and compliance intelligence system 601 may be designed for extensibility and interoperability, allowing integration with existing SIEMs, IAM platforms, and governance, risk, and compliance (GRC) tools. The system can support both automated and manual workflows, enabling organizations to maintain a defensible, audit-ready compliance posture while reducing manual effort and response times. Through these capabilities, the identity and compliance intelligence system 601 serves as a unified, adaptive nerve center for identity governance and compliance within the enterprise IT environment 130.

In certain embodiments, the data modeling and feature engineering system 602 can be configured to transform curated and governed data from the enterprise IT environment 130 into structured models, engineered features, and/or domain-specific signals that support analytics, automation, and decision-making processes. The system is designed to build, validate, and refine predictive, classification, and scoring models using enriched data, ensuring that all modeling activities are explainable, policy-compliant, and traceable. By deriving features from raw and enriched data, the system enables the enterprise IT environment 130 to generate actionable intelligence and support a wide range of business and operational objectives.

The data modeling and feature engineering system 602 is closely integrated with the core components of the ASI platform 150, including the metadata integration system 160, the autonomous intelligence engine 170, and the adaptive control engine 180. The system consumes curated, lineage-tagged data from the metadata integration system 160, which aggregates and normalizes data from various sources within the enterprise IT environment 130. The autonomous intelligence engine 170 can provide advanced analytics and insights that inform model construction and feature selection, while the adaptive control engine 180 can automate the deployment of models and features into production workflows, ensuring that outputs are delivered efficiently and in accordance with governance policies.

In certain embodiments, the data modeling and feature engineering system 602 can include or communicate with a specialized inference model 142 that is designed to perform semantic feature engineering, model construction, and explainability analysis. The inference model 142 may receive as input a combination of structured and unstructured data, including enriched datasets, transformation logic, policy overlays, and domain-specific context. It can automatically derive, select, and transform features based on business logic, construct and validate models using supervised, unsupervised, or hybrid techniques, and output structured model artifacts, feature sets, and explainability reports. The inference model 142 may also link model outputs to source data, transformation steps, and policy constraints, supporting audit-ready transparency and regulatory compliance.

Additional aspects of the data modeling and feature engineering system 602 may include a modular architecture comprising a feature intake layer for pulling enriched data, a semantic feature engine for deriving and transforming features, a model builder for constructing and validating models, an explainability and audit layer for attaching lineage and governance metadata, and a deployment interface for exporting models and signals to analytics dashboards, automation engines, or external consumers. The system can support iterative signal refinement based on feedback, drift detection, and performance metrics, ensuring that models remain accurate and relevant over time.

In certain embodiments, the system may enforce governance-aware modeling by excluding masked, restricted, or non-compliant data fields from model inputs, and by validating all modeling activities against policy overlays and lineage constraints. The system can support versioning, rollback, and performance monitoring of deployed models, and may provide interfaces for human validation and feedback to refine feature engineering and modeling logic. Through these capabilities, the data modeling and feature engineering system 602 enables the enterprise IT environment 130 to generate predictive, explainable, and policy-compliant intelligence that supports a wide range of analytics and automation use cases.

In certain embodiments, the data delivery and provisioning system 603 can be configured to serve as a modular data provisioning and delivery platform that transforms curated internal and external data into accessible, governed, and context-rich assets for business users, partners, and applications within the enterprise IT environment 130. The system can be designed to assemble, package, and deliver datasets, insights, and signals to both internal teams and external consumers, ensuring that all outputs are governed, lineage-tracked, and policy-compliant. The system supports a variety of delivery channels, including dashboards, APIs, data feeds, and exports, making intelligence consumable and actionable across a broad range of use cases.

The data delivery and provisioning system 603 is tightly integrated with the core components of the ASI platform 150, including the metadata integration system 160, the autonomous intelligence engine 170, and the adaptive control engine 180. The system pulls curated, enriched data from the metadata integration system 160, which aggregates and normalizes data from various sources within the enterprise IT environment 130. The autonomous intelligence engine 170 can provide analytics and insights that inform the packaging and contextualization of data products, while the adaptive control engine 180 can automate the delivery of data products and enforce governance policies during the provisioning process. This integration ensures that every data product delivered by the system is compliant with organizational policies and traceable to its source.

In certain embodiments, the data delivery and provisioning system 603 can include or communicate with a specialized inference model 142 that is designed to automate the assembly and packaging of datasets, reports, and APIs based on consumer needs and semantic context. The inference model 142 may receive as input a combination of structured and unstructured data, consumer profiles, policy overlays, and lineage metadata. It can dynamically generate and tailor data products to specific business or regulatory requirements, apply governance rules such as masking and retention, and output structured datasets, dashboards, or APIs with embedded metadata for traceability and compliance. The inference model 142 may also support feedback-driven refinement of data packaging logic based on user behavior and consumption patterns.

Additional aspects of the data delivery and provisioning system 603 may include a marketplace interface that provides a searchable catalog of available data products, insights, and models for consumers. The system can track usage analytics and capture consumer feedback to refine and optimize data offerings over time. The system may also support both internal and external delivery channels, enabling secure data sharing with partners, clients, or regulators via APIs, secure file transfers, or embedded dashboards. Every output generated by the system can include lineage metadata, ensuring auditability and trust for consumers.

In certain embodiments, the data delivery and provisioning system 603 can enforce governance-aware access control by applying policies for masking, retention, and role-based access during the packaging and delivery process. The system may be designed for extensibility and interoperability, allowing integration with business intelligence tools, portals, and third-party platforms. Through these capabilities, the data delivery and provisioning system 603 enables the enterprise IT environment 130 to transform backend intelligence into front-end value, ensuring that every consumer receives data that is clean, governed, and contextually relevant.

In certain embodiments, the policy governance and enforcement system 604 can be configured to serve as a modular governance engine that operationalizes policy enforcement, access control, and compliance lineage across all data and automation workflows within the enterprise IT environment 130. The system can be designed to centralize the management and application of enterprise policies, including masking, retention, and usage rules, and to ensure that every data movement, model decision, or automated action is compliant, auditable, and defensible. By orchestrating access control and policy enforcement at multiple points in the data lifecycle, the system supports both regulatory compliance and internal governance objectives.

The policy governance and enforcement system 604 is closely integrated with the core components of the ASI platform 150, including the metadata integration system 160, the autonomous intelligence engine 170, and the adaptive control engine 180. The system leverages the metadata integration system 160 to ingest and interpret governance policies and to aggregate policy-relevant metadata from across the enterprise IT environment 130. The autonomous intelligence engine 170 can monitor compliance, detect policy violations, and generate insights that inform enforcement actions. The adaptive control engine 180 can act on these insights by orchestrating the application of access controls, policy overlays, and remediation workflows, ensuring that governance is maintained dynamically and in real time.

In certain embodiments, the policy governance and enforcement system 604 can include or communicate with a specialized inference model 142 that is designed to interpret ambiguous or complex governance language, translate policy documents into enforceable logic, and adapt enforcement strategies dynamically. The inference model 142 may receive as input both structured policies (e.g., such as JSON or YAML files) and unstructured governance documents, as well as operational metadata and compliance feedback. It can generate formalized rules, resolve policy ambiguities, and output structured enforcement logic that is applied across ingestion, transformation, and automation workflows. The inference model 142 may also support the continuous refinement of governance logic by incorporating feedback from policy violations, exceptions, and human overrides.

Additional aspects of the policy governance and enforcement system 604 may include a modular architecture comprising a policy ingestion layer for accepting and formalizing governance rules, an access control engine for integrating with identity and access management systems, a compliance overlay for applying retention, masking, and usage policies, and a lineage tracker for maintaining a registry of data origin, transformation steps, and policy overlays. The system can generate compliance snapshots and reports for audit and legal teams, and may provide interfaces for exporting governance data to external risk and compliance platforms.

In certain embodiments, the system can support both automated and manual workflows, enabling organizations to maintain a defensible, audit-ready compliance posture while reducing manual effort and response times. The system may be designed for extensibility and interoperability, allowing integration with existing identity and access management platforms, data transformation engines, and governance, risk, and compliance tools. Through these capabilities, the policy governance and enforcement system 604 enables the enterprise IT environment 130 to achieve proactive, explainable, and adaptive governance across all data and automation workflows.

In certain embodiments, the identity and access management system 605 can be configured to govern, verify, and contextualize identity across ingestion, transformation, and automation workflows within the enterprise IT environment 130. The system is designed to ingest and resolve identity data, build semantic identity graphs, enforce access boundaries, and track identity lineage across enterprise systems. By contextualizing user behavior and applying governance-aware access policies, the system supports secure, compliant, and behaviorally aware identity management throughout the environment.

The identity and access management system 605 is closely integrated with the core components of the ASI platform 150, including the metadata integration system 160, the autonomous intelligence engine 170, and the adaptive control engine 180. The system leverages the metadata integration system 160 to aggregate identity data from various sources, such as IAM systems, logs, and HR platforms, and to store this information in the multi-layer metadata hub. The autonomous intelligence engine 170 analyzes access patterns, detects anomalies, and generates risk scores and recommendations for access enforcement. The adaptive control engine 180 acts on these recommendations by orchestrating access control actions, policy updates, and remediation workflows, ensuring that identity governance is maintained dynamically and in real time.

In certain embodiments, the identity and access management system 605 can include or communicate with a specialized inference model 142 that is designed to perform semantic identity resolution, risk scoring, and governance-aware access enforcement. The inference model 142 may receive as input structured and unstructured identity data, access logs, policy definitions, and behavioral context. It can disambiguate identities across systems, infer roles and relationships, assign dynamic risk scores based on access patterns and anomalies, and output structured access control decisions, lineage records, and compliance reports. The inference model 142 may also support human-in-the-loop workflows by enabling validation and refinement of identity logic and enforcement actions.

Additional aspects of the identity and access management system 605 may include a modular architecture comprising an identity ingestion layer for collecting data from diverse sources, an access control engine for integrating with IAM systems and applying contextual access logic, a risk and behavior profiler for analyzing access patterns and assigning risk scores, and a lineage and governance tracker for maintaining a traceable history of identity interactions and policy overlays. The system can capture overrides, exceptions, and human decisions to refine identity logic over time, and may provide interfaces for audit, compliance, and operational teams to review identity lineage and access decisions.

In certain embodiments, the system can support both automated and manual workflows, enabling organizations to maintain a defensible, audit-ready identity governance posture while reducing manual effort and response times. The system may be designed for extensibility and interoperability, allowing integration with existing IAM platforms, HR systems, and governance tools. Through these capabilities, the identity and access management system 605 enables the enterprise IT environment 130 to achieve secure, adaptive, and explainable identity governance across all data and automation workflows.

In certain embodiments, the analytics intelligence system 606 can be configured to transform governed, lineage-rich data from the enterprise IT environment 130 into actionable insights, predictive models, and strategic foresight. The system is designed to derive key performance indicators (KPIs), generate analytics dashboards, and produce explainable, policy-aware intelligence that supports operational, compliance, and business decision-making. By synthesizing data from multiple domains, the analytics intelligence system 606 enables organizations to monitor system health, forecast trends, and identify risks or opportunities across the enterprise.

The analytics intelligence system 606 is closely integrated with the core components of the ASI platform 150, including the metadata integration system 160, the autonomous intelligence engine 170, and the adaptive control engine 180. The system consumes curated, enriched, and governed data from the metadata integration system 160, ensuring that all analytics inputs are lineage-tagged and policy-compliant. The autonomous intelligence engine 170 provides advanced analytics, anomaly detection, and model validation, while the adaptive control engine 180 can automate the deployment of analytics dashboards, alerts, and reporting workflows, ensuring that insights are delivered efficiently and in accordance with governance requirements.

In certain embodiments, the analytics intelligence system 606 can include or communicate with a specialized inference model 142 that is designed to interpret business logic, derive KPIs, and generate explainable analytics outputs. The inference model 142 may receive as input structured and unstructured data, domain-specific templates, transformation logic, and policy overlays. It can synthesize metrics, generate predictive models, and produce natural-language summaries or visualizations that are traceable to their source and compliant with governance policies. The inference model 142 may also support feedback-driven refinement of analytics logic, enabling continuous improvement of metrics, thresholds, and model performance.

Additional aspects of the analytics intelligence system 606 may include a modular architecture comprising a data intake layer for pulling curated and governed data, a semantic analytics engine for interpreting business and operational context, a model builder and validator for constructing and evaluating predictive models, and a visualization and reporting layer for delivering dashboards, alerts, and compliance reports. The system can support cross-domain analytics by fusing signals from multiple modules, such as data transformation, master data management, identity, and security, to provide holistic insight into enterprise operations.

In certain embodiments, the analytics intelligence system 606 can enforce governance-aware visualization by dynamically applying masking, access, and retention rules to analytics outputs. The system may be designed for extensibility and interoperability, allowing integration with business intelligence tools, executive dashboards, and compliance reporting platforms. Through these capabilities, the analytics intelligence system 606 enables the enterprise IT environment 130 to generate explainable, actionable, and policy-compliant intelligence that supports a wide range of analytics and decision support use cases.

In certain embodiments, the data transformation and enrichment system 607 can be configured to transform, enrich, and harmonize raw or ingested data from diverse sources within the enterprise IT environment 130 into structured, policy-compliant, and contextually enriched datasets. The system is designed to align disparate schemas, apply semantic enrichment, and track transformation lineage, thereby preparing data for downstream analytics, modeling, compliance, and operational workflows. By executing modular transformation logic and embedding governance overlays, the system ensures that all data delivered to subsequent systems is accurate, consistent, and auditable.

The data transformation and enrichment system 607 is closely integrated with the core components of the ASI platform 150, including the metadata integration system 160, the autonomous intelligence engine 170, and the adaptive control engine 180. The system receives normalized, tagged data from the metadata integration system 160 and applies transformation and enrichment logic, updating the multi-layer metadata hub with enriched outputs and lineage metadata. The autonomous intelligence engine 170 can provide analytics and feedback to inform transformation strategies, while the adaptive control engine 180 can automate the deployment of transformation workflows and enforce governance policies during the enrichment process.

In certain embodiments, the data transformation and enrichment system 607 can include or communicate with a specialized inference model 142 that is designed to perform semantic schema mapping, contextual enrichment, and transformation logic generation. The inference model 142 may receive as input structured and unstructured data, schema definitions, business context, and policy overlays. It can align disparate schemas, resolve naming conflicts, infer relationships, and apply domain-specific enrichment, such as adding derived fields or business tags. The inference model 142 can also generate or adapt transformation logic, outputting structured transformation steps, enriched datasets, and lineage metadata that are traceable and compliant with governance requirements.

Additional aspects of the data transformation and enrichment system 607 may include a modular architecture comprising an input layer for receiving data from ingestion systems, a semantic mapper for schema alignment and enrichment, a transformation engine for applying modular logic blocks (such as joins, filters, aggregations, and pivots), and a governance overlay for enforcing masking, retention, and access policies during transformation. The system can track and log all transformation steps and policy decisions, providing a comprehensive lineage record for auditability and compliance.

In certain embodiments, the system can support both batch and streaming data formats, enabling real-time or scheduled transformation and enrichment workflows. The system may also provide interfaces for human validation and feedback, allowing data stewards to review, override, or refine transformation logic as needed. Through these capabilities, the data transformation and enrichment system 607 enables the enterprise IT environment 130 to deliver high-quality, governed, and contextually relevant data to downstream analytics, modeling, and compliance systems.

In certain embodiments, the data ingestion and normalization system 608 can be configured to continuously ingest, validate, and contextualize data from a wide variety of sources across the enterprise IT environment 130. The system is designed to connect to structured, semi-structured, and unstructured data sources—including databases, logs, APIs, file systems, and cloud platforms—and to harmonize, clean, and semantically tag incoming data. By applying normalization and metadata enrichment, the system prepares data for downstream analytics, modeling, compliance, and operational workflows, ensuring that all ingested data is accurate, consistent, and governance-ready.

The data ingestion and normalization system 608 is closely integrated with the core components of the ASI platform 150, including the metadata integration system 160, the autonomous intelligence engine 170, and the adaptive control engine 180. The system leverages the metadata integration system 160 to aggregate and store normalized, tagged data in the multi-layer metadata hub, making it accessible for further processing and analysis. The autonomous intelligence engine 170 can analyze ingestion patterns, detect anomalies, and provide feedback to refine ingestion logic, while the adaptive control engine 180 can automate the routing of ingested data to appropriate destinations and enforce governance policies during the ingestion process.

In certain embodiments, the data ingestion and normalization system 608 can include or communicate with a specialized inference model 142 that is designed to perform context-aware parsing, schema interpretation, and semantic tagging of incoming data. The inference model 142 may receive as input raw data streams, schema definitions, and domain-specific context, and can dynamically generate prompts for data cleaning, normalization, and metadata enrichment. The inference model 142 can output harmonized datasets, annotated with lineage, policy, and quality metadata, and may also flag anomalies, redundancies, or inconsistencies for further review.

Additional aspects of the data ingestion and normalization system 608 may include a modular architecture comprising source connectors for a wide range of data types, a governance filter engine for applying masking, filtering, and policy enforcement during ingestion, and a metadata and lineage tracker for attaching source, transformation, and policy tags to each record. The system can support both real-time and batch ingestion, enabling rapid onboarding of new data sources and continuous data quality monitoring.

In certain embodiments, the system may provide a feedback loop for quality tuning, allowing human validation and iterative refinement of ingestion logic. The system can be designed for extensibility and interoperability, supporting integration with existing ETL tools, data lakes, and downstream analytics platforms. Through these capabilities, the data ingestion and normalization system 608 enables the enterprise IT environment 130 to maintain a clean, compliant, and contextually enriched data foundation for adaptive intelligence and automated decision-making.

In certain embodiments, the master data management (MDM) system 609 can be configured to harmonize, unify, and maintain authoritative master records for core business entities—such as customers, assets, users, and vendors—across the enterprise IT environment 130. The system is designed to ingest entity data from disparate sources, resolve duplicates and conflicts, and generate trusted golden records that are enriched with lineage, policy, and identity metadata. By ensuring consistency and accuracy of master data, the system supports reliable analytics, compliance, and operational workflows throughout the organization.

The master data management system 609 is closely integrated with the core components of the ASI platform 150, including the metadata integration system 160, the autonomous intelligence engine 170, and the adaptive control engine 180. The system leverages the metadata integration system 160 to aggregate candidate records from various ingestion streams and to store harmonized master records in the multi-layer metadata hub. The autonomous intelligence engine 170 can analyze entity relationships, detect anomalies, and provide feedback for entity resolution and quality assurance. The adaptive control engine 180 can automate the propagation of master data updates to downstream systems and orchestrate remediation workflows in response to detected inconsistencies or governance requirements.

In certain embodiments, the master data management system 609 can include or communicate with a specialized inference model 142 that is designed to perform semantic entity resolution, conflict detection, and master record synthesis. The inference model 142 may receive as input structured and semi-structured entity data, contextual clues such as transaction history or relationships, and policy overlays. It can disambiguate and merge fragmented records, resolve inconsistent field values, assign confidence scores, and output unified golden records with embedded lineage and governance metadata. The inference model 142 may also support human-in-the-loop validation, allowing data stewards to review and refine entity resolution decisions.

Additional aspects of the master data management system 609 may include a modular architecture comprising an entity ingestion layer for collecting candidate records, a semantic resolution engine for detecting duplicates and inferring relationships, a golden record builder for synthesizing authoritative records, and a governance overlay for applying masking, retention, and access rules during entity consolidation. The system can support cross-system synchronization, propagating updates to downstream modules and maintaining consistency across the enterprise IT environment 130.

In certain embodiments, the system can provide dashboards and audit trails for monitoring entity health, merge history, and policy compliance. The system may also support versioning, rollback, and performance monitoring of master records, and can be designed for extensibility and interoperability with existing ERP, CRM, and data governance platforms. Through these capabilities, the master data management system 609 enables the enterprise IT environment 130 to maintain a trusted, unified, and policy-compliant foundation for all critical business data.

In certain embodiments, the data lineage and auditability system 610 can be configured to capture, reconstruct, and maintain comprehensive records of data movement, transformation, and policy enforcement across the enterprise IT environment 130. The system is designed to provide end-to-end lineage tracking, enabling organizations to trace the origin, transformation logic, and destination of data elements, as well as to document all governance actions applied throughout the data lifecycle. By maintaining a detailed and auditable record of data flows and policy decisions, the system supports compliance, explainability, and operational transparency.

The data lineage and auditability system 610 is closely integrated with the core components of the ASI platform 150, including the metadata integration system 160, the autonomous intelligence engine 170, and the adaptive control engine 180. The system leverages the metadata integration system 160 to ingest and store lineage metadata, transformation events, and policy overlays in the multi-layer metadata hub. The autonomous intelligence engine 170 can analyze lineage completeness, detect gaps or inconsistencies, and generate governance KPIs related to traceability and compliance. The adaptive control engine 180 can trigger remediation workflows or policy updates in response to detected lineage issues, ensuring that data flows remain auditable and compliant.

In certain embodiments, the data lineage and auditability system 610 can include or communicate with a specialized inference model 142 that is designed to interpret transformation logic, map lineage paths, and generate audit-ready summaries. The inference model 142 may receive as input structured and unstructured metadata, transformation scripts, policy documents, and operational logs. It can reconstruct semantic lineage graphs, identify missing or ambiguous lineage links, and output structured lineage records, compliance snapshots, and natural-language audit reports. The inference model 142 may also support human-in-the-loop validation, enabling users to review, refine, or annotate lineage records for enhanced accuracy and defensibility.

Additional aspects of the data lineage and auditability system 610 may include a modular architecture comprising an event listener layer for capturing ingestion, transformation, and enforcement events; a semantic mapper for interpreting transformation logic and business context; a governance logger for recording policy actions and overlays; and a reporting engine for generating lineage graphs, audit snapshots, and change impact analyses. The system can provide a query interface for searching and visualizing lineage records by source, destination, transformation type, or policy tag.

In certain embodiments, the system can support both automated and manual workflows, enabling organizations to maintain a legally defensible and audit-ready record of all data movements and governance actions. The system may be designed for extensibility and interoperability, allowing integration with existing data catalogs, ETL tools, and compliance platforms. Through these capabilities, the data lineage and auditability system 610 enables the enterprise IT environment 130 to achieve comprehensive traceability, support regulatory audits, and foster trust in data-driven operations.

In certain embodiments, the security and resilience management system 611 can be configured to provide adaptive, automated monitoring, threat detection, and operational continuity across the enterprise IT environment 130. The system is designed to aggregate and analyze security signals, enforce containment and trust validation workflows, and orchestrate incident response actions to ensure the ongoing integrity, availability, and resilience of enterprise systems and data. By integrating threat evaluation, containment logic, and trust validation, the system supports proactive risk mitigation and rapid recovery from security incidents or operational disruptions.

The security and resilience management system 611 is closely integrated with the core components of the ASI platform 150, including the metadata integration system 160, the autonomous intelligence engine 170, and the adaptive control engine 180. The system leverages the metadata integration system 160 to ingest and correlate security-relevant data, such as logs, identity events, and policy violations, from across the enterprise IT environment 130. The autonomous intelligence engine 170 can analyze behavioral and system data to detect threats, classify risks, and recommend or trigger containment or remediation actions. The adaptive control engine 180 can orchestrate the execution of containment workflows, policy reinforcements, and recovery procedures, ensuring that security and resilience measures are applied dynamically and in real time.

In certain embodiments, the security and resilience management system 611 can include or communicate with a specialized inference model 142 that is designed to interpret threat intelligence, behavioral context, and operational signals. The inference model 142 may receive as input structured and unstructured security data, policy definitions, incident logs, and external threat feeds. It can perform semantic threat reasoning, classify and score risks, recommend containment or escalation actions, and generate structured incident reports and audit trails. The inference model 142 may also support adaptive policy reinforcement by dynamically reapplying governance rules in response to detected threats or anomalies.

Additional aspects of the security and resilience management system 611 may include a modular architecture comprising a threat evaluation and signal fusion layer for aggregating and correlating security signals, a containment and quarantine logic layer for isolating suspicious data flows or user actions, and a trust validation pipeline for verifying the integrity of data, identity, and transformation logic. The system can maintain a resilience feedback loop, learning from incidents to refine detection thresholds, containment logic, and trust scoring over time. In certain embodiments, the system can support both automated and human-in-the-loop workflows, enabling organizations to maintain a defensible, audit-ready security posture while reducing response times and operational risk. The system may be designed for extensibility and interoperability, allowing integration with existing SIEMs, endpoint protection platforms, and incident response tools. Through these capabilities, the security and resilience management system 611 enables the enterprise IT environment 130 to achieve proactive, explainable, and adaptive security and operational resilience across all data and automation workflows.

The above description demonstrates how the ASI domain systems 650 can be interconnected with the core components of the ASI platform 150 to provide an ASI framework that extends to both broad, enterprise-wide management functions and specialized, domain-specific applications, enabling unified, adaptive intelligence and automation across all layers and services within the enterprise IT environment.

The discussion that follows demonstrates a variety of functional use cases that can be orchestrated within this ASI framework, which includes the ASI domain systems 650 working in conjunction with the components of the ASI platform 150, to deliver enhanced capabilities in enterprise systems. Amongst other things, these use cases illustrate how the integration of domain-specific systems with the ASI platform's foundational architecture can facilitate advanced automation, intelligence, and/or adaptability across a wide range of enterprise IT scenarios.

In one exemplary use case, the ASI framework can provide an automation workflow for the AI-driven or LLM-driven analytics intelligence.

In certain embodiments, an automation workflow for the AI-driven or LLM-driven analytics intelligence can be implemented to automate the generation, interpretation, and contextualization of analytics across an enterprise IT ecosystem. This workflow may utilize a large language model (LLM) and/or other type of inference model 142 to ingest structured and unstructured data from a variety of sources, apply semantic reasoning to identify patterns and generate insights, and produce governance-aware key performance indicators (KPIs) and natural-language summaries. The main functions of this workflow can include adaptive analytics generation, trend and anomaly detection, correlation analysis, and the creation of decision-ready intelligence that is accessible to both technical and business stakeholders. By automating these processes, the workflow can enable organizations to obtain timely, explainable, and actionable analytics without the need for extensive manual intervention.

The AI-driven or LLM-driven analytics intelligence workflow can be tightly integrated with the ASI platform 150 and its core components, as well as with relevant ASI domain systems 650. In certain embodiments, the workflow may leverage the metadata integration system 160 to access curated, normalized, and enriched data from across the enterprise IT environment. The autonomous intelligence engine 170 can be utilized to provide advanced analytics, anomaly detection, and model validation, while the adaptive control engine 180 may automate the deployment of analytics dashboards, alerts, and reporting workflows based on the insights generated by the inference model 142. Additionally, the analytics intelligence system 606, as an ASI domain system, can serve as the primary interface for orchestrating the AI-driven or LLM-driven analytics workflow, ensuring that all analytics outputs are policy-compliant, lineage-tracked, and tailored to the needs of various business and operational domains.

The step-by-step process implemented using the inference model 142 associated with the automation workflow can include the following: First, the workflow may acquire data from multiple sources, such as databases, data lakes, application logs, and unstructured documents. Next, the inference model 142 can build a semantic context by mapping the ingested data to relevant business and technical domains, tagging data with relevance scores and domain associations. The workflow then generates dynamic prompts to guide the inference model 142 in extracting insights, such as identifying trends, outliers, and correlations, or summarizing performance and flagging anomalies. The inference model 142 processes these prompts and returns structured outputs, which may include quantitative metrics, detected anomalies, and correlations. Subsequently, the inference model 142 can synthesize these outputs into natural-language narratives and KPIs, providing clear and actionable summaries for decision-makers. Finally, the results can be visualized in dashboards or reports, and a feedback loop may be established to allow human reviewers to validate insights and refine future prompt generation for improved accuracy.

In certain embodiments, the automation workflow may include additional features to enhance its effectiveness and adaptability. For example, the workflow can support adaptive prompt engineering, where prompts are dynamically tailored based on the type of data, the specific domain, and historical patterns observed in the enterprise environment. The inference model 142 may also generate both structured metrics and natural-language explanations, enabling a broader range of users to interpret and act on analytics outputs. Furthermore, the workflow can incorporate a feedback and refinement module, allowing human reviewers to validate or adjust the insights produced by the inference model 142, which in turn can be used to improve the accuracy and relevance of future analytics generation. The workflow may also be designed to ensure that all analytics outputs are compliant with organizational policies, including data governance, access control, and retention requirements, by leveraging the governance and policy enforcement capabilities of the ASI platform.

Another notable aspect of the automation workflow is its ability to provide explainable and audit-ready analytics. In certain embodiments, the inference model 142 can generate outputs that are traceable to their data sources, transformation logic, and policy context, supporting transparency and compliance requirements. The workflow may also support the generation of composite KPIs and trend analyses that span multiple business and technical domains, enabling organizations to obtain a holistic view of system performance and operational dynamics. By integrating these features, the AI-driven or LLM-driven analytics intelligence workflow can deliver a robust, adaptive, and explainable analytics solution that is well-suited to the evolving needs of modern enterprise IT environments.

In another exemplary use case, the ASI framework can provide an automation workflow for AI-driven or LLM-driven compliance monitoring and enforcement.

In certain embodiments, the automation workflow for AI-driven or LLM-driven compliance monitoring and enforcement can be implemented to automate regulatory and policy compliance across enterprise IT ecosystems. This workflow may utilize a large language model (LLM) and/or other type of inference model 142 to ingest operational data, policy definitions, audit logs, and system configurations, and then apply semantic reasoning to detect violations, generate compliance key performance indicators (KPIs), and recommend or trigger remediation actions. The main functions of this workflow can include real-time compliance assurance, adaptive policy enforcement, violation detection, and audit-ready reporting, thereby enabling organizations to maintain a defensible and continuously monitored compliance posture.

The AI-driven or LLM-driven compliance monitoring and enforcement workflow can be closely integrated with the ASI platform 150 and its core components, as well as with relevant ASI domain systems 650. In certain embodiments, the workflow may leverage the metadata integration system 160 to access and aggregate policy documents, operational logs, and compliance-relevant metadata from across the enterprise IT environment. The autonomous intelligence engine 170 can be utilized to analyze compliance data, detect anomalies, and generate compliance insights, while the adaptive control engine 180 may automate the enforcement of remediation actions, such as access revocation, data deletion, or configuration updates, in response to detected violations. Additionally, the policy governance and enforcement system 604 and the identity and compliance intelligence system 601, as ASI domain systems, can serve as primary interfaces for orchestrating the AI-driven or LLM-driven compliance workflow, ensuring that all compliance activities are policy-aware, traceable, and aligned with organizational and regulatory requirements.

The step-by-step process implemented by the inference model 142 in the automation workflow can include the following: First, the workflow may ingest and interpret both external and internal policy documents, including regulatory frameworks (such as GDPR, HIPAA, or SOC 2) and enterprise-specific governance policies, in both structured and unstructured formats. Next, the workflow can acquire operational data from sources such as access logs, configuration files, data storage metadata, and transactional records. The inference model 142 then generates dynamic prompts for compliance analysis, guiding the model to identify violations of specific policy requirements within the operational data. The inference model 142 processes these prompts and returns structured outputs, which may include detected violations, compliance scores, and recommended remediation actions. Subsequently, the workflow can synthesize compliance KPIs and generate audit-ready reports and summaries for compliance officers. Finally, a feedback and enforcement module may enable human reviewers to validate flagged violations and, upon confirmation, trigger automated enforcement actions to remediate non-compliance.

In certain embodiments, the automation workflow may include additional features to enhance its adaptability and effectiveness. For example, the workflow can support adaptive prompt engineering, where prompts are dynamically tailored based on the evolving scope of policies, the type of operational data, and historical compliance trends within the enterprise environment. The inference model 142 may also generate both structured compliance metrics and natural-language summaries, enabling compliance teams to interpret and act on outputs efficiently. Furthermore, the workflow can incorporate a feedback loop, allowing human reviewers to validate or adjust the inference model's findings, which in turn can be used to refine future prompt generation and detection logic for improved accuracy and relevance.

Another notable aspect of the automation workflow is its ability to generate audit-ready evidence and maintain traceability. In certain embodiments, the inference model 142 can compile structured evidence, such as violation logs, policy mappings, and remediation actions, formatted for regulatory submission or internal review. The workflow may also log all inference model prompts and responses for auditability, supporting transparency and defensibility in compliance operations. Additionally, the workflow can be designed to ensure that all compliance outputs are aligned with organizational policies, including data governance, access control, and retention requirements, by leveraging the governance and policy enforcement capabilities of the ASI platform.

The automation workflow may further support the generation of composite compliance KPIs and trend analyses that span multiple business and technical domains, enabling organizations to obtain a holistic view of compliance posture and risk. By integrating these features, the AI-driven or LLM-driven compliance monitoring and enforcement workflow can deliver a robust, adaptive, and explainable compliance solution that is well-suited to the evolving regulatory landscape and operational demands of modern enterprise IT environments.

In another exemplary use case, the ASI framework can provide an automation workflow for AI-driven or LLM-driven data curation.

In certain embodiments, the automation workflow for AI-driven or LLM-driven data curation can be implemented to intelligently organize, refine, and contextualize enterprise data for use in adaptive intelligence systems. This workflow may utilize a large language model (LLM) and/or other type of inference model 142 to process raw inputs from diverse sources, apply semantic reasoning to enhance data quality, and generate curated datasets that are optimized for downstream analytics, compliance, and decision-making. The main functions of this workflow can include data profiling, semantic tagging, deduplication, consolidation, quality scoring, sensitivity classification, and adaptive cataloging, thereby transforming fragmented or unstructured data into high-value, trusted assets.

The AI-driven or LLM-driven data curation workflow can be closely integrated with the ASI platform 150 and its core components, as well as with relevant ASI domain systems 650. In certain embodiments, the workflow may leverage the metadata integration system 160 to access and aggregate raw and semi-structured data from across the enterprise IT environment. The autonomous intelligence engine 170 can be utilized to analyze curated data, generate quality metrics, and provide feedback for continuous improvement, while the adaptive control engine 180 may automate the deployment of curated datasets to downstream systems or trigger remediation actions in response to detected data quality issues. Additionally, the data transformation and enrichment system 607, the master data management system 609, and the data ingestion and normalization system 608, as ASI domain systems, can serve as key interfaces for orchestrating the AI-driven or LLM-driven data curation workflow, ensuring that all curated outputs are policy-compliant, lineage-tracked, and contextually enriched.

The step-by-step process implemented by the inference model 142 in the automation workflow can include the following: First, the workflow may perform data profiling, where the inference model 142 scans datasets to identify structure, content types, anomalies, and usage patterns. Next, the inference model 142 can apply semantic tagging, assigning domain-aware labels and metadata to enhance discoverability and relevance. The workflow then executes deduplication and consolidation, detecting redundant records, merging overlapping entries, and resolving conflicts using contextual reasoning. The inference model 142 may assign quality scores to curated data based on completeness, consistency, and inferred accuracy, and perform sensitivity classification to flag personally identifiable information (PII), proprietary data, or compliance-sensitive content. Finally, the workflow can organize curated data into adaptive catalogs or taxonomies that evolve with business needs and user behavior.

In certain embodiments, the automation workflow may include additional features to enhance its effectiveness and adaptability. For example, the inference model 142 can provide contextual understanding that goes beyond syntactic analysis, interpreting the meaning, relationships, and business relevance of data elements. The workflow may also support cross-domain reasoning, enabling the inference model 142 to bridge gaps between technical logs, financial records, customer data, and other disparate sources. Furthermore, the inference model 142 can offer a natural language interface, allowing users to query curated datasets using intuitive, business-oriented questions, such as "Show me high-confidence customer records from Q2" or "Which datasets are underutilized in ASI training?"

Another notable aspect of the automation workflow is its ability to support adaptive learning and continuous improvement. In certain embodiments, the workflow may incorporate a feedback loop, where user interactions, validation results, and system metrics are used to refine curation logic, improve semantic tagging, and enhance data quality over time. The curated data produced by this workflow can serve as a trusted substrate for adaptive intelligence systems, supporting improved model accuracy, faster compliance audits, and enhanced data discoverability across the enterprise. By integrating these features, the AI-driven or LLM-driven data curation workflow can deliver a robust, explainable, and adaptive solution for enterprise data management.

In a further exemplary use case, the ASI framework can provide an automation workflow for AI-driven or LLM-driven data ingestion and normalization.

In certain embodiments, the automation workflow for AI-driven or LLM-driven data ingestion and normalization can be implemented to intelligently ingest, harmonize, and contextualize data from diverse sources across an enterprise IT environment. This workflow may utilize a large language model (LLM) and/or other type of inference model 142 to connect to structured, semi-structured, and unstructured data sources, interpret and map schemas, and apply semantic reasoning to normalize formats, enrich metadata, and prepare data for downstream analytics, compliance, and operational workflows. The main functions of this workflow can include source discovery, schema interpretation, semantic normalization, metadata enrichment, quality and integrity checks, and adaptive routing of ingested data.

The AI-driven or LLM-driven data ingestion and normalization workflow can be closely integrated with the ASI platform 150 and its core components, as well as with relevant ASI domain systems 650. In certain embodiments, the workflow may leverage the metadata integration system

160 to aggregate and store normalized, tagged data in the multi-layer metadata hub, making it accessible for further processing and analysis. The autonomous intelligence engine 170 can be utilized to analyze ingestion patterns, detect anomalies, and provide feedback to refine ingestion logic, while the adaptive control engine 180 may automate the routing of ingested data to appropriate destinations and enforce governance policies during the ingestion process. Additionally, the data ingestion and normalization system 608, as an ASI domain system, can serve as the primary interface for orchestrating the AI-driven or LLM-driven ingestion workflow, ensuring that all ingested data is governance-ready and contextually enriched.

The step-by-step process implemented by the inference model 142 in the automation workflow can include the following: First, the workflow may perform source discovery, where the inference model 142 scans and identifies available data sources, such as databases, APIs, logs, file shares, and IoT feeds. Next, the inference model 142 can interpret and map schemas, using natural language processing to understand and align data structures, even across undocumented or legacy systems. The workflow then applies semantic normalization, harmonizing data formats, units, and naming conventions using contextual reasoning. The inference model 142 may enrich the ingested data with inferred metadata, such as data type, sensitivity, and business relevance. The workflow can also execute quality and integrity checks, flagging anomalies, missing values, or inconsistencies using probabilistic models. Finally, the inference model 142 can perform adaptive routing, directing ingested data to appropriate destinations—such as data lakes, analytics engines, or compliance vaults—based on usage context and organizational policies.

In certain embodiments, the automation workflow may include additional features to enhance its adaptability and effectiveness. For example, the inference model 142 can provide context-aware parsing, enabling it to interpret domain-specific language and extract meaning from a wide range of data types, including technical logs, financial records, and customer data. The workflow may also support dynamic schema matching, allowing the inference model 142 to align disparate data structures without manual mapping, thereby accelerating onboarding of new data sources. Furthermore, the inference model 142 can offer a natural language interface, enabling users to query the ingestion process or request information about data sources, redundancy, or relevance.

Another notable aspect of the automation workflow is its ability to support continuous learning and quality improvement. In certain embodiments, the workflow may incorporate a feedback loop, where user validation, system metrics, and operational outcomes are used to refine ingestion logic, improve normalization accuracy, and enhance metadata enrichment over time. The ingested and normalized data produced by this workflow can serve as a foundation for adaptive intelligence systems, supporting improved analytics, compliance, and operational efficiency across the enterprise. By integrating these features, the AI-driven or LLM-driven data ingestion and normalization workflow can deliver a robust, explainable, and adaptive solution for enterprise data integration.

In another exemplary use case, the ASI framework can provide an automation workflow for AI-driven or LLM-driven lineage intelligence.

In certain embodiments, the automation workflow for AI-driven or LLM-driven lineage intelligence can be implemented to automate the discovery, validation, and governance of data lineage across an enterprise IT ecosystem. This workflow may utilize a large language model (LLM) and/or other type of inference model 142 to ingest metadata, transformation logic, and system logs from a variety of sources, and then apply semantic reasoning to reconstruct lineage paths, identify gaps, and generate governance key performance indicators (KPIs). The main functions of this workflow can include end-to-end lineage tracking, gap detection, lineage validation, and the generation of audit-ready reports and compliance metrics, thereby enabling organizations to achieve comprehensive traceability and operational transparency.

The AI-driven or LLM-driven lineage intelligence workflow can be closely integrated with the ASI platform 150 and its core components, as well as with relevant ASI domain systems 650. In certain embodiments, the workflow may leverage the metadata integration system 160 to ingest and store lineage metadata, transformation events, and policy overlays in the multi-layer metadata hub. The autonomous intelligence engine 170 can be utilized to analyze lineage completeness, detect inconsistencies, and generate governance KPIs related to traceability and compliance. The adaptive control engine 180 may trigger remediation workflows or policy updates in response to detected lineage issues. Additionally, the data lineage and auditability system 610, as an ASI domain system, can serve as the primary interface for orchestrating the AI-driven or LLM-driven lineage intelligence workflow, ensuring that all lineage outputs are policy-compliant, audit-ready, and accessible for compliance and operational teams.

The step-by-step process implemented by the inference model 142 in the automation workflow can include the following: First, the workflow may ingest metadata and transformation logic from data catalogs, ETL/ELT tools, SQL scripts, pipeline configurations, and operational logs. Next, the inference model 142 can generate prompts to guide the reconstruction of lineage, such as inferring downstream or upstream lineage paths based on transformation logic and schema information. The inference model 142 processes these prompts to interpret transformation steps, joins, filters, and mappings, and outputs structured lineage paths that are assembled into semantic lineage graphs. The workflow then applies gap detection and validation, where the inference model 142 identifies missing lineage links, ambiguous transformations, orphaned datasets, or inconsistent metadata, and flags these by risk level and governance impact. Subsequently, the workflow can generate governance KPIs, such as lineage completeness, transformation transparency, and policy alignment, and produce visualizations and natural-language summaries for compliance and governance teams. Finally, a feedback and remediation module may enable human reviewers to validate lineage gaps and trigger metadata enrichment, documentation prompts, or policy updates as needed.

In certain embodiments, the automation workflow may include additional features to enhance its adaptability and effectiveness. For example, the inference model 142 can support adaptive prompt engineering, where prompts are dynamically tailored based on system type, transformation complexity, and historical lineage completeness. The workflow may also support the generation of composite KPIs and trend analyses that span multiple business and technical domains, enabling organizations to obtain a holistic view of lineage health and compliance posture. Furthermore, the workflow can log all inference model 142 prompts and responses for auditability, supporting transparency and defensibility in compliance operations.

Another notable aspect of the automation workflow is its ability to provide explainable and audit-ready lineage intelligence. In certain embodiments, the inference model 142 can generate outputs that are traceable to their data sources, transformation logic, and policy context, supporting regulatory requirements and operational trust. The workflow may also offer a query interface, enabling users to search and visualize lineage records by source, destination, transformation type, or policy tag, and to perform change impact analyses before deploying updates. By integrating these features, the AI-driven or LLM-driven lineage intelligence workflow can deliver a robust, adaptive, and explainable solution for data lineage management in modern enterprise IT environments.

In a further exemplary use case, the ASI framework can provide an automation workflow for AI-driven or LLM-driven identity and access management.

In certain embodiments, an automation workflow for the AI-driven or LLM-driven identity and access management (IAM) can be implemented to automate and optimize identity governance across an enterprise IT ecosystem. This workflow may utilize a large language model (LLM) and/or other type of inference model 142 to ingest access logs, user profiles, policy definitions, and system configurations, and then apply semantic reasoning to dynamically monitor, validate, and optimize identity and access controls. The main functions of this workflow can include real-time access monitoring, semantic identity graph construction, policy validation, anomaly detection, risk scoring, and automated enforcement of access policies, thereby enabling organizations to maintain secure, compliant, and adaptive identity governance.

The AI-driven or LLM-driven IAM automation workflow can be closely integrated with the ASI platform 150 and its core components, as well as with relevant ASI domain systems 650. In certain embodiments, the workflow may leverage the metadata integration system 160 to aggregate and store identity data, access logs, and policy information in the multi-layer metadata hub. The autonomous intelligence engine 170 can be utilized to analyze access patterns, detect anomalies, and generate risk scores and recommendations for access enforcement. The adaptive control engine 180 may automate the execution of access control actions, policy updates, and remediation workflows in response to detected violations or risk events. Additionally, the identity and access management system 605, as an ASI domain system, can serve as the primary interface for orchestrating the AI-driven or LLM-driven IAM workflow, ensuring that all identity governance activities are policy-aware, traceable, and aligned with organizational requirements.

The step-by-step process implemented by the inference model 142 in the automation workflow can include the following: First, the workflow may ingest IAM policies (such as RBAC, ABAC, and least privilege rules) defined in structured formats, and access data from sources such as Active Directory, LDAP, cloud IAM platforms, and endpoint access records. The inference model 142 can then construct a semantic identity graph, mapping users, roles, resources, and temporal access patterns across systems. Next, the workflow generates dynamic prompts for access analysis and policy validation, guiding the inference model 142 to identify unauthorized access events, privilege escalations, dormant accounts, and other anomalies. The inference model 142 processes these prompts and returns structured outputs, including violations, risk scores, and access summaries. The workflow can then synthesize compliance metrics and generate audit-ready reports and dashboards for compliance and security teams. Finally, a feedback and enforcement module may enable human reviewers to validate flagged events and, upon confirmation, trigger automated actions such as credential revocation, role reassignment, or policy updates.

In certain embodiments, the automation workflow may include additional features to enhance its adaptability and effectiveness. For example, the inference model 142 can support adaptive prompt engineering, where prompts are dynamically tailored based on access trends, policy changes, and historical anomalies. The workflow may also provide a natural language interface, enabling users to query access patterns, request compliance summaries, or investigate specific identity events using intuitive language. Furthermore, the workflow can incorporate a feedback loop, allowing human reviewers to validate or adjust the inference model's findings, which in turn can be used to refine future prompt generation and detection logic for improved accuracy and relevance.

Another notable aspect of the automation workflow is its ability to generate audit-ready evidence and maintain traceability. In certain embodiments, the inference model 142 can compile structured evidence, such as violation logs, policy mappings, and remediation actions, formatted for regulatory submission or internal review. The workflow may also log all inference model 142 prompts and responses for auditability, supporting transparency and defensibility in identity governance operations. By integrating these features, the AI-driven or LLM-driven IAM automation workflow can deliver a robust, adaptive, and explainable solution for identity and access management in modern enterprise IT environments.

In another exemplary use case, the ASI framework can provide an automation workflow for AI-driven or LLM-driven master data management.

In certain embodiments, the automation workflow for the AI-driven or LLM-driven master data management (MDM) can be implemented to harmonize, unify, and maintain authoritative master records for core business entities across an enterprise IT environment. This workflow may utilize a large language model (LLM) and/or other type of inference model 142 to ingest entity data from disparate sources, apply semantic reasoning to detect duplicates, resolve conflicts, and generate trusted golden records that are enriched with lineage, policy, and identity metadata. The main functions of this workflow can include semantic entity resolution, conflict detection, deduplication, master record synthesis, and the generation of governance key performance indicators (KPIs), thereby supporting reliable analytics, compliance, and operational workflows throughout the organization.

The AI-driven or LLM-driven master data management workflow can be closely integrated with the ASI platform 150 and its core components, as well as with relevant ASI domain systems 650. In certain embodiments, the workflow may leverage the metadata integration system 160 to aggregate candidate records from various ingestion streams and to store harmonized master records in the multi-layer metadata hub. The autonomous intelligence engine 170 can be utilized to analyze entity relationships, detect anomalies, and provide feedback for entity resolution and quality assurance. The adaptive control engine 180 may automate the propagation of master data updates to downstream systems and orchestrate remediation workflows in response to detected inconsistencies or governance requirements. Additionally, the master data management system 609, as an ASI domain system, can serve as the primary interface for orchestrating the AI-driven or LLM-driven MDM workflow, ensuring that all master records are policy-compliant, lineage-tracked, and contextually enriched.

The step-by-step process implemented by the inference model 142 in the automation workflow can include the following: First, the workflow may ingest master data domains such as customers, vendors, products, assets, and employees from multiple systems, including ERP platforms, CRM systems, data lakes, and legacy databases. The inference model 142 can then generate prompts for entity resolution, guiding the model to compare records and determine if they represent the same entity, and to resolve conflicting field values using contextual clues such as transaction history or relationships. The workflow executes deduplication and conflict resolution, applying confidence scoring, source prioritization, and temporal relevance to synthesize unified golden records. The inference model 142 may assign attribute completeness and conflict resolution accuracy scores, and embed lineage metadata for auditability. The harmonized master records are then stored in a centralized MDM repository or propagated to downstream systems as needed. Finally, the workflow can generate MDM KPIs and audit-ready reports for data stewards and compliance teams.

In certain embodiments, the automation workflow may include additional features to enhance its adaptability and effectiveness. For example, the inference model 142 can support human-in-the-loop validation, allowing data stewards to review and refine entity resolution decisions, merge logic, and override automated outcomes as necessary. The workflow may also provide dashboards and audit trails for monitoring entity health, merge history, and policy compliance, supporting versioning, rollback, and performance monitoring of master records. Furthermore, the workflow can be designed for extensibility and interoperability, enabling integration with existing ERP, CRM, and data governance platforms, and supporting cross-system synchronization to maintain consistency across the enterprise IT environment.

Another notable aspect of the automation workflow is its ability to generate audit-ready evidence and maintain traceability. In certain embodiments, the inference model 142 can log all prompts, decisions, confidence scores, and source references, supporting transparency and defensibility in master data management operations. The workflow may also support the generation of natural-language summaries and compliance reports, enabling organizations to demonstrate data quality improvements, deduplication rates, and lineage traceability for regulatory or internal review. By integrating these features, the AI-driven or LLM-driven master data management workflow can deliver a robust, adaptive, and explainable solution for enterprise data harmonization and governance.

In a further exemplary use case, the ASI framework can provide an automation workflow for an AI-driven or LLM-driven security intelligence.

In certain embodiments, an automation workflow for the AI-driven or LLM-driven security intelligence can be implemented to automate cybersecurity monitoring, threat detection, and response across an enterprise IT ecosystem. This workflow may utilize a large language model (LLM) and/or other type of inference model 142 to ingest logs, configurations, alerts, and behavioral data from a variety of sources, and then apply semantic reasoning to identify threats, generate security key performance indicators (KPIs), and recommend or trigger remediation actions. The main functions of this workflow can include adaptive threat intelligence, real-time anomaly detection, risk classification, and the generation of audit-ready incident reports, thereby enabling organizations to maintain a proactive and defensible security posture.

The AI-driven or LLM-driven security intelligence workflow can be closely integrated with the ASI platform 150 and its core components, as well as with relevant ASI domain systems 650. In certain embodiments, the workflow may leverage the metadata integration system 160 to access and aggregate security-relevant data, such as logs, identity events, and policy violations, from across the enterprise IT environment. The autonomous intelligence engine 170 can be utilized to analyze behavioral and system data, detect threats, classify risks, and generate recommendations or trigger containment or remediation actions. The adaptive control engine 180 may automate the execution of containment workflows, policy reinforcements, and recovery procedures in response to detected security incidents. Additionally, the security and resilience management system 611, as an ASI domain system, can serve as the primary interface for orchestrating the AI-driven or LLM-driven security intelligence workflow, ensuring that all security activities are policy-aware, traceable, and aligned with organizational requirements.

The step-by-step process implemented by the inference model 142 in the automation workflow can include the following: First, the workflow may ingest threat intelligence feeds, including external sources (such as MITRE ATT&CK, CVE databases, and vendor alerts) and internal security policies and known threat signatures. Next, the workflow can acquire security data from sources such as SIEM platforms, firewall and IDS/IPS logs, endpoint protection systems, network traffic monitors, and authentication and access logs. The inference model 142 can then build semantic profiles of user and system behavior, enabling contextual anomaly detection beyond static rules. The workflow generates dynamic prompts for threat analysis, guiding the inference model 142 to identify signs of lateral movement, malware execution, credential compromise, or other security events. The inference model 142 processes these prompts and returns structured outputs, including threat classifications, risk scores, and recommended actions. The workflow can then synthesize security KPIs and generate incident reports and dashboards for security teams. Finally, a feedback and response module may enable human reviewers to validate flagged threats and, upon confirmation, trigger automated remediation actions such as device quarantine, credential revocation, or policy updates.

In certain embodiments, the automation workflow may include additional features to enhance its adaptability and effectiveness. For example, the inference model 142 can support adaptive prompt engineering, where prompts are dynamically tailored based on the evolving threat landscape, system behavior, and historical incident patterns. The workflow may also provide a natural language interface, enabling users to query security events, request incident summaries, or investigate specific threats using intuitive language. Furthermore, the workflow can incorporate a feedback loop, allowing human reviewers to validate or adjust the inference model's findings, which in turn can be used to refine future prompt generation and detection logic for improved accuracy and relevance.

Another notable aspect of the automation workflow is its ability to generate audit-ready evidence and maintain traceability. In certain embodiments, the inference model 142 can compile structured evidence, such as incident logs, policy mappings, and remediation actions, formatted for regulatory submission or internal review. The workflow may also log all inference model 142 prompts and responses for auditability, supporting transparency and defensibility in security operations. By integrating these features, the AI-driven or LLM-driven security intelligence workflow can deliver a robust, adaptive, and explainable solution for cybersecurity management in modern enterprise IT environments.

In another exemplary use case, the ASI framework can provide an automation workflow for an AI-driven or LLM-driven external data provisioning.

In certain embodiments, an automation workflow for the AI-driven or LLM-driven external data provisioning can be implemented to automate the secure and policy-compliant delivery of enterprise data to external consumers. This workflow may utilize a large language model (LLM) and/or other type of inference model 142 to ingest internal datasets, apply semantic reasoning to validate, transform, and contextualize data, and generate consumer-specific outputs with embedded governance, lineage, and compliance metadata. The main functions of this workflow can include adaptive data packaging, policy-aware delivery, compliance validation, and audit-ready traceability, thereby enabling organizations to share data with partners, clients, or regulators in a controlled and defensible manner.

The AI-driven or LLM-driven external data provisioning workflow can be closely integrated with the ASI platform 150 and its core components, as well as with relevant ASI domain systems 650. In certain embodiments, the workflow may leverage the metadata integration system 160 to access and aggregate internal datasets, consumer profiles, and policy overlays from across the enterprise IT environment. The autonomous intelligence engine 170 can be utilized to analyze data quality, compliance status, and delivery requirements, while the adaptive control engine 180 may automate the execution of data delivery actions, enforce governance policies, and trigger remediation workflows in response to detected compliance risks. Additionally, the data delivery and provisioning system 603, as an ASI domain system, can serve as the primary interface for orchestrating the AI-driven or LLM-driven external data provisioning workflow, ensuring that all outputs are policy-compliant, lineage-tracked, and tailored to the needs of external consumers.

The step-by-step process implemented by the inference model 142 in the automation workflow can include the following: First, the workflow may define external consumer profiles, specifying data contracts, delivery channels, and compliance requirements. Next, the workflow can ingest internal datasets from operational databases, data warehouses, MDM repositories, and metadata catalogs. The inference model 142 then generates prompts for data packaging, guiding the model to prepare consumer-specific datasets by selecting fields, applying semantic normalization, and enforcing anonymization or pseudonymization as needed. The inference model 142 may enrich outputs with metadata for lineage, compliance, and auditability. The workflow then applies governance and compliance enforcement, ensuring that access control, retention, and usage policies are satisfied before delivery. Data is then formatted for delivery via APIs, secure file transfer, or dashboards, and all provisioning events are logged for traceability. Finally, a feedback module may enable human reviewers to validate edge cases and refine provisioning logic based on consumer feedback or compliance outcomes.

In certain embodiments, the automation workflow may include additional features to enhance its adaptability and effectiveness. For example, the inference model 142 can support adaptive prompt engineering, where prompts are dynamically tailored based on consumer profiles, policy changes, and historical delivery patterns. The workflow may also provide a marketplace interface, enabling external consumers to search and request available data products, and may track usage analytics to refine data offerings over time. Furthermore, the workflow can incorporate a feedback loop, allowing human reviewers to validate or adjust the inference model's outputs, which in turn can be used to improve future data packaging and delivery logic.

Another notable aspect of the automation workflow is its ability to generate audit-ready evidence and maintain traceability. In certain embodiments, the inference model 142 can embed detailed metadata in each delivered dataset, including source lineage, transformation logic, and compliance status, supporting regulatory requirements and operational trust. The workflow may also log all inference model 142 prompts, delivery events, and policy enforcement actions for auditability, supporting transparency and defensibility in external data provisioning operations. By integrating these features, the AI-driven or LLM-driven external data provisioning workflow can deliver a robust, adaptive, and explainable solution for secure and compliant data sharing in modern enterprise IT environments.

In a further exemplary use case, the ASI framework can provide an automation workflow for an AI-driven or LLM-driven data governance KPI generation.

In certain embodiments, an automation workflow for the AI-driven or LLM-driven data governance KPI generation can be implemented to automate the extraction, calculation, and reporting of key performance indicators (KPIs) related to data governance across an enterprise IT ecosystem. This workflow may utilize a large language model (LLM) and/or other type of inference model 142 to ingest and interpret structured and unstructured data from various IT sources, apply governance logic, and output actionable metrics and summaries. The main functions of this workflow can include the dynamic extraction of governance-relevant insights, the synthesis of KPIs such as data quality, access compliance, retention adherence, and lineage transparency, and the generation of reports and alerts to support real-time compliance monitoring and strategic decision-making.

The AI-driven or LLM-driven data governance KPI generation workflow can be closely integrated with the ASI platform 150 and its core components, as well as with relevant ASI domain systems 650. In certain embodiments, the workflow may leverage the metadata integration system 160 to connect to and aggregate data from databases, logs, metadata catalogs, and access control systems, storing governance-relevant information in the multi-layer metadata hub. The autonomous intelligence engine 170 can be utilized to analyze governance data, detect anomalies, and generate insights that inform KPI calculation and reporting. The adaptive control engine 180 may automate the deployment of dashboards, alerts, and remediation workflows in response to KPI thresholds or detected governance issues. Additionally, the policy governance and enforcement system 604 and the analytics intelligence system 606, as ASI domain systems, can serve as primary interfaces for orchestrating the AI-driven or LLM-driven KPI workflow, ensuring that all outputs are policy-compliant, traceable, and aligned with organizational governance objectives.

The step-by-step process implemented by the inference model 142 in the automation workflow can include the following: First, the workflow may define a KPI framework by mapping governance policies to specific data sources and metrics, such as data quality, access compliance, retention, and lineage. Next, the workflow can connect to relevant IT sources and ingest data, including structured (e.g., SQL databases) and unstructured (e.g., log files, config files) formats. The inference model 142 then preprocesses and normalizes the data, cleaning and annotating it with governance-relevant metadata. Dynamic prompts are generated to guide the inference model 142 in extracting insights and calculating KPIs, such as completeness scores, unauthorized access events, or retention violations. The inference model 142 processes these prompts and returns structured outputs, which are parsed and converted into quantifiable metrics. The workflow then feeds these KPIs into dashboards, triggers alerts if thresholds are breached, and generates natural-language summaries for compliance and governance teams. Finally, a feedback loop may be established to allow human reviewers to validate outputs and refine prompts or rules for improved accuracy.

In certain embodiments, the automation workflow may include additional features to enhance its adaptability and defensibility. For example, the workflow can support adaptive prompt engineering, where prompts are dynamically tailored based on data type, policy changes, and historical governance trends. The inference model 142 may also generate both structured KPI outputs and natural-language reports, enabling a broad range of users to interpret and act on governance metrics. Furthermore, the workflow can incorporate a feedback and audit module, logging all model prompts and responses for traceability and supporting human-in-the-loop validation to ensure the accuracy and defensibility of governance outputs.

Another notable aspect of the automation workflow is its ability to integrate with organizational policy engines and access control systems. In certain embodiments, the workflow may validate inference model outputs against policy engines, such as Open Policy Agent, and apply role-based access to KPI dashboards and reports. The workflow can also support versioning of governance rules and KPI definitions, enabling organizations to track changes and maintain a defensible record of governance logic overtime. By integrating these features, the AI-driven or LLM-driven data governance KPI generation workflow can deliver a robust, adaptive, and explainable solution for real-time governance monitoring and strategic compliance management in modern enterprise IT environments.

In a further exemplary use case, the ASI framework can provide an automation workflow for an AI-driven or LLM-driven silver layer integration.

In certain embodiments, an automation workflow for AI-driven or LLM-driven silver layer integration can be implemented to automate the creation of analytical and predictive models from raw and curated data sources and to facilitate the integration of enriched outputs into the silver layer of a data lake house architecture. This workflow may utilize a large language model (LLM) and/or other type of inference model 142 to ingest data from the bronze layer, apply semantic reasoning to clean, transform, and feature-engineer inputs, and generate domain-specific models and enriched datasets. The main functions of this workflow can include semantic feature engineering, model selection and training, data transformation, and the landing of curated outputs in the silver layer for downstream analytics, compliance, and operational use.

The AI-driven or LLM-driven silver layer integration workflow can be closely integrated with the ASI platform 150 and its core components, as well as with relevant ASI domain systems 650. In certain embodiments, the workflow may leverage the metadata integration system 160 to access raw and semi-structured data from the bronze layer, as well as to store enriched datasets and model outputs in the Silver layer. The autonomous intelligence engine 170 can be utilized to provide advanced analytics, model validation, and feedback for feature engineering and transformation logic. The adaptive control engine 180 may automate the deployment of model artifacts, enriched datasets, and configuration updates to the silver layer and orchestrate remediation workflows in response to detected data quality or compliance issues. Additionally, the data modeling and feature engineering system 602 and the data transformation and enrichment system 607, as ASI domain systems, can serve as key interfaces for orchestrating the AI-driven or -driven silver layer integration workflow, ensuring that all outputs are policy-compliant, lineage-tracked, and optimized for downstream consumption.

The step-by-step process implemented by the inference model 142 in the automation workflow can include the following: First, the workflow may ingest raw data from the bronze layer, including logs, IoT streams, transactional systems, and unstructured sources. The inference model 142 can then interpret schema, data types, and quality indicators, and generate prompts for feature engineering and data transformation. The inference model 142 may perform data cleaning, semantic transformation, and feature synthesis, producing structured feature sets with metadata. Next, the inference model 142 can select and configure appropriate model types (such as regression, classification, clustering, or forecasting), generate training pipelines, and output model artifacts and performance summaries. The enriched datasets and model outputs are then landed in the Silver layer, with embedded metadata for source lineage, transformation logic, and model versioning. Finally, the workflow can generate audit-ready reports and dashboards for data stewards and compliance teams, and a feedback loop may be established to allow human reviewers to validate outputs and refine future workflows.

In certain embodiments, the automation workflow may include additional features to enhance its adaptability and effectiveness. For example, the inference model 142 can support adaptive prompt engineering, where prompts are dynamically tailored based on data characteristics, modeling goals, and historical performance. The workflow may also provide support for both batch and streaming data formats, enabling real-time or scheduled integration of enriched outputs into the Silver layer. Furthermore, the workflow can incorporate a feedback and optimization module, allowing human reviewers to validate model outputs, feature logic, and transformation steps, which in turn can be used to refine future prompt generation and model selection for improved accuracy and relevance.

Another notable aspect of the automation workflow is its ability to ensure compliance and traceability. In certain embodiments, the inference model 142 can embed governance and lineage metadata into all Silver layer outputs, supporting auditability and regulatory requirements. The workflow may also log all inference model prompts, transformation steps, and model decisions for traceability, and support versioning and rollback of model artifacts and enriched datasets. By integrating these features, the AI-driven or LLM-driven silver layer integration workflow can deliver a robust, adaptive, and explainable solution for model generation and data transformation in modern enterprise data lake house environments.

The features, functionalities, and/or configurations of the ASI domain system 650 and corresponding function use cases described herein are provided as examples to demonstrate embodiments. Numerous modifications and variations to the disclosed embodiments are possible, and the techniques described herein can be implemented in many other contexts and environments.

Exemplary AI System Configurations & Models

As explained above, the ASI platform 150 can include an AI system 140 that includes or communicates with various types of learning models, including, but not limited to, one or more inference models 142, one or more language models 142A, and/or one or more machine-learning models 144. Additionally, the various ASI domain systems 650 also may include or communicate with various types of learning models, including, but not limited to, one or more inference models 142, one or more language models 142A, and/or one or more machine-learning models 144.

The type and configuration of the inference models 142 described herein can vary. In some examples, an inference model 142 can include one or more language models 142A, such as a large language model (LLM) (e.g., having ten billion or more parameters, such as LLaMA 2, BERT, GPT, etc.), a medium language model (e.g., having 1-10 billion parameters), and/or a small language model (e.g., having with less than one billion parameters, such as DistilBERT).

In certain embodiments, the language models utilized within the system can include transformer-based large language models (e.g., such as GPT, BERT, LLaMA, etc.), as well as autoregressive models (e.g., such as the GPT series), masked language models (e.g., such as BERT), and/or encoder-decoder models (e.g., such as T5 and BART). The system may employ models that are supervised fine-tuned, unsupervised pretrained, or fine-tuned using reinforcement learning from human feedback, such as ChatGPT. Both general-purpose language models (for example, GPT-4 and Claude) and domain-specific models—such as Med-PaLM for medical applications, CaseText's CoCounsel for legal use, SciBERT for scientific literature, and BloombergGPT for financial data—can be used. The system may leverage open-source models like LLaMA, Mistral, Falcon, and BLOOM, as well as proprietary models such as GPT-4, Claude, and Gemini. Deployment options can include cloud-hosted APIs, on-premise or self-hosted solutions, and edge-deployable models designed for mobile or embedded systems.

In some examples, the language model 142A utilized by the ASI platform 150 and/or ASI domain systems 650 can include one or more LLMs. In some embodiments, an LLM can include a generative pre-trained transformer (GPT) model (e.g., a GPT-1, GPT-2, GPT-3, GPT-4, or subsequently developed GPT model). Additionally, or alternatively, the language model can include a BERT (Bidirectional Encoder Representations from Transformers) model, an XLNet (Extra-Long Transformer Network) model, a RoBERTa (Robustly Optimized BERT pre-training approach) model, a DeBERTa (Decoding-enhanced BERT with disentangled attention) model, a CTRL (Conditional Transformer Language Model) model, and/or a T5 (Text-to-Text Transfer Transformer) model. These or other types of machine learning or AI language models can be used to implement the language model.

In certain embodiments, the inference model 142 can include a transformer neural network architecture that includes a self-attention mechanism, which allows the model to weigh the importance of different parts of a prompt input when generating its output or response. The self-attention mechanism allows the model to selectively focus on different parts of the input when generating its output or response, rather than relying on a fixed context window like other language models. Additionally, the transformer neural network architecture can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures can be utilized to train the inference model 142. In some cases, one or more supervised or semi-supervised training procedures can be utilized to train the language model. Additionally, or alternatively, one or more unsupervised training procedures can be utilized to train the language model.

In some embodiments, the inference model 142 is trained via a self-supervised training procedure that includes both an unsupervised training phase and a supervised training phase. The unsupervised training phase can include a pre-training step in which the learning model is trained on a large corpus of text to learn patterns and relationships between words, phrases, sentences, and/or other human language elements. The supervised training phase can be used for fine-tuning and can train the language model using one or more labeled datasets to facilitate learning of specific natural language processing (NLP) tasks, such as language translation, language generation, question answering, text classification, text summarization, etc.

Many additional types of training procedures can be utilized to train the language model described herein.

In some embodiments, the inference model 142 may be trained or fine-tuned on one or more training datasets customized or supplemented with domain-specific textual content relating to enterprise IT operations, system configurations, workflow orchestration, and/or incident response procedures, and/or a transfer learning procedure can be executed to fine-tune the training of the language model on the domain-specific textual content. For example, the training dataset may comprise data indicating historical system events, configuration changes, workflow execution logs, and incident remediation records. Additionally, or alternatively, the training dataset can be supplemented with text relating to exemplary workflow deployment scenarios, including exemplary input modification requests, system state descriptions, and labeled outcomes such as successful deployments, error resolutions, or compliance enforcement actions. Using this domain-specific content to supplement the training of the language model can enhance or improve the precision of the language model with respect to generating actionable intelligence, optimizing workflow deployment plans, and supporting adaptive, context-aware decision-making within enterprise IT environments.

During this training or fine-tuning process, the underlying parameters and/or weights of the inference model 142 are adjusted using the domain-specific dataset, enabling the model to better interpret prompts, improve its ability to extract relevant features from input data, and generate more precise model outputs related to enterprise IT analytics, workflow orchestration, and adaptive control decision-making. In some examples, this can be accomplished through additional rounds of gradient descent, where the model's weights are updated based on the specialized domain-specific data, permitting the model to better handle NLP tasks in the enterprise IT domain. As a result of these updated weights, the inference model 142 will respond differently to prompts-demonstrating improved fluency with specialized vocabulary, enhanced performance on domain-specific tasks, and the ability to generate more relevant and contextually appropriate responses for performing activities including cross-domain intelligence synthesis, adaptive decision support, real-time anomaly detection, risk assessment, workflow deployment planning, automated remediation within enterprise IT environments, and/or other activities of the inference model 142 described herein.

In certain embodiments, the language model also can include a continuous learning (or incremental) learning framework that enables the language model to continuously learn over time based on newly ingested operational data, user feedback, system performance metrics, and evolving enterprise IT environments. The continuous learning framework can continuously refine and increase the quality and precision of the language model outputs and/or refine the manner in which the language model responds to changing system conditions, updated workflow requirements, and emerging patterns or anomalies within the enterprise IT ecosystem.

For simplicity purposes, certain portions of this disclosure may describe the inference model 142 as a single learning model that executes the functions described herein. However, it should be understood that the inference model 142 can include a plurality of separate learning models, each of which is trained to perform certain tasks or functions, and these models can be combined in various ways to achieve the functions described herein. Thus, any portion of this disclosure that describes communications with a single learning model can be interpreted as communicating with one or more learning models.

For simplicity purposes, certain portions of this disclosure also may describe the ASI platform 150 and/or enterprise IT environment 130 as hosting the inference model 142. However, it should be understood that the inference model 142 can be hosted on a separate platform that is accessed by the ASI platform 150 and/or enterprise IT environment 130, and the ASI platform 150 and/or enterprise IT environment 130 can communicate with the separate hosting platform (using an API and/or other communication means) to perform the functionalities described herein. Thus, any portion of this disclosure that describes accessing or utilizing the inference model 142 described herein can be interpreted as accessing models hosted on the ASI platform 150 and/or enterprise IT environment 130, accessing models stored on a separate platform, or a combination thereof.

As explained above, various types of machine-learning models 144 also may be leveraged by the ASI platform 150 and/or ASI domain systems 650.

For example, as explained above, the metadata integration system 160 and/or metadata analysis system 162 can utilize one or more machine-learning models 144 to analyze collected metadata, generate enhanced metrics, compute scoring matrices, assign quantitative scores to data elements and services (e.g., activity level, cost, quality, access patterns, usage frequency, security, compliance), and/or perform other related functions.

Various types of machine-learning models 144 can be utilized to execute these functions. In some embodiments, the machine-learning models 144 include some or all of the following:

- Supervised learning models such as decision trees, random forests, gradient boosting machines (e.g., XGBoost, LightGBM), and support vector machines (SVMs), which can be trained to classify, score, or predict attributes of data elements and services based on labeled metadata.
- Unsupervised learning models such as k-means clustering, hierarchical clustering, Gaussian mixture models, and principal component analysis (PCA), which can be used to detect patterns, group similar data elements, and identify anomalies or outliers in the metadata.
- Anomaly detection models, including isolation forests, one-class SVMs, autoencoders, and statistical outlier detection algorithms, which are particularly useful for identifying unusual patterns or deviations in system behavior, access patterns, or data quality metrics.
- Regression models such as linear regression, ridge regression, lasso regression, and elastic net, which can be used to predict continuous metrics (e.g., cost, usage frequency, or performance scores) from metadata features.
- Ensemble models that combine the outputs of multiple base learners (e.g., bagging, boosting, stacking) to improve prediction accuracy and robustness for scoring and classification tasks.
- Neural network models, including feedforward neural networks, deep learning architectures, and autoencoders, which can be applied for complex feature extraction, dimensionality reduction, and non-linear pattern recognition in large-scale or high-dimensional metadata.
- Time series models such as ARIMA, Prophet, and recurrent neural networks (RNNs) including long short-term memory (LSTM) networks, which can be used to analyze and forecast trends or changes in metadata attributes over time.
- Probabilistic models such as Bayesian networks and hidden Markov models, which can be used for uncertainty quantification, probabilistic scoring, and modeling dependencies among metadata features.
- Clustering and segmentation models for grouping data elements or services based on similarity in metadata attributes, supporting targeted optimization and management strategies.
- Dimensionality reduction models such as t-SNE and UMAP, which can be used to visualize and explore complex relationships in high-dimensional metadata.

These and other machine-learning models can be selected, configured, and combined as needed to support the full range of analytics, scoring, anomaly detection, and/or optimization functions performed by the metadata integration system 160 and metadata analysis system 162. The choice of model(s) may be based on the specific characteristics of the metadata, the operational context, and/or the desired outcomes for enterprise IT intelligence and automation.

The autonomous intelligence engine 170, adaptive control engine 180, and/or workflow deployment system 190 also may leverage various machine-learning models 144 for various purposes.

For example, the autonomous intelligence engine can utilize the machine-learning models 144 to synthesize insights and analytics from metadata, quantify performance metrics, detect anomalies, assess risks, and/or generate key performance indicators (KPIs) across the enterprise IT environment. These models can be applied for advanced analytics, such as anomaly detection, predictive analytics, trend identification, and risk scoring, supporting real-time, data-driven decision-making and adaptive control. The outputs of these models may be used independently or as inputs to inference models 142 or LLMs for further synthesis.

The adaptive control engine 180 and its workflow deployment system 190 may use various machine-learning models 144 to optimize workflow deployment specifications, select and adapt infrastructure-as-code (IaC) artifacts, and orchestrate workflow execution. These models can analyze operational data, historical deployment outcomes, and system state to recommend or automate the most effective deployment strategies, resource allocations, and configuration changes, thereby improving the efficiency and reliability of adaptive actions within the enterprise IT environment.

In some embodiments, the machine-learning models 144 utilized by the autonomous intelligence engine 170, adaptive control engine 180, and/or workflow deployment system 190 may include some or all of the following:

Various types of machine-learning models 144 can be utilized to execute these functions performed by the autonomous intelligence engine 170, adaptive control engine 180, and/or workflow deployment system 190. In some embodiments, the machine-learning models 144 include some or all of the following:

- Supervised learning models such as decision trees, random forests, gradient boosting machines (e.g., XGBoost, LightGBM), and support vector machines (SVMs), which can be trained to classify, score, or predict operational events, system health, workflow outcomes, or risk levels based on labeled historical data. These models may be used for event classification, incident prediction, or workflow success/failure prediction.
- Unsupervised learning models such as k-means clustering, hierarchical clustering, Gaussian mixture models, and principal component analysis (PCA), which can be used to detect patterns, group similar operational states or workflows, and identify anomalies or outliers in system behavior or workflow execution data.
- Anomaly detection models, including isolation forests, one-class SVMs, autoencoders, and statistical outlier detection algorithms, which are particularly useful for identifying unusual patterns, deviations from expected system behavior, or emerging threats in real time within the enterprise IT environment.
- Regression models such as linear regression, ridge regression, lasso regression, and elastic net, which can be used to predict continuous metrics such as resource utilization, workflow execution time, cost, or performance scores from operational and environmental features.
- Ensemble models that combine the outputs of multiple base learners (e.g., bagging, boosting, stacking) to improve prediction accuracy and robustness for system health scoring, workflow optimization, and risk assessment tasks.
- Neural network models, including feedforward neural networks, deep learning architectures, convolutional neural networks (CNNs), and recurrent neural networks (RNNs), which can be applied for complex pattern recognition, time-series forecasting, and adaptive control in high-dimensional operational data. These models may be used for predicting system failures, optimizing workflow sequences, or extracting features from unstructured logs.
- Time series models such as ARIMA, Prophet, and recurrent neural networks (RNNs) including long short-term memory (LSTM) networks, which can be used to analyze and forecast trends, detect seasonality, or anticipate future resource demands and operational risks based on historical system and workflow data.
- Probabilistic models such as Bayesian networks and hidden Markov models, which can be used for uncertainty quantification, probabilistic risk scoring, modeling dependencies among operational events, and supporting decision-making under uncertainty.
- Reinforcement learning models which can be used to optimize adaptive control strategies by learning optimal actions or workflow deployment policies through trial-and-error interactions with the enterprise IT environment, thereby improving long-term performance and resilience.
- Optimization models such as genetic algorithms, simulated annealing, and other metaheuristic approaches, which can be used to search for optimal workflow configurations, resource allocations, or deployment plans in complex, multi-constraint environments.
- Clustering and segmentation models for grouping operational events, workflows, or system states based on similarity in features, supporting targeted optimization, root cause analysis, and adaptive response strategies.
- Dimensionality reduction models such as t-SNE and UMAP, which can be used to visualize and explore complex relationships in high-dimensional operational or workflow data, aiding in diagnostics and decision support.

These and other machine-learning models can be selected, configured, and combined as needed to support the full range of analytics, anomaly detection, predictive modeling, optimization, and adaptive control functions performed by the autonomous intelligence engine 170, adaptive control engine 180, and workflow deployment system 190. The choice of model(s) may depend on the specific operational context, the nature of the data, and the desired outcomes for enterprise IT intelligence, automation, and resilience.

The ASI platform and associated technologies described herein overcome a wide range of technical challenges in managing and optimizing enterprise IT systems.

Traditional enterprise IT environments often suffer from fragmented data and metadata, isolated within departmental silos, disparate applications, and heterogeneous technology stacks. This fragmentation impedes holistic visibility, cross-domain analysis, and coordinated action.

The technologies described herein overcome these challenges by providing an integrated platform that continuously ingests and aggregates metadata across multiple layers and services of the enterprise IT environment into a unified, multi-layer metadata hub. This centralized repository enables seamless access to comprehensive, up-to-date information across domains, allowing advanced AI and machine learning models to generate actionable intelligence, correlate events, and automate adaptive controls. As a result, the system delivers real-time, cross-domain visibility, supports coordinated decision-making, and enables dynamic orchestration of workflows and policy enforcement across the entire digital ecosystem, thereby eliminating silos and enabling holistic, resilient, and explainable enterprise IT operations.

Other technical challenges can be attributed to the management of IT environments, which typically relies on manual processes, institutional knowledge, and static frameworks that are resource-intensive, slow to adapt, and susceptible to human error, misconfiguration, and inconsistency.

The technologies described herein overcome these challenges by introducing an adaptive, AI-driven platform that can automate the collection, analysis, and orchestration of IT operations across all layers and domains. By leveraging advanced machine learning models, large language models, and/or inference models 142 the system enables real-time monitoring, intelligent decision-making, and automated deployment of workflows and policy enforcement. This approach reduces reliance on manual intervention, accelerates response to changing conditions, minimizes the risk of errors, and ensures consistent application of best practices and compliance requirements throughout the enterprise IT environment.

Another technical problem is the complexity of integrating new services and workflows in enterprise environments, which often requires coordinated changes across multiple layers—such as infrastructure, security, identity, data, and governance—each with its own dependencies and protocols. This complexity increases the risk of disruption and configuration drift.

The technologies described herein address this challenge by providing an adaptive control engine and workflow deployment system that automates the construction, modification, and deployment of workflow pipelines. The system leverages a unified metadata hub and AI-driven orchestration to dynamically generate deployment specifications, manage dependencies, and ensure that changes are implemented consistently and in compliance with organizational policies, thereby reducing the risk of disruption and configuration errors.

Conventional enterprise automation solutions present another technical challenge, as they are typically static, rule-based, and domain-specific, lacking the ability to adapt dynamically to changing operational conditions, evolving business requirements, or emerging threats.

The technologies described herein overcome this limitation by integrating adaptive automation capabilities powered by AI and machine learning models. The platform continuously monitors operational data, learns from evolving patterns, and autonomously adjusts workflows, policies, and controls in response to real-time conditions. This enables the system to provide dynamic, context-aware automation that evolves with the needs of the enterprise.

A further technical challenge arises from the lack of real-time, cross-domain intelligence in existing monitoring and analytics tools, which are often reactive and limited to specific domains or layers. These tools are unable to correlate events, detect patterns, or generate insights across the entire IT ecosystem in real time.

The technologies described herein overcome this limitation by employing an autonomous intelligence engine that continuously synthesizes and analyzes metadata from all architecture layers and services. By leveraging AI and machine learning models, the platform generates real-time, ecosystem-wide intelligence, enabling proactive detection of anomalies, cross-domain pattern recognition, and the delivery of actionable insights that support adaptive control and optimization throughout the enterprise IT environment.

Security monitoring in traditional systems is often reactive and incomplete, with limited ability to detect subtle, cross-domain threats, correlate behavioral anomalies, or enforce adaptive containment and remediation in real time.

The technologies described herein address this problem by incorporating a security and resilience management system that fuses signals from multiple domains, applies semantic reasoning to detect complex threats, and orchestrates real-time containment and remediation actions. The platform's AI-driven threat intelligence and adaptive policy enforcement enable proactive, comprehensive security monitoring and rapid incident response across the entire IT ecosystem.

Another technical challenge is the slow and rigid process of data ingestion and integration, where onboarding new data sources, normalizing schemas, and preparing data for analytics or compliance is labor-intensive and hinders organizational agility.

The technologies described herein solve this problem by providing an intelligent data ingestion and normalization system that uses AI models to automatically discover, interpret, and harmonize data from diverse sources. The system semantically enriches and tags data, streamlines schema mapping, and prepares high-quality, context-rich datasets for downstream analytics and compliance, significantly accelerating data onboarding and integration.

Orchestrating complex, multi-step workflows that span multiple domains and layers presents additional technical difficulties, especially when dependencies, sequencing, and compliance requirements must be managed dynamically.

The technologies described herein overcome this challenge by utilizing an AI-powered workflow deployment system that autonomously generates, sequences, and executes workflow steps based on real-time metadata, system state, and compliance constraints. The system manages dependencies, enforces policy requirements, and adapts workflow execution in response to changing conditions, enabling reliable and efficient orchestration of complex enterprise workflows.

Further, there is a technical problem in quantifying and optimizing the intelligence and adaptability of enterprise IT environments due to the lack of standardized, quantitative metrics. Current enterprise solutions do not have any means whatsoever to measure the intelligence or adaptability of an enterprise system.

The technologies described herein address this by introducing adaptive systems intelligence quotient (ASIQ) metrics and other quantitative indicators that assess learning efficiency, adaptability, decision quality, resilience, and optimization capability. These metrics are generated and updated in real time by the platform's intelligence engine, providing organizations with actionable benchmarks to measure, compare, and continuously improve the intelligence and adaptability of their IT systems.

In certain embodiments, a computerized method is disclosed. The method can be implemented via execution of computing instructions by one or more processing devices and configured to be stored on one or more non-transitory storage devices. The method can comprise one or more of the following: (a) providing an adaptive systems intelligence (ASI) platform that is integrated with an enterprise information technology (IT) environment comprising a plurality of architecture layers and a plurality of enterprise services; (b) continuously ingesting, by a multi-layer metadata hub of the ASI platform, metadata across the plurality of architecture layers and the plurality of enterprise services; (c) receiving a request for implementing one or more target changes within the enterprise IT environment; (d) autonomously synthesizing, by an adaptive control engine of the ASI platform, an automated workflow deployment specification that comprises a plurality of workflow steps to implement the one or more target changes within the enterprise IT environment, wherein the adaptive control engine includes, or communicates with, at least one inference model, such as a large language models (LLM), to synthesize the automated workflow deployment specification, at least in part, using the metadata ingested by the multi-layer metadata hub; and (e) autonomously deploying, by the adaptive control engine of the ASI platform, the one or more target changes within the enterprise IT environment, wherein the at least one LLM executes each of the plurality of workflow steps corresponding to the automated workflow deployment specification to deploy the one or more target changes.

In certain embodiments, autonomously deploying the one or more target changes within the enterprise IT environment can include utilizing a plurality of infrastructure-as-code artifacts to facilitate execution of at least a portion of the workflow steps corresponding to the automated workflow deployment specification.

In certain embodiments, each of the plurality of infrastructure-as-code artifacts may correspond to a predefined configuration file or blueprint that enables a specific type of computing infrastructure to be provisioned or deployed, and at least one large language model or inference model can select the infrastructure-as-code artifacts to be used for deployment based, at least in part, on the workflow steps defined in the automated workflow deployment specification.

In certain embodiments, at least one large language model or inference model may modify each of the infrastructure-as-code artifacts based, at least in part, on the metadata stored in the multi-layer metadata hub of the adaptive systems intelligence platform.

In certain embodiments, prior to deploying the one or more target changes, the adaptive control engine can present the automated workflow deployment specification for review by either an autonomous decision-making system or a human reviewer, and may enable the automated workflow deployment specification to be approved, rejected, or modified before deployment within the enterprise IT environment.

In certain embodiments, at least one large language model or inference model can synthesize the automated workflow deployment specification, at least in part, by applying cross-domain correlation or reasoning using the metadata ingested across the plurality of architecture layers and enterprise services.

In certain embodiments, the adaptive systems intelligence platform may generate one or more metadata matrices that organize and store quantitative scoring attributes for data elements, services, or resources within the enterprise IT environment based on the metadata ingested by the multi-layer metadata hub.

In certain embodiments, at least one large language model or inference model can synthesize the automated workflow deployment specification, at least in part, based on the one or more metadata matrices.

In certain embodiments, the adaptive control engine may autonomously initiate deployment of the one or more target changes within the enterprise IT environment in response to a predefined trigger condition without human intervention.

In certain embodiments, an autonomous intelligence engine can be configured to autonomously generate environmental analysis data based, at least in part, on the metadata included in the multi-layer metadata hub, and the environmental analysis data may be utilized by at least one large language model or inference model to generate the automated workflow deployment specification.

In certain embodiments, an autonomous intelligence engine can be configured to autonomously generate environmental analysis data based, at least in part, on the metadata included in the multi-layer metadata hub, and the environmental analysis data may be utilized to trigger or initiate a new deployment process for implementing the one or more target changes in the enterprise IT environment.

In certain embodiments, autonomously deploying the one or more target changes within the enterprise IT environment can include orchestrating or integrating with one or more continuous integration and continuous delivery pipelines to automate the deployment of the one or more target changes.

In certain embodiments, a training procedure may be applied to train or fine-tune at least one large language model or inference model on one or more domain-specific training datasets that include a corpus of content corresponding to enterprise IT operations, system configurations, workflow orchestration, workflow deployment scenarios, and historical enterprise system events, and the training or fine-tuning can adjust the parameters and weights of the large language model or inference model to modify its ability to generate outputs related to metadata management, enterprise IT analytics, workflow orchestration, and adaptive control decision-making.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A computerized method implemented via execution of computing instructions by one or more processing devices and configured to be stored on one or more non-transitory storage devices, the method comprising:

providing an adaptive systems intelligence (ASI) platform that is integrated with an enterprise information technology (IT) environment comprising a plurality of architecture layers and a plurality of enterprise services;

continuously ingesting, by a multi-layer metadata hub of the ASI platform, source metadata independently generated and maintained by a plurality of distinct source systems across the plurality of architecture layers and the plurality of enterprise services, wherein the multi-layer metadata hub receives and consolidates the source metadata from the plurality of distinct source systems into a unified repository that provides cross-domain visibility for downstream deployment operations;

receiving a request for implementing one or more target changes within the enterprise IT environment, the one or more target changes corresponding to one or more of: integrating of a new service in the enterprise IT environment; updating, modifying, or replacing an existing service in the enterprise IT environment; configuring or reconfiguring security settings in the enterprise IT environment; configuring or reconfiguring access control permissions or settings in the enterprise IT environment; migrating, configuring or reconfiguring data schemas and/or data management systems in the enterprise IT environment; configuring or reconfiguring infrastructure resource allocations in the enterprise IT environment; or configuring or reconfiguring one or more governance policies in the enterprise IT environment;

autonomously synthesizing, by an adaptive control engine of the ASI platform, an automated workflow deployment specification that comprises a plurality of workflow steps to implement the one or more target changes within the enterprise IT environment, wherein the adaptive control engine accesses, via a hub access interface of the multi-layer metadata hub, portions of the consolidated metadata relevant to the one or more target changes and includes, or communicates with, at least one inference model to synthesize the automated workflow deployment specification, at least in part, by applying cross-domain reasoning on the portions of the consolidated metadata received from the multi-layer metadata hub to configure one or more parameters of the automated workflow deployment specification; and autonomously deploying, by the adaptive control engine of the ASI platform, the one or more target changes within the enterprise IT environment, wherein the at least one inference model executes each of the plurality of workflow steps corresponding to the automated workflow deployment specification to deploy the one or more target changes.

2. The method of claim 1, wherein autonomously deploying the one or more target changes within the enterprise IT environment comprises utilizing a plurality of infrastructure-as-code artifacts to facilitate execution of at least a portion of the plurality of workflow steps corresponding to the automated workflow deployment specification.

3. The method of claim 2, wherein each of the plurality of infrastructure-as-code artifacts corresponds to a predefined configuration file or blueprint that enables a specific type of computing infrastructure to be provisioned or deployed, and the at least one inference model selects the plurality of infrastructure-as-code artifacts to be utilized for deployment based, at least in part, on the plurality of workflow steps defined in the automated workflow deployment specification.

4. The method of claim 3, wherein the at least one inference model modifies each of the plurality of infrastructure-as-code artifacts based, at least in part, on the consolidated metadata stored in the multi-layer metadata hub of the ASI platform.

5. The method of claim 1, wherein, prior to deploying the one or more target changes, the adaptive control engine presents the automated workflow deployment specification for review by either an autonomous decision-making system or a human reviewer, and enables the automated workflow deployment specification to be approved, rejected, or modified before deployment within the enterprise IT environment.

6. The method of claim 1, wherein the ASI platform generates one or more metadata matrices that organize and store quantitative scoring attributes for data elements, services, or resources within the enterprise IT environment based on the consolidated metadata ingested by the multi-layer metadata hub.

7. The method of claim 6, wherein at least one inference model synthesizes the automated workflow deployment specification, at least in part, based on the one or more metadata matrices.

8. The method of claim 1, wherein the adaptive control engine autonomously initiates deployment of the one or more target changes within the enterprise IT environment in response to a predefined trigger condition without human intervention.

9. The method of claim 1, wherein an autonomous intelligence engine is configured to autonomously generate environmental analysis data based, at least in part, on the consolidated metadata included in the multi-layer metadata hub, and the environmental analysis data is utilized by the at least one inference model to generate the automated workflow deployment specification.

10. The method of claim 1, wherein an autonomous intelligence engine is configured to autonomously generate environmental analysis data based, at least in part, on the consolidated metadata included in the multi-layer metadata hub, and the environmental analysis data is utilized to trigger or initiate a new deployment process for implementing the one or more target changes in the enterprise IT environment.

11. The method of claim 1, wherein autonomously deploying the one or more target changes within the enterprise IT environment comprises orchestrating or integrating with one or more continuous integration and continuous delivery (CI/CD) pipelines to automate the deployment of the one or more target changes.

12. The method of claim 1, wherein the at least one inference model includes at least one language model and a training procedure is applied to train or fine-tune the at least one language model on one or more domain-specific training datasets that include a corpus of content corresponding to one or more of the following: enterprise IT operations, system configurations, workflow orchestration, workflow deployment scenarios, and historical enterprise system events; and the training or fine-tuning adjusts parameters and weights of the at least one language model to modify an ability of the at least one language model to generate outputs related to metadata management, enterprise IT analytics, workflow orchestration, and/or adaptive control decision-making.

13. A system comprising one or more processing devices and one or more non-transitory storage devices for storing instructions, wherein execution of the instructions by the one or more processing devices causes the one or more processing devices to perform functions comprising:

providing an adaptive systems intelligence (ASI) platform that is integrated with an enterprise information technology (IT) environment comprising a plurality of architecture layers and a plurality of enterprise services;

continuously ingesting, by a multi-layer metadata hub of the ASI platform, source metadata independently generated and maintained by a plurality of distinct source systems across the plurality of architecture layers and the plurality of enterprise services, wherein the multi-laver metadata hub receives and consolidates the source metadata from the plurality of distinct source systems into a unified repository that provides cross-domain visibility for downstream deployment operations;

receiving a request for implementing one or more target changes within the enterprise IT environment, the one or more target changes corresponding to one or more of: integrating of a new service in the enterprise IT environment; updating, modifying, or replacing an existing service in the enterprise IT environment; configuring or reconfiguring security settings in the enterprise IT environment; configuring or reconfiguring access control permissions or settings in the enterprise IT environment; migrating, configuring or reconfiguring data schemas and/or data management systems in the enterprise IT environment; configuring or reconfiguring infrastructure resource allocations in the enterprise IT environment; or configuring or reconfiguring one or more governance policies in the enterprise IT environment;

autonomously synthesizing, by an adaptive control engine of the ASI platform, an automated workflow deployment specification that comprises a plurality of workflow steps to implement the one or more target changes within the enterprise IT environment, wherein the adaptive control engine accesses, via a hub access interface of the multi-layer metadata hub, portions of the consolidated metadata relevant to the one or more target changes and includes, or communicates with, at least one inference model to synthesize the automated workflow deployment specification, at least in part, by applying cross-domain reasoning on the portions of the consolidated metadata received from the multi-layer metadata hub to configure one or more parameters of the automated workflow deployment specification; and autonomously deploying, by the adaptive control engine of the ASI platform, the one or more target changes within the enterprise IT environment, wherein the at least one inference model executes each of the plurality of workflow steps corresponding to the automated workflow deployment specification to deploy the one or more target changes.

14. The system of claim 13, wherein autonomously deploying the one or more target changes within the enterprise IT environment comprises utilizing a plurality of infrastructure-as-code artifacts to facilitate execution of at least a portion of the plurality of workflow steps corresponding to the automated workflow deployment specification.

15. The system of claim 14, wherein each of the plurality of infrastructure-as-code artifacts corresponds to a predefined configuration file or blueprint that enables a specific type of computing infrastructure to be provisioned or deployed, and the at least one inference model selects the plurality of infrastructure-as-code artifacts to be utilized for deployment based, at least in part, on the plurality of workflow steps defined in the automated workflow deployment specification.

16. The system of claim 15, wherein the at least one inference model modifies each of the plurality of infrastructure-as-code artifacts based, at least in part, on the consolidated metadata stored in the multi-layer metadata hub of the ASI platform.

17. The system of claim 13, wherein autonomously deploying the one or more target changes within the enterprise IT environment comprises orchestrating or integrating with one or more continuous integration and continuous delivery (CI/CD) pipelines to automate the deployment of the one or more target changes.

18. A computer program product comprising one or more non-transitory storage devices that store instructions for causing one or more computing devices to perform functions comprising:

providing an adaptive systems intelligence (ASI) platform that is integrated with an enterprise information technology (IT) environment comprising a plurality of architecture layers and a plurality of enterprise services;

continuously ingesting, by a multi-layer metadata hub of the ASI platform, source metadata independently generated and maintained by a plurality of distinct source systems across the plurality of architecture layers and the plurality of enterprise services, wherein the multi-laver metadata hub receives and consolidates the source metadata from the plurality of distinct source systems into a unified repository that provides cross-domain visibility for downstream deployment operations;

receiving a request for implementing one or more target changes within the enterprise IT environment, the one or more target changes corresponding to one or more of: integrating of a new service in the enterprise IT environment; updating, modifying, or replacing an existing service in the enterprise IT environment; configuring or reconfiguring security settings in the enterprise IT environment; configuring or reconfiguring access control permissions or settings in the enterprise IT environment; migrating, configuring or reconfiguring data schemas and/or data management systems in the enterprise IT environment; configuring or reconfiguring infrastructure resource allocations in the enterprise IT environment; or configuring or reconfiguring one or more governance policies in the enterprise IT environment;

autonomously synthesizing, by an adaptive control engine of the ASI platform, an automated workflow deployment specification that comprises a plurality of workflow steps to implement the one or more target changes within the enterprise IT environment, wherein the adaptive control engine accesses, via a hub access interface of the multi-layer metadata hub, portions of the consolidated metadata relevant to the one or more target changes and includes, or communicates with, at least one inference model to synthesize the automated workflow deployment specification, at least in part, by applying cross-domain reasoning on the portions of the consolidated metadata received from the multi-layer metadata hub to configure one or more parameters of the automated workflow deployment specification; and autonomously deploying, by the adaptive control engine of the ASI platform, the one or more target changes within the enterprise IT environment, wherein the at least one inference model executes each of the plurality of workflow steps corresponding to the automated workflow deployment specification to deploy the one or more target changes.

* * * * *